(12) United States Patent
Veitsel et al.

(10) Patent No.: US 11,397,265 B2
(45) Date of Patent: Jul. 26, 2022

(54) UNIVERSAL MULTI-CHANNEL GNSS SIGNAL RECEIVER

(71) Applicant: Topcon Positioning Systems, Inc., Livermore, CA (US)

(72) Inventors: Andrey Vladimirovich Veitsel, Moscow (RU); Dmitry Anatolyevich Rubtsov, Moscow (RU); Igor Anatolyevich Orlovsky, Moscow (RU); Sergey Sayarovich Bogoutdinov, Moscow (RU)

(73) Assignee: Topcon Positioning Systems, Inc., Livermore, CA (US)

(*) Notice: Subject to any disclaimer, the term of this patent is extended or adjusted under 35 U.S.C. 154(b) by 97 days.

(21) Appl. No.: 17/098,224

(22) Filed: Nov. 13, 2020

(65) Prior Publication Data

US 2021/0063583 A1 Mar. 4, 2021

Related U.S. Application Data

(63) Continuation of application No. 16/143,629, filed on Sep. 27, 2018, now Pat. No. 10,845,488, which is a continuation-in-part of application No. 14/439,271, filed as application No. PCT/RU2014/000793 on Oct. 21, 2014, now abandoned.

(51) Int. Cl.
*G01S 19/33* (2010.01)
*G01S 19/38* (2010.01)

(52) U.S. Cl.
CPC .............. *G01S 19/33* (2013.01); *G01S 19/38* (2013.01)

(58) Field of Classification Search
CPC .......... G01S 19/33; G01S 19/35; G01S 19/36; G01S 19/37; G01S 19/38
USPC ................. 342/357.51, 76, 77, 770
See application file for complete search history.

(56) References Cited

U.S. PATENT DOCUMENTS

| 4,809,005 A * | 2/1989 | Counselman, III .... G01C 15/00 342/357.48 |
| 4,894,662 A * | 1/1990 | Counselman ........... G01S 19/37 342/450 |
| 6,259,402 B1 * | 7/2001 | Asai ....................... G01S 19/34 342/357.74 |

(Continued)

OTHER PUBLICATIONS

New Generation Correlators by John D Bunton published Oct. 6, 2006 at https://ursi.org/proceedings/procGA05/pdf/J06.6(0311).pdf (Year: 2006).*

(Continued)

*Primary Examiner* — Erin F Heard
*Assistant Examiner* — Michael W Justice
(74) *Attorney, Agent, or Firm* — Bardmesser Law Group

(57) ABSTRACT

A universal multi-channel receiver for receiving and processing signals from different navigation systems is provided. The universal receiver is implemented as an ASIC receiver with a number of universal channels. The receiver with universal channels is capable of receiving and processing signals from navigation satellites located within a direct access zone. The universal receiver has a plurality of channels that share the same memory. The universal receiver can determine its coordinates using any of the existing navigation systems (GPS, GLONASS, Beidou and GALILEO). The receiver can receive and process any (PN) signals.

24 Claims, 41 Drawing Sheets

(56) References Cited

U.S. PATENT DOCUMENTS

| | | | | |
|---|---|---|---|---|
| 6,393,046 | B1* | 5/2002 | Kohli | G01S 19/47 375/140 |
| 6,608,589 | B1* | 8/2003 | Devereux | G01S 19/14 701/13 |
| 6,642,884 | B2* | 11/2003 | Bryant | G01S 19/252 342/357.64 |
| 6,859,170 | B2* | 2/2005 | Devereux | G01S 19/37 342/357.29 |
| 7,010,060 | B2* | 3/2006 | Ledvina | H04B 1/7075 375/E1.003 |
| 7,016,930 | B2* | 3/2006 | Hinds | G06F 7/5375 708/650 |
| 7,178,049 | B2* | 2/2007 | Lutter | G06F 9/468 714/1 |
| 7,463,189 | B2* | 12/2008 | Bryant | G01S 19/06 375/148 |
| 7,630,430 | B2* | 12/2009 | Bochkovskiy | G01S 19/30 375/150 |
| 7,764,226 | B1* | 7/2010 | Veitsel | G01S 19/33 342/357.73 |
| 7,894,983 | B2* | 2/2011 | Krach | G01S 19/22 340/995.25 |
| 8,111,735 | B2* | 2/2012 | Chen | G01S 19/30 375/150 |
| 8,125,381 | B2* | 2/2012 | Bryant | G01S 19/24 342/357.59 |
| 8,138,972 | B2* | 3/2012 | Underbrink | G01S 19/37 342/357.63 |
| 8,218,601 | B2* | 7/2012 | Hollreiser | G01S 19/37 375/142 |
| 8,816,905 | B2* | 8/2014 | Bryant | G01S 19/25 342/357.66 |
| 2002/0005802 | A1* | 1/2002 | Bryant | G01S 19/252 342/357.64 |
| 2002/0015439 | A1* | 2/2002 | Kohli | G01S 19/47 375/150 |
| 2003/0132878 | A1* | 7/2003 | Devereux | G01S 19/37 342/357.29 |
| 2003/0172242 | A1* | 9/2003 | Uneyama | G06F 5/14 711/167 |
| 2003/0204550 | A1* | 10/2003 | Lutter | G01S 19/37 718/102 |
| 2004/0083255 | A1* | 4/2004 | Hinds | G06F 7/5375 708/650 |
| 2004/0213334 | A1* | 10/2004 | Ledvina | H04B 1/7085 375/150 |
| 2006/0055596 | A1* | 3/2006 | Bryant | G01S 19/06 342/357.64 |
| 2007/0019715 | A1* | 1/2007 | Bochkovskiy | G01S 19/30 375/150 |
| 2008/0071995 | A1* | 3/2008 | Chen | G01S 19/37 342/357.73 |
| 2008/0154487 | A1* | 6/2008 | Krach | G01S 19/22 701/535 |
| 2008/0174481 | A1* | 7/2008 | Bryant | G01S 19/42 342/357.65 |
| 2008/0174483 | A1* | 7/2008 | Bryant | G01S 19/06 342/357.64 |
| 2009/0002227 | A1* | 1/2009 | Jia | G01S 19/37 342/357.41 |
| 2009/0102709 | A1* | 4/2009 | Bryant | G01S 19/05 342/357.65 |
| 2009/0109088 | A1* | 4/2009 | Bryant | G01S 19/23 342/357.65 |
| 2009/0128403 | A1* | 5/2009 | Bryant | G01S 19/23 342/357.65 |
| 2009/0147835 | A1* | 6/2009 | Hollreiser | G01S 19/37 375/150 |
| 2009/0189808 | A1* | 7/2009 | Chen | G01S 19/29 375/150 |
| 2011/0102258 | A1* | 5/2011 | Underbrink | H04B 1/707 342/357.47 |
| 2011/0261805 | A1* | 10/2011 | Landry | G01S 19/31 375/E1.003 |
| 2012/0249367 | A1* | 10/2012 | Bryant | G01S 19/42 342/357.62 |
| 2016/0299232 | A1* | 10/2016 | Veitsel | G01S 19/33 |

OTHER PUBLICATIONS

The ALMA Correlators Technical details, Performance and Status of the Main Array Correlator by Alain Baudry, University of Bordeaux, LAB and European ALMA Project Office, ESO. (Year: 2010).*

* cited by examiner

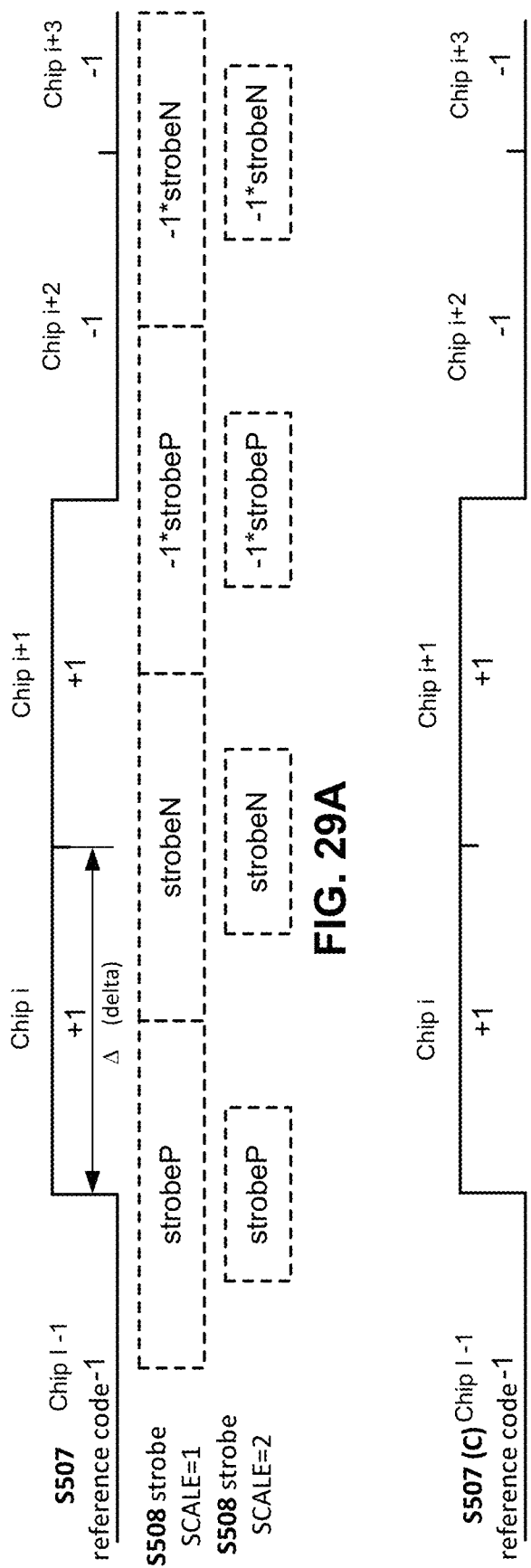
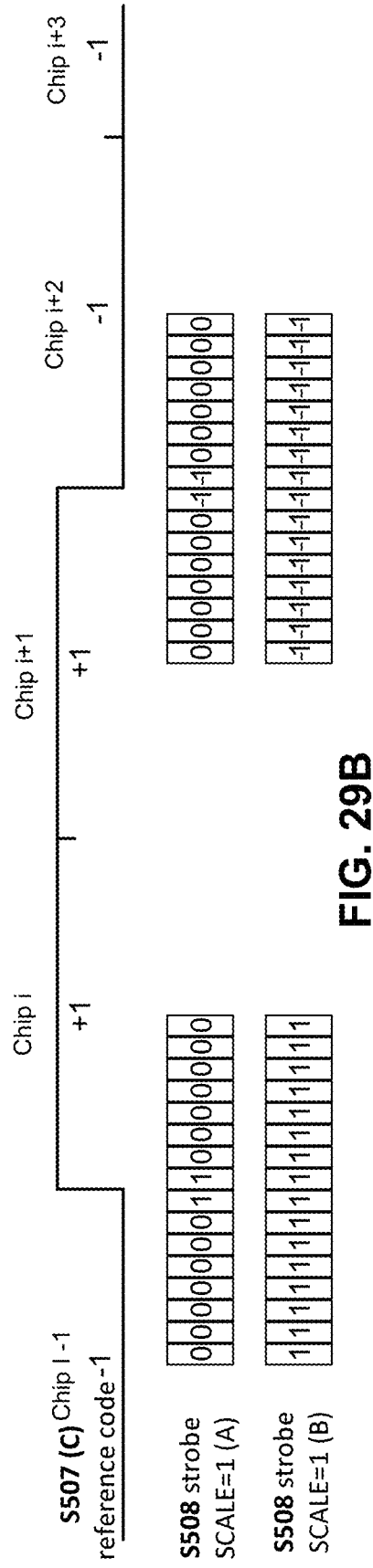
FIG. 29A
FIG. 29B

UNIVERSAL MULTI-CHANNEL GNSS SIGNAL RECEIVER

CROSS REFERENCE TO RELATED APPLICATIONS

This application is a continuation of U.S. patent application Ser. No. 16/143,629, filed on Sep. 27, 2018, which is a continuation in part of U.S. patent application Ser. No. 14/439,271, filed on Apr. 29, 2015, which is a US National Phase of PCT/RU2014/000793, filed on Oct. 21, 2014.

BACKGROUND OF THE INVENTION

Field of the Invention

The present invention is related to signal communication technology, and more particularly, to universal signal receivers for satellite-based navigation systems. The present invention relates to receiver devices and methods of processing signals from multiple navigation satellites and optionally multiple different constellations (GPS, GLONASS and GALILEO).

Description of the Related Art

A wide range of receiving devices is currently used for receiving the signals from the satellite-based navigation systems such as GPS (USA), GLONASS (Russia) and GALILEO (Europe) and others. Each of the navigation systems requires its own type of a receiver based on different types of encoding sequences used.

A conventional signal receiver uses several signal channels. Each channel has its own memory block, and a memory code is stored in this block. This conventional system has a number of disadvantages. In case of a separate memory for each channel, a code sequence has to be written in the memory each time the channel requires a particular memory code.

In case of a separate memory allocated for each channel, the memory code needs to be loaded into each channel memory block for search. Additionally, the memory code length is limited by the allocated memory based on the current code length. If a longer memory code is required, the system will not work.

A conventional receiver and is shown in FIGS. 1A and 1B. These known receivers may be either of minimal version with 4 channels (see FIG. 1A) or of an extended version, with N channels (see FIG. 1B).

Such conventional receivers comprise, as shown in these figures:
- 106—an antenna;
- 105—a radio-frequency section;
- 109—a standard channel;
- 104—an analog-to-digital converter (ADC);
- 108—a CPU;
- 111—a connection module;
- 112—a user.

A receiver with 4 channels (FIG. 1A) is able to process signals coming from 4 satellites, whereas a receiver with N channels (FIG. 1B) is able to process signals coming from N satellites.

Conventional receivers are used as follows:
The satellite signal is transmitted by carrier frequency (e.g., 1.6 GHz-2 GHz, depending on the particular satellite constellation). A signal coming from a satellite is received by the antenna 106, then goes through the radio-frequency section 105, the ADC 104 and is transmitted to the channel 109. The channel 109 processes the signal from ADC 104. The channel 109 is controlled by the CPU 108. The CPU 108 processes data coming from standard channels 109 and sends them to the user 112 through the connection module 111.

Conventional receivers may have channels of either a minimal configuration (see FIG. 2A) or an extended configuration (see FIG. 2B). Shown in FIG. 2A is a diagram of a minimal channel for a conventional receiver. Shown in FIG. 2B is a diagram of an extended channel for a conventional receiver. Channels of conventional receivers may include:
- 200—an input signal switch;
- 201—a intermediate frequency generator (typically, approximately 10-15 MHz, sometimes in a range of 10-20 MHz or up to 30 MHz);
- 202—a code frequency generator;
- 203, 220—a intermediate frequency 90-degrees-phase-shift units;
- 204, 205, 206, 221—multiplier-accumulators (which collectively function as a correlator block, see discussion below);
- 207, 208, 209, 222—channel buffers;
- 210, 223—strobe generators;
- 211—a code generator;
- 213—a modulo 2 addition unit;
- 214—an additional code generator;
- 215—an accumulation period generator;
- S217—code frequency signal;
- S219—accumulation period signal;
- S232—phase frequency code.

While the receiver is functioning, its standard (known) channels 109 must be set up (initialized) to process signals, chosen by the CPU 108. The setup (initialization) of a channel is conducted as follows:
- the output of the necessary ADC 104 is selected by means of the input signal switch 200;
- the necessary intermediate frequency is defined in the intermediate frequency generator 201;
- the necessary code sequence frequency is defined in the code frequency generator 202;
- the code generator 211 is set up;
- strobe generators 210, 223 are set up.
- in case an additional (secondary) code is used, the additional code generator 214 is turned on and set up;
- the accumulation period generator 215 is set up.

Operation of the conventional channel is as follows. After initialization, the CPU 108 is used to start the intermediate frequency generator 201 and the code frequency generator 202. The intermediate frequency generator 201 generates a intermediate frequency phase, which is then shifted by 90 degrees in the intermediate frequency 90-degrees-phase-shift units 203 and 220. The code frequency generator 202 generates a code frequency signal S217.

The accumulation period generator 215 generates an accumulation period signal S219 with code frequency S217. The code generator 211 generates a code sequence with code frequency S217. The additional code generator 214 generates an additional code sequence with code frequency S217. Signals from the code generator 211 and additional code generator 214 are added together modulo to in the modulo 2 addition unit 213. The signal from the modulo 2 addition unit 213 is transmitted to strobe generators 210 and 223 to generate a strobe. Phase frequency code S232 output from code frequency generator 202 is inputted to the strobe generator 210 and 223. Signals from the input signal switch

200, the intermediate frequency generator 201, intermediate frequency 90-degrees-phase-shift units 203 and 220, strobe generators 210 and 223, modulo 2 addition units 213 and 223 are multiplied by each other and accumulated during the accumulation period S219 in multiplier-accumulators 204, 205, 206, 221. Values accumulated during the accumulation period in multiplier-accumulators 204, 205, 206, 221 are then written into channel buffers 207, 208, 209, 222.

When the input signal is processed with the standard channel 109, the following parameters can be changed through the CPU 108, if necessary:
- code frequency and phase in the code frequency generator 202;
- intermediate frequency and phase in the intermediate frequency generator 201;
- the accumulation period in the accumulation period 215;
- strobes in strobe generators 203, 220.

If necessary, the following data are read from the CPU 108:
- the code phase from the code frequency generator 201;
- the intermediate phase from the intermediate frequency generator 202;
- the state of the accumulation period generator 215;
- values from channel buffers 207, 208, 209, 222.

The L1C GSP code sequence generation is shown in FIG. 3. The L1C GPS code sequence is generated from a known LEGENDRE code sequence. This sequence cannot be generated by the code generator. The sequence is 10223 chips of code long. The WEIL sequence is generated from the LEGENDRE sequence by adding two sequences together modulo 2. The first sequence is the original LEGENDRE sequence. The second sequence is generated using the WEIL INDEX. This index points at a chip of code of the LEGENDRE sequence, from which the second sequence starts. WEIL INDEX is defined for each satellite and code number. Both sequences are cyclic, that is, when they reach the chip of code number 10222 of the LEGENDRE sequence, they start to generate from the chip of code number 0 of the LEGENDRE sequence.

After two sequences have been added together modulo 2, the result is a WEIL sequence, which is 10223 chips of code long. In order get a FINAL sequence, an EXPANSION sequence is inserted into the WEIL sequence. The EXPANSION sequence is 0110100. The location of the EXPANSION sequence is determined by the INSERTION INDEX. INSERTION INDEX is defined for each satellite and code number. Afterwards, the FINAL sequence is mixed with a MBOC sequence.

The FINAL sequence is 10230 chip of code long. In order to place a single FINAL sequence, 1.248779296875 Kbytes (10230/8/1024) of memory are needed. In order to receive L1Cp and L1Cd signals from 16 satellites, approximately 40 Kbytes (1.248779296875*2*16) of memory are needed.

Conventional receivers have a number of disadvantages. Each channel of a conventional receiver has its own memory unit used to store the code sequence. When using separate memory units for each channel, a code sequence must be re-stored there each time the channel requires new code sequence. Conventional receivers use one or more channels to search for signal, and thus the code sequence needed should be stored in each memory unit of each channel.

When searching for a signal, a code sequence must be stored in the memory unit for each channel used in search. The memory size in a channel is defined by the known current code sequence length. In case a longer code sequence (which was not known at the moment the receiver was made) needs to be received, the receiver will not be able to function.

Comparing multiple memory cells with a single memory cell of the same type, it can be seen that a single larger memory cell will occupy less space on an ASIC chip.

Accordingly, a universal receiver with a plurality of channels sharing a common memory that can be used with different satellite-based navigation systems is desired.

SUMMARY OF THE INVENTION

The present invention is intended as system for receiving signals from different satellite-based navigation systems that substantially obviates one or several of the disadvantages of the related art.

In one aspect of the invention, a system for receiving the signals from the satellite-based navigation systems, such as GPS (USA), GLONASS (Russia) and GALILEO (Europe), is provided. The system can also be used for receiving pseudo-noise (PN) signals employed for various purposes.

According to an exemplary embodiment, a universal signal receiver can receive and process different signals from global navigation system GPS, GLONASS and GALILEO using a universal navigation channel. A universal channel has the same structure regardless of the navigation system used. The receiver has a plurality of signal channels that use the same memory.

Additional features and advantages of the invention will be set forth in the description that follows, and in part will be apparent from the description, or may be learned by practice of the invention. The advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE ATTACHED FIGURES

The accompanying drawings, which are included to provide a further understanding of the invention and are incorporated in and constitute a part of this specification, illustrate embodiments of the invention and, together with the description, serve to explain the principles of the invention.

In the drawings:

FIGS. 29A-29D illustrate the strobe generator and its operation.

DETAILED DESCRIPTION OF THE PREFERRED EMBODIMENTS

Reference will now be made in detail to the preferred embodiments of the present invention, examples of which are illustrated in the accompanying drawings.

According to the exemplary embodiment, a universal receiver for receiving and processing signals from different navigation systems is provided. In one aspect, the universal receiver is implemented as an ASIC receiver with a number of universal channels. The receiver with universal channels is capable of receiving and processing signals from navigation satellites located within a direct access zone. The receiver has a plurality of channels that share the same memory. According to the exemplary embodiment, the receiver can determine its coordinates using all existing navigation systems (GPS, GLONASS and GALILEO).

The present invention eliminates disadvantages of known solutions because all channels of the receiver utilize a common memory. The present receiver may have a FIFO module or a dual-ported memory.

As discussed in further detail below, navigation signals from satellites can be processed using the proposed receivers and processing methods. A navigation signal receiver may have the following embodiments:
  minimal embodiment (4 channels), with FIFO module;
  extended embodiment (N channels), with FIFO module;
  minimal embodiment (4 channels), with dual-ported memory;
  extended embodiment (N channels), with dual-ported memory;

The proposed modified channels of the navigation signal receiver may have the following embodiments:
  channel for the present invention, minimal embodiment;
  channel for the present invention, extended embodiment;
  channel for the present invention, extended embodiment, with chip of code frequency divider;
  channel for the present invention, extended embodiment, for L1C GPS signal processing.

Other modules utilized in the invention include:
  request generation module and method of its usage;
  request processing module with dual-ported memory and method of its usage;
  request processing module with FIFO module and method of its usage;
  method of memory card formation.

In a design with the FIFO module, there are two possible configurations:
  a minimal one (with 4 channels)
  an extended one (with N channels).

Figure 1A:
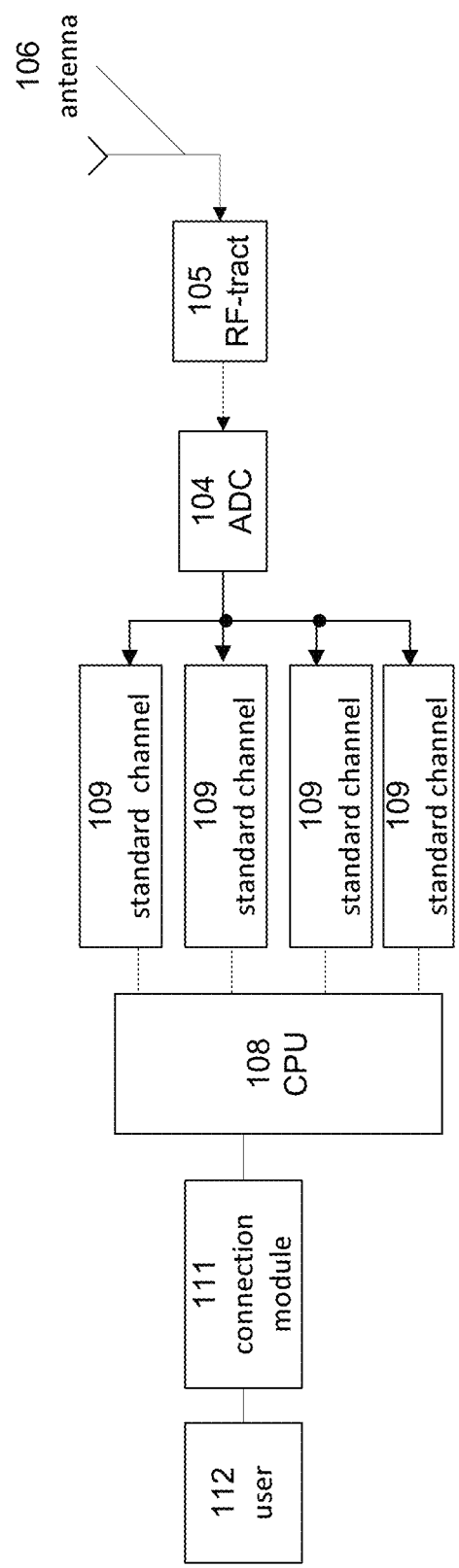
FIG. 1A shows a diagram of the minimal embodiment (4 channels) for a conventional receiver.
Figure 1B:
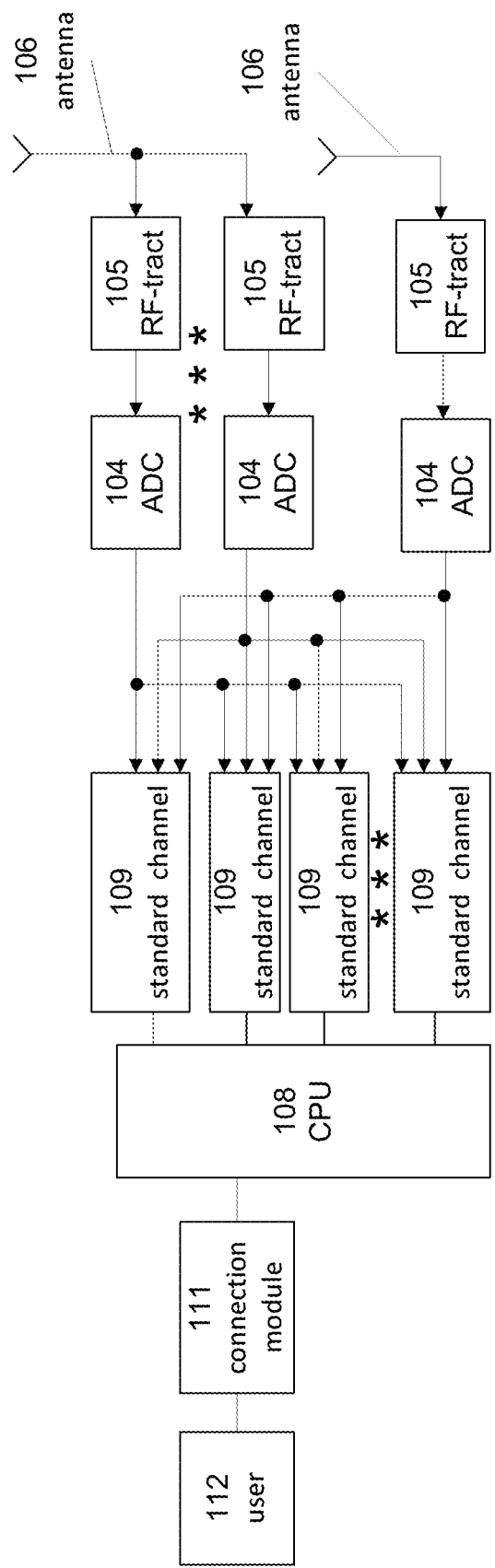
FIG. 1B shows a diagram of the extended embodiment (N channels) for a conventional receiver.
Figure 1C:
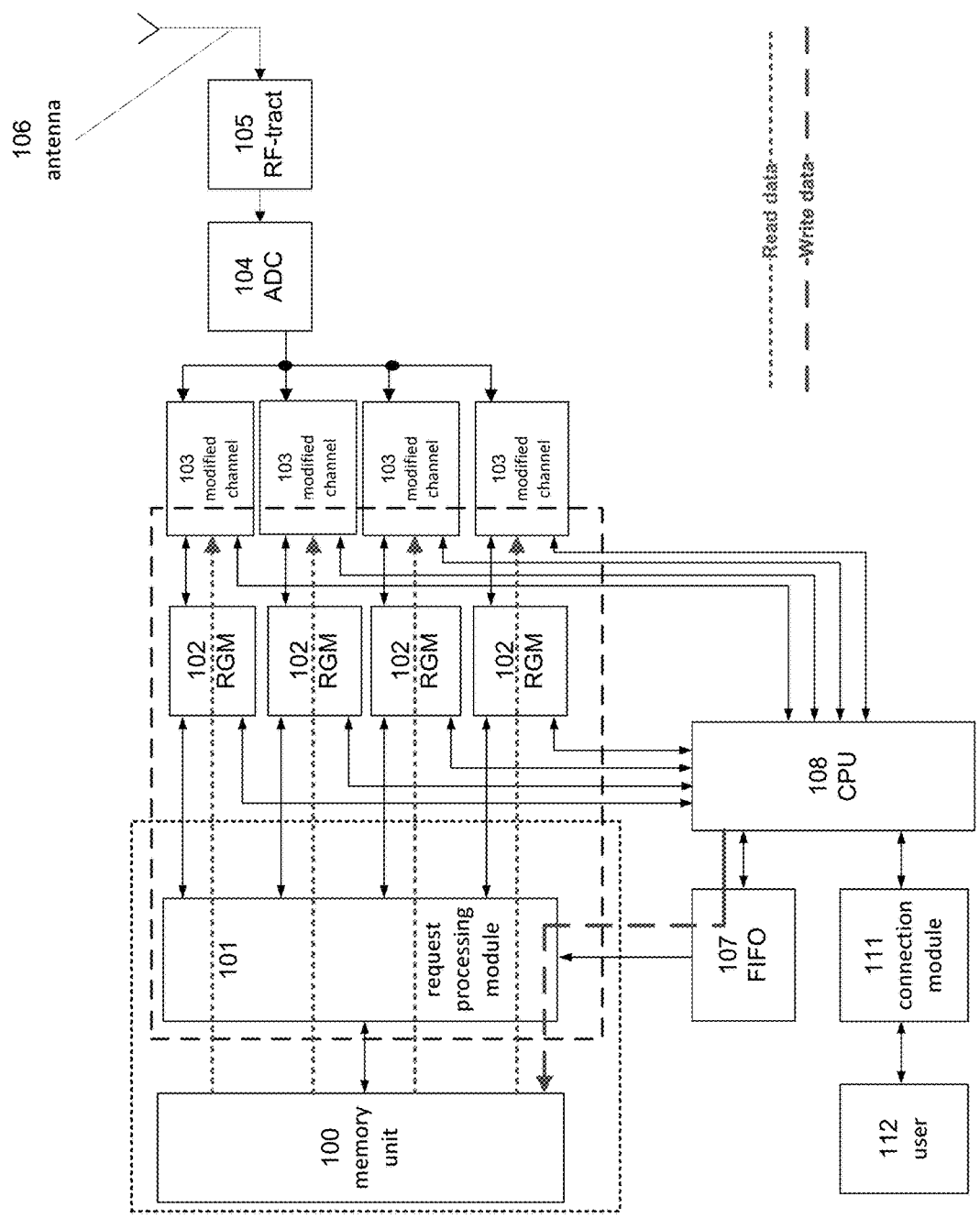
FIG. 1C shows a diagram of the minimal embodiment (4 channels) for the present receiver, with a FIFO module.

The FIFO module, minimal configuration (connection) is shown in FIG. 1C. In the figure:
  100—memory unit;
  101—request processing module;
  102—request generation module (RGM);
  103—modified channel;
  107—FIFO module.

A minimal embodiment of the receiver with the FIFO module and 4 channels includes the following:
  the antenna 106 is connected to the radio-frequency section 105;
  the radio-frequency section 105 is connected to the ADC 104;
  the ADC 104 is connected to modified channels 103;
  modified channels 103 are connected to request generation modules (RGM) 102
  request generation modules (RGM) 102 are connected to the request processing module 101;
  the request processing module 101 is connected to the memory unit 100 and FIFO module 107;
  the FIFO module 107 is connected to the CPU 108;
  the CPU 108 is connected to request generation modules (RGM) 102 and modified channels 103;
  the CPU 108 is connected to the communication module 111;
  the communication module 111 is connected to the user 112.

Figure 1D:
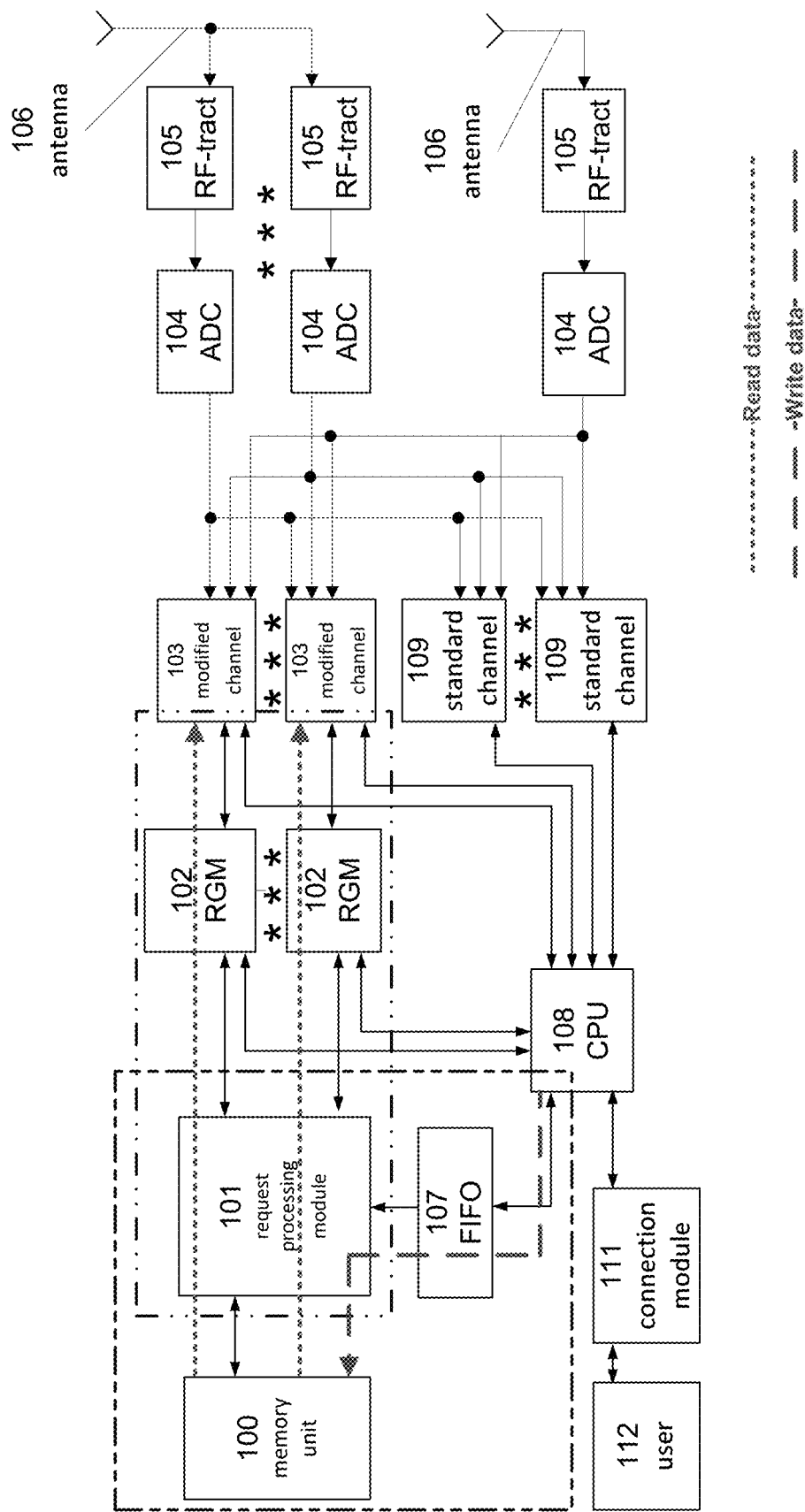
FIG. 1D shows a diagram of the extended embodiment (N channels) for the present receiver, with a FIFO module.

A design with a FIFO module, and an extended configuration (N channel connection) is shown in FIG. 1D. The extended embodiment of the receiver with the FIFO module and N channels includes:
  antennas 106 are connected to radio-frequency sections 105;
  radio-frequency sections 105 are connected to ADCs 104;

ADCs 104 are connected to modified channels 103 and standard channels 109;

modified channels 103 are connected to request generation modules (RGM) 102 request generation modules (RGM) 102 are connected to the request processing module 101;

the request processing module 101 is connected to the memory unit 100 and FIFO module 107;

the FIFO module 107 is connected to the CPU 108;

the CPU 108 is connected to request generation modules (RGM) 102 and modified channels 103;

the CPU 108 is connected to standard channels 109;

the CPU 108 is connected to the communication module 111;

the communication module 111 is connected to the user 112.

A version of the design with dual-ported memory has two possible configurations:

a minimal one (with 4 channels);

an extended one (with N channels).

Figure 1E:
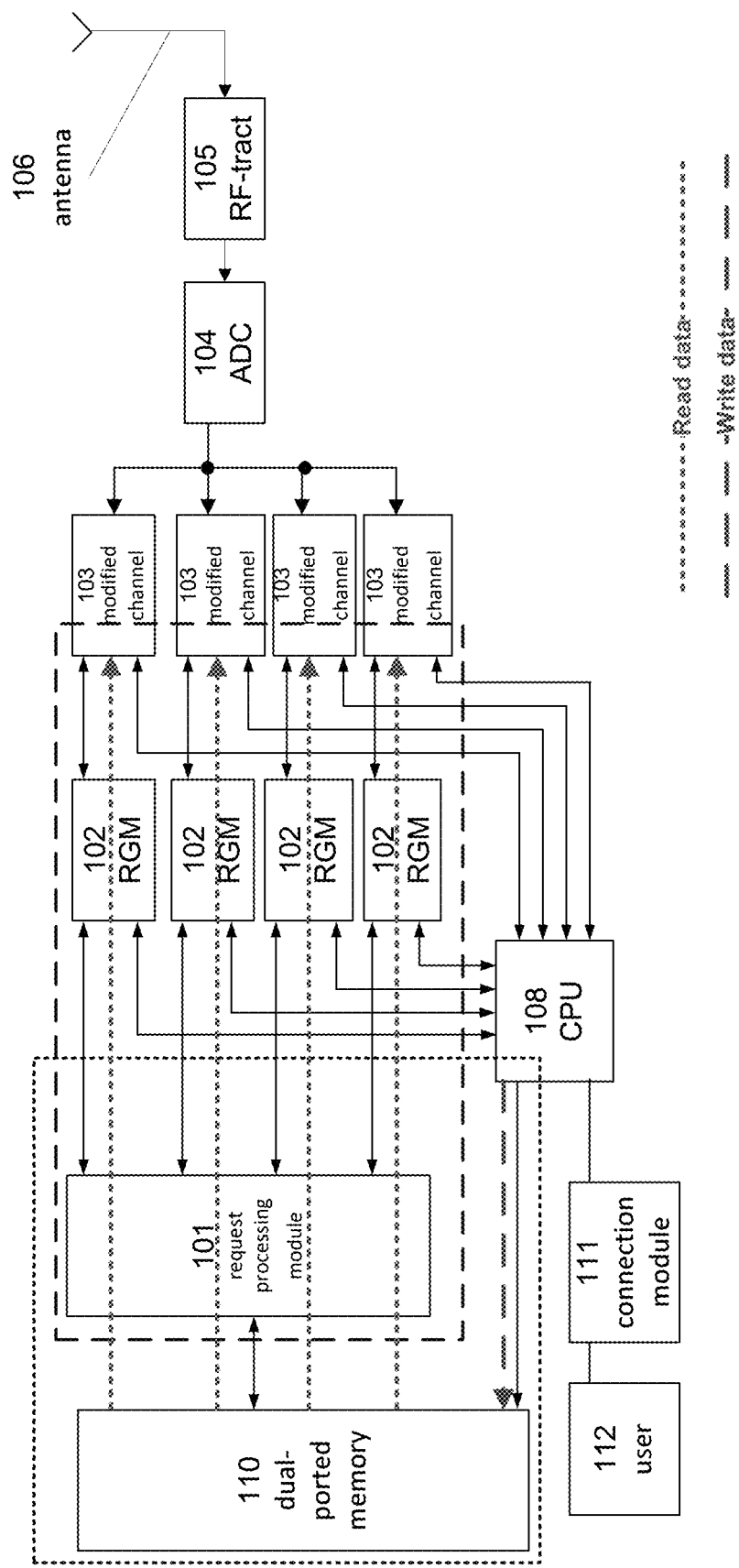
FIG. 1E shows a diagram of the minimal embodiment (4 channels) for the present receiver, with dual-ported memory.

The design with dual-ported memory, minimal configuration (connection) is shown in FIG. 1E, where 110 designates dual-ported memory, and the other components are as discussed above). A minimal embodiment of the receiver with the dual-ported memory and 4 channels includes:

the antenna 106 is connected to the radio-frequency section 105;

the radio-frequency section 105 is connected to the ADC 104;

the ADC 104 is connected to modified channels 103.

Modified channels 103 are connected to request generation modules (RGM) 102 as follows:

request generation modules (RGM) 102 are connected to the request processing module 101;

the request processing module 101 is connected to the dual-ported memory 110;

the dual-ported memory 110 is connected to the CPU 108;

the CPU 108 is connected to the request generation module (RGM) 102 and modified channels 103;

the CPU 108 is connected to the communication module 111;

the communication module 111 is connected to the user 112.

Figure 1F:
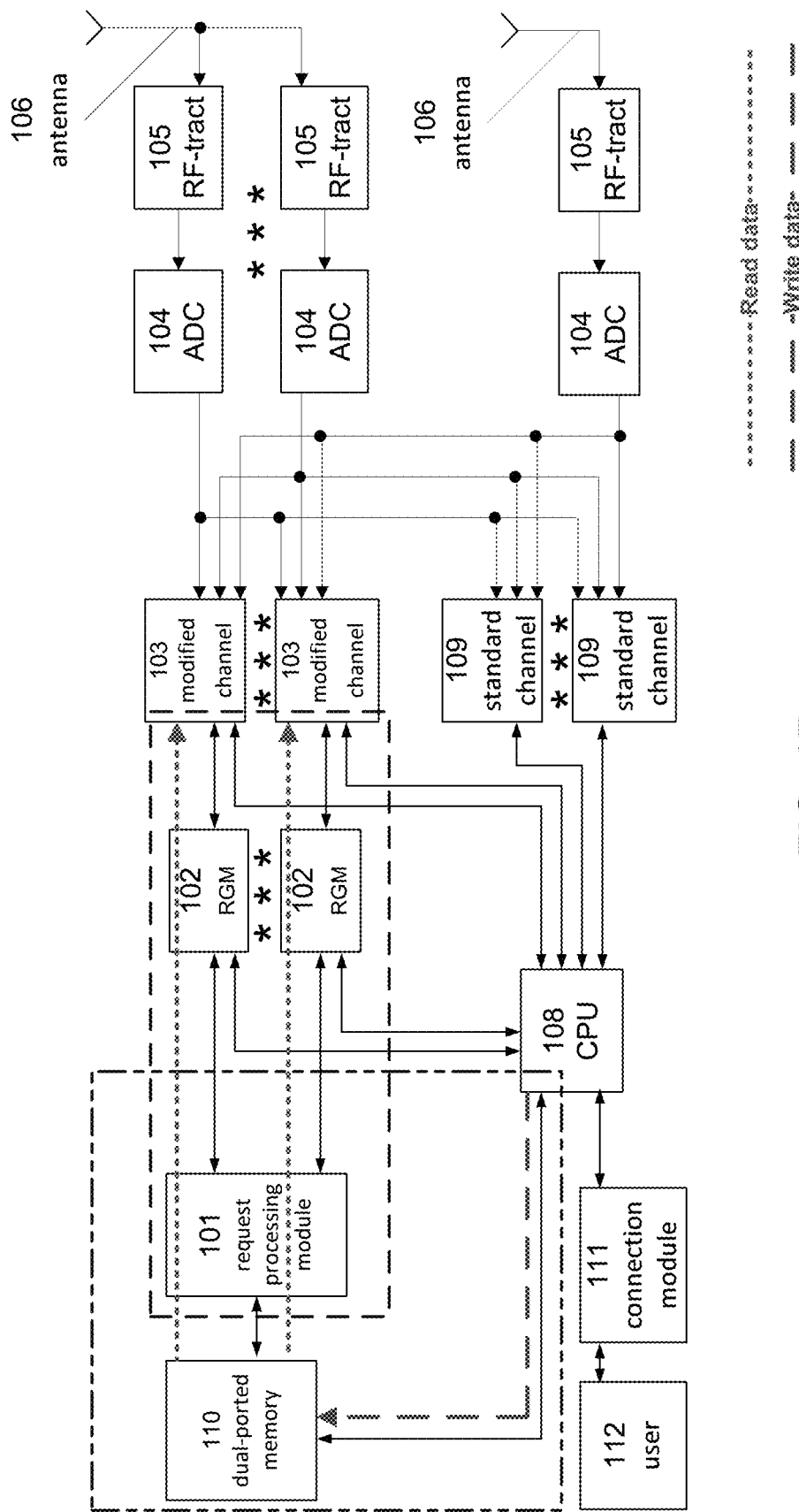
FIG. 1F shows a diagram of the extended embodiment (N channels) for the present receiver, with dual-ported memory.

An extended configuration of the design with dual-ported memory, extended configuration is shown in FIG. 1F. This embodiment of the receiver with the dual-ported memory and N channels includes, as shown in the figure:

antennas 106 are connected to radio-frequency sections 105;

radio-frequency sections 105 are connected to ADCs 104;

ADCs 104 are connected to modified channels 103 and standard channels 109;

modified channels 103 are connected to request generation modules (RGM) 102 request generation modules (RGM) 102 are connected to the request processing module 101;

the request processing module 101 is connected to the dual-ported memory 110;

the dual-ported memory 110 is connected to the CPU 108;

the CPU 108 is connected to request generation modules (RGM) 102 and modified channels 103;

the CPU 108 is connected to standard channels 109;

the CPU 108 is connected to the communication module 111;

the communication module 111 is connected to the user 112.

Figure 2A:
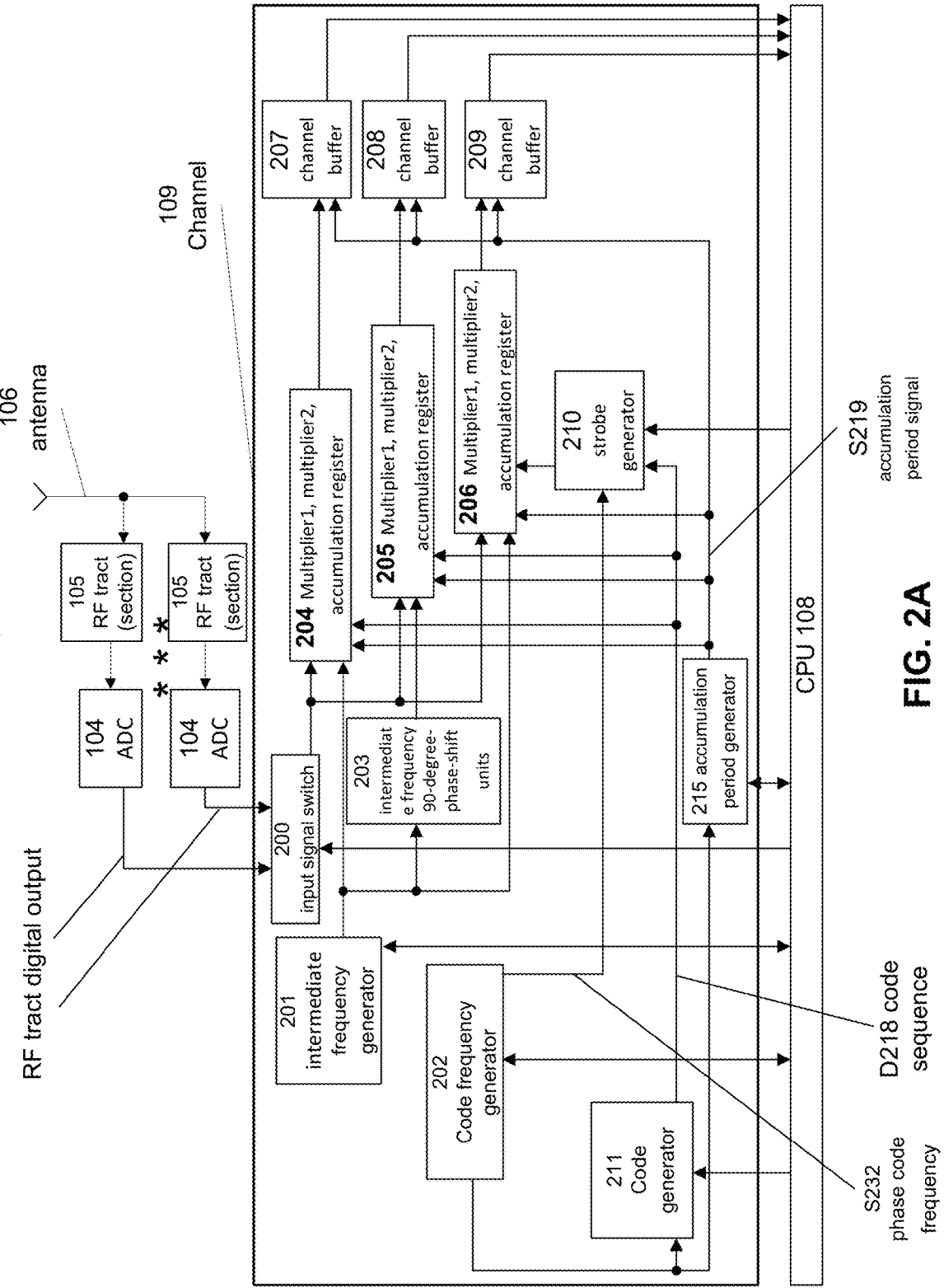
FIG. 2A shows a diagram of a minimal channel for a known (conventional) receiver.
Figure 2B:
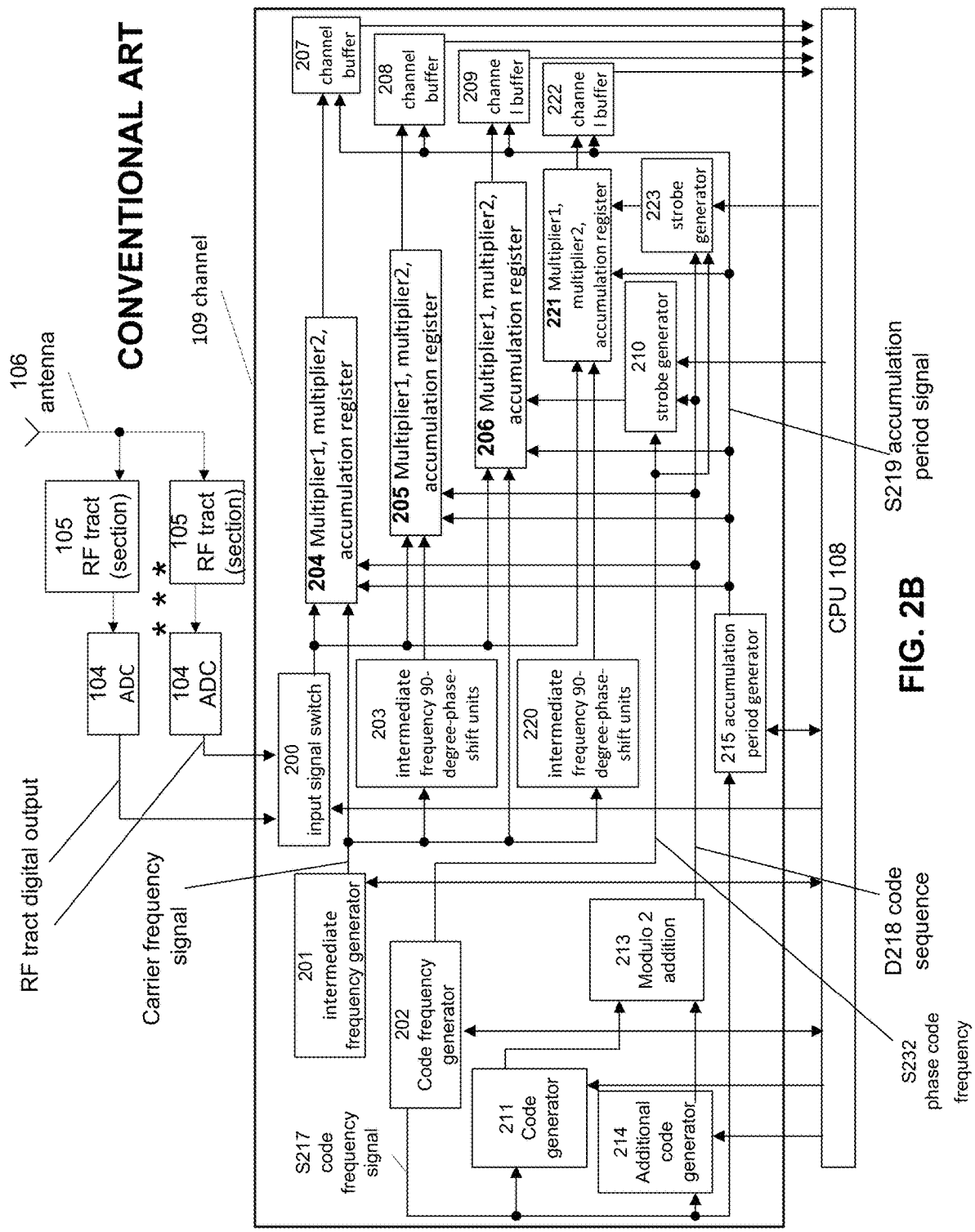
FIG. 2B shows a diagram of an extended channel for a known (conventional) receiver.
Figure 2C:
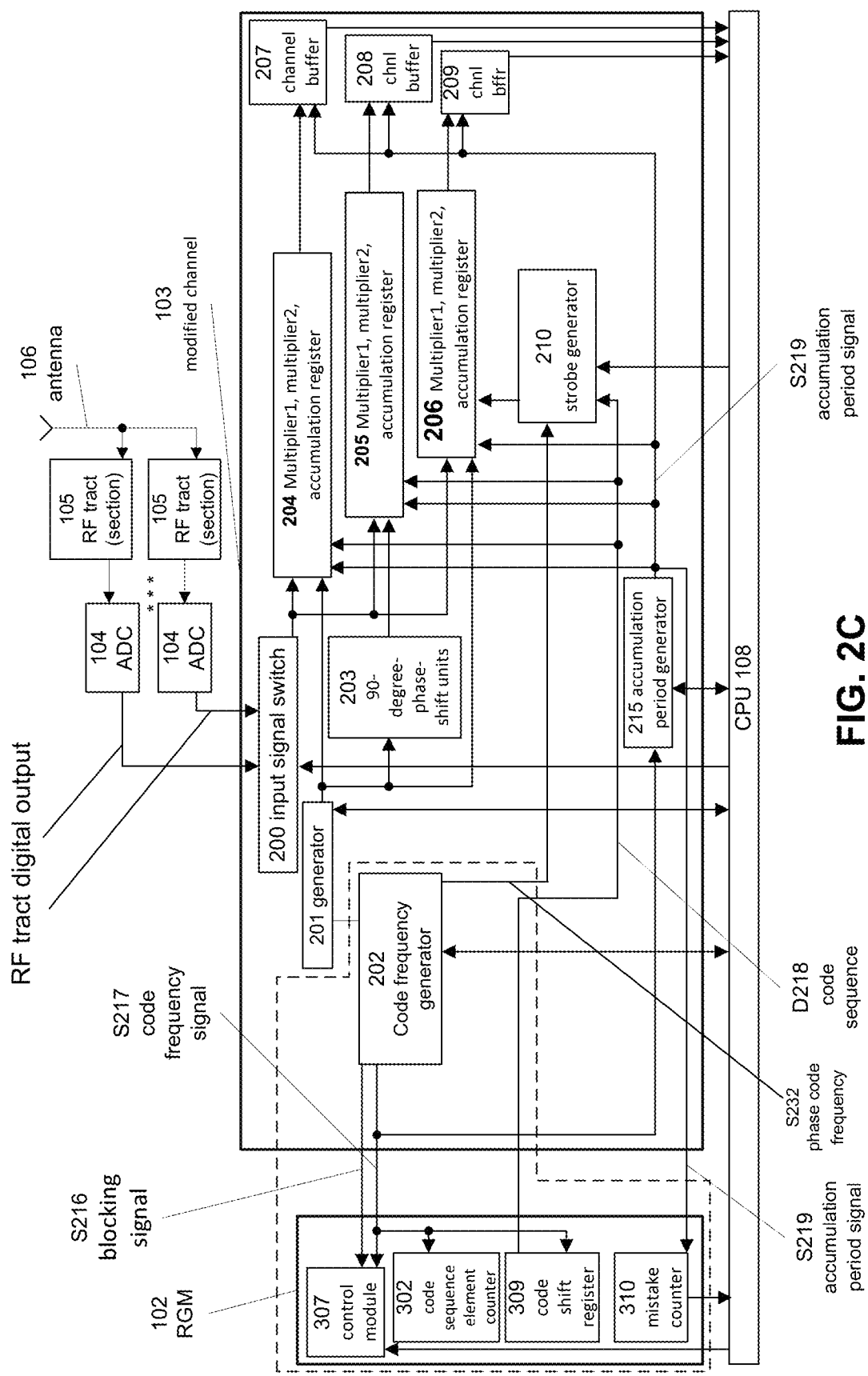
FIG. 2C shows a diagram of a minimal channel for the present (new) receiver.

The modified channel of the present invention can be either of minimal type or of extended type. The minimal channel of the receiver is shown in FIG. 2C. In the figure:

S216—blocking signal;

D218—memory code;

302—code sequence element counter;

307—control module;

309—code shift register;

310—mistake counter;

In the minimal type of the channel (see FIG. 2C), the components are connected as follows:

The input signal switch 200 is connected to the ADC 104, multiplier-accumulators 204, 205, 206 and the CPU 108. The intermediate frequency (intermediate frequency—IF) generator 201 is connected to multiplier-accumulators 204, 206, the intermediate frequency (IF) 90-degrees-phase-shift unit 203 and the CPU 108.

The intermediate frequency (IF) 90-degrees-phase-shift unit 203 is connected to the multiplier-accumulator 205. The code frequency generator 202 is connected to the accumulation period generator 215, control module 307 in the request generation module (RGM) 102, code sequence element counter 302 in the request generation module (RGM) 102, code shift register 309 in the request generation module (RGM) 102, and the CPU 108.

The accumulation period generator 215 is connected to the mistake counter 310 in the request generation module (RGM) 102, multiplier-accumulators 204, 205, 206, channel buffers 207, 208, 209 and the CPU 108. Multiplier-generators 204, 205 are connected to the code shift register 309 in the request generation module (RGM) 102.

The strobe generator 210 is connected to the code shift register 309 in the request generation module (RGM) 102, multiplier-accumulator 206 and the CPU 108. Multiplier-accumulators 204, 205, 206 are connected to channel buffers 207, 208, 209. Channel buffers 207, 208, 209 are connected to the CPU 108.

Figure 2D:
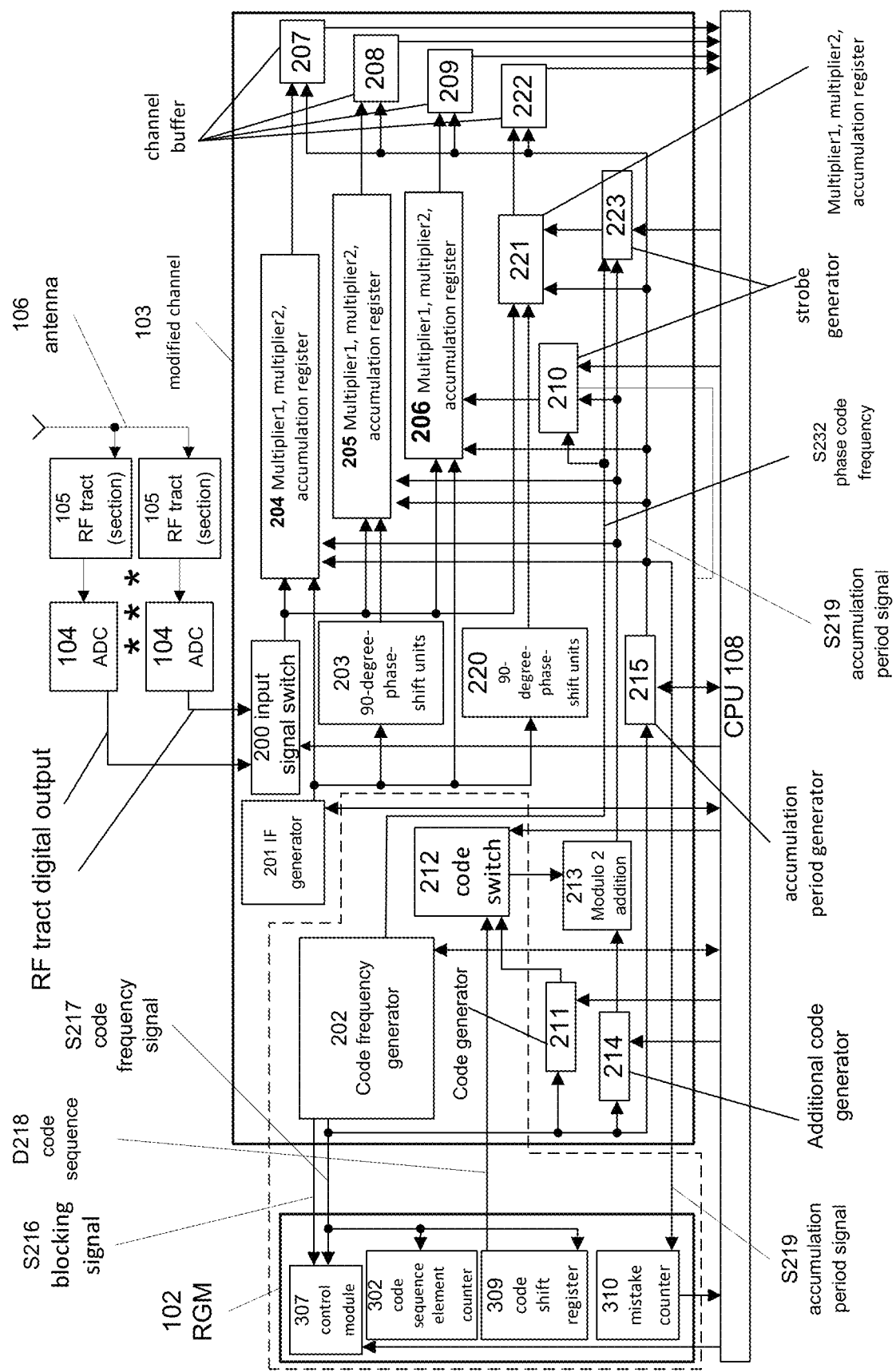
FIG. 2D shows a diagram of an extended channel for the present receiver.

An extended channel of the receiver is shown in FIG. 2D. In the figure, 212 is the code switch, and other components are as described above. The components are connected as follows:

The input signal switch 200 is connected to the ADC 104, multiplier-accumulators 204, 205, 206 and 221, and the CPU 108. The intermediate frequency (IF) generator 201 is connected to multiplier-accumulators 204, 206, the intermediate frequency (IF) 90-degrees-phase-shift units 203, 220 and the CPU 108.

The intermediate frequency (IF) 90-degrees-phase-shift units 203 and 220 are connected to the multiplier-accumulators 205 and 221 respectively. The code frequency generator 202 is connected to the code generator 211, additional code generator 214, accumulation period generator 215, control module 307 in the request generation module (RGM) 102, code sequence element counter 302 in the request generation module (RGM) 102, code shift register 309 in the request generation module (RGM) 102, and the CPU 108.

The code generator 211 is connected to the code switch 212 and the CPU 108. The additional code generator 214 is connected to the modulo 2 addition unit 213 and the CPU 108. The code switch 212 is connected to the code shift register 309 in the request generation module (RGM) 102, modulo 2 addition unit and 213 and the CPU 108.

The accumulation period generator 215 is connected to the mistake counter 310 in the request generation module (RGM) 102, multiplier-accumulators 204, 205, 206, 221, channel buffers 207, 208, 209, 222 and the CPU 108. Modulo 2 addition unit 213 is connected to multiplier-accumulators 204, 205 and strobe generators 210, 223. The phase frequency code S232 is outputted from code frequency generator 202 to the strobe generator 210 and 223.

Strobe generators 210, 223 are connected to multiplier-accumulators 206, 221 and the CPU 108. Multiplier-accumulators 204, 205, 206, 221 are connected to channel buffers 207, 208, 209, 222. Channel buffers 207, 208, 209, 222 are connected to the CPU 108.

Figure 2E:
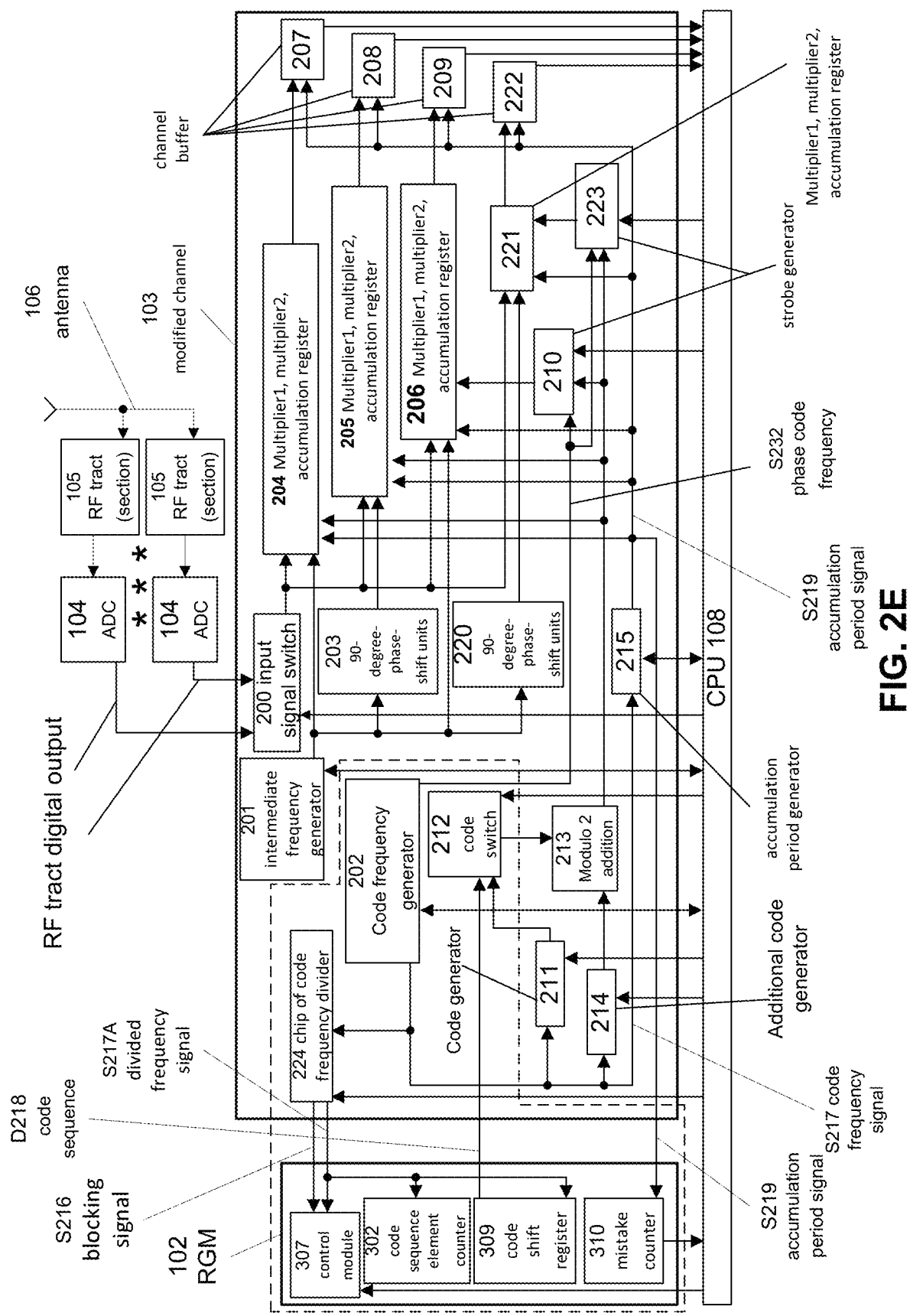
FIG. 2E shows a diagram of an extended channel for the present receiver with chip of code frequency divider.

As another embodiment, an extended channel for the receiver with chip of code frequency divider is shown in FIG. 2E, where 224 is the chip of code frequency divider, and S217A is the divided frequency signal of chip of code. The components are connected as follows:

The input signal switch 200 is connected to the ADC 104, multiplier-accumulators 204, 205, 206 and 221, and the CPU 108. The intermediate frequency (IF) generator 201 is connected to multiplier-accumulators 204, 206, the intermediate frequency (IF) 90-degrees-phase-shift units 203, 220 and the CPU 108. The intermediate frequency (IF) 90-degrees-phase-shift units 203 and 220 are connected to the multiplier-accumulators 205 and 221 respectively.

The code frequency generator 202 is connected to the code generator 211, additional code generator 214, accumulation period generator 215, control module 307 in the request generation module (RGM) 102, code sequence element counter 302 in the request generation module (RGM) 102, code shift register 309 in the request generation module (RGM) 102, the chip of code frequency divider 224 and the CPU 108.

The chip of code frequency divider 224 is connected to the control module 307 in the request generation module (RGM) 102, code sequence element counter 302 in the request generation module (RGM) 102, code shift register 309 in the request generation module (RGM) 102, and the CPU 108. The code generator 211 is connected to the code switch 212 and the CPU 108. The additional code generator 214 is connected to the modulo 2 addition unit 213 and the CPU 108.

The code switch 212 is connected to the code shift register 309 in the request generation module (RGM) 102, modulo 2 addition unit and 213 and the CPU 108. The accumulation period generator 215 is connected to the mistake counter 310 in the request generation module (RGM) 102, multiplier-accumulators 204, 205, 206, 221, channel buffers 207, 208, 209, 222 and the CPU 108. Modulo 2 addition unit 213 is connected to multiplier-accumulators 204, 205 and strobe generators 210, 223. The phase frequency code S232 is outputted from code frequency generator 202 to the strobe generator 210 and 223. Strobe generators 210, 223 are connected to multiplier-accumulators 206, 221 and the CPU 108.

Multiplier-accumulators 204, 205, 206, 221 (which collectively function as a correlator block) are connected to channel buffers 207, 208, 209, 222. Channel buffers 207, 208, 209, 222 are connected to the CPU 108.

Figure 2F:
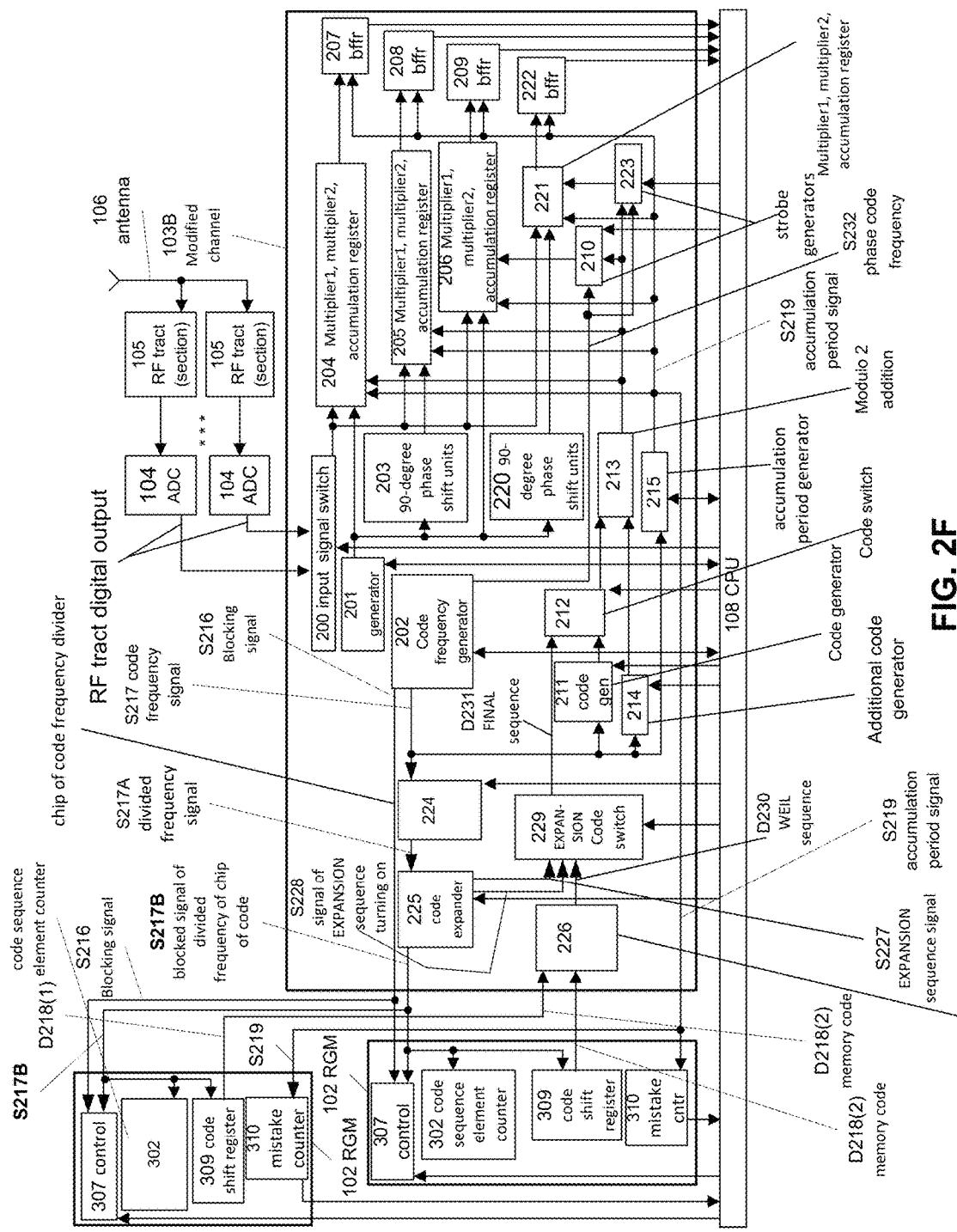
FIG. 2F shows an extended channel for L1C GPS signal processing.
Figure 3:
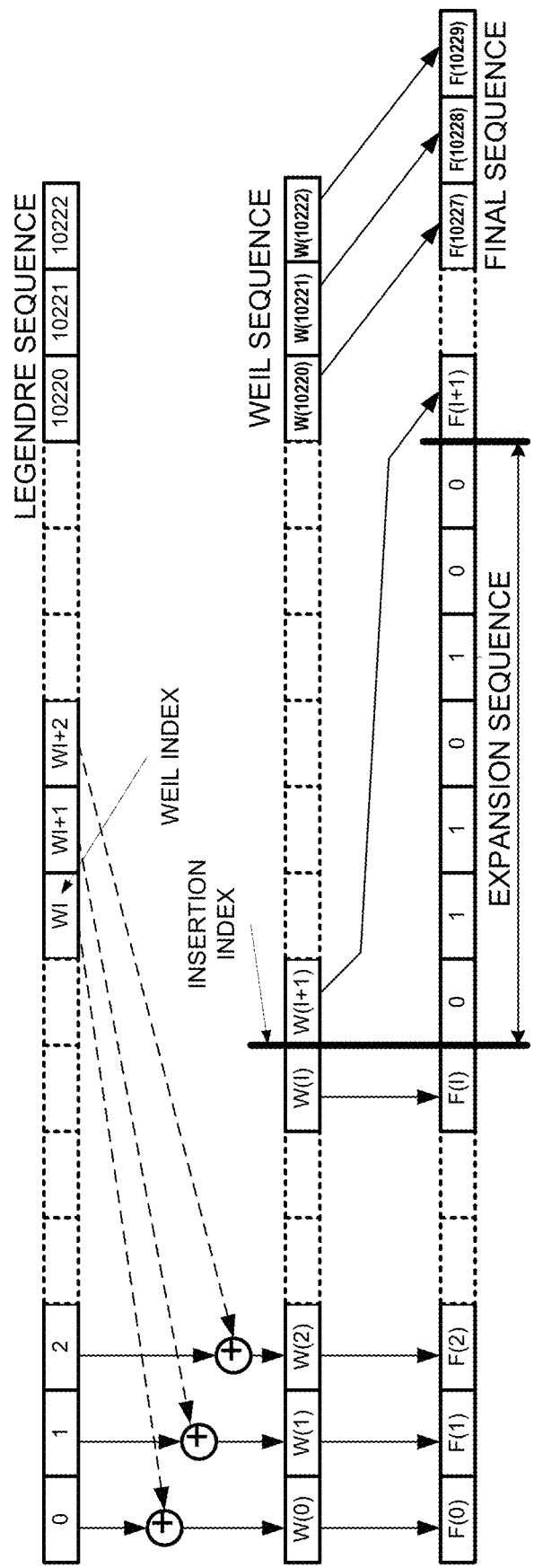
FIG. 3 shows generation of a L1C GPS code sequence.

An extended channel for the receiver for processing L1C GPS is shown in FIG. 2F. In the figure:
S217B—blocked signal of divided frequency of chip of code.
225—code expander;
226—modulo 2 addition module;
S227—EXPANSION sequence signal;
S228—signal of EXPANSION sequence turning on;
229—EXPANSION code switch;
D230—WEIL sequence;
D231—FINAL sequence.

The components are connected as follows:

The input signal switch 200 is connected to the ADC 104, multiplier-accumulators 204, 205, 206 and 221, and the CPU 108. The intermediate frequency (IF) generator 201 is connected to multiplier-accumulators 204, 206, the intermediate frequency (IF) 90-degrees-phase-shift units 203, 220 and the CPU 108. The intermediate frequency (IF) 90-degrees-phase-shift units 203 and 220 are connected to the multiplier-accumulators 205 and 221 respectively.

The code frequency generator 202 is connected to the code generator 211, additional code generator 214, accumulation period generator 215, control modules 307 in the request generation modules (RGM) 102(1), 102(2), code sequence element counters 302 in the request generation modules (RGM) 102(1), 102(2), code shift registers 309 in the request generation modules (RGM) 102(1), 102(2), the chip of code frequency divider 224 and the CPU 108. The phase frequency code S232 is outputted from code frequency generator 202 to the strobe generator 210 and 223.

The chip of code frequency divider 224 is connected to the code expander 225 and the CPU 108. The code expander 225 Is connected to control modules 307 in request generation modules (RGM) 102(1), 102(2), code sequence element counters 302 in request generation modules (RGM) 102(1), 102(2), code shift registers 309 in request generation modules (RGM) 102(1), 102(2), EXPANSION code switch 229, and the CPU 108.

The code generator 211 is connected to the code switch 212 and the CPU 108. The additional code generator 214 is connected to the modulo 2 addition unit 213 and the CPU 108. The EXPANSION code switch 229 is connected to the code switch 212 and the CPU 108. The code switch 212 is connected to modulo 2 addition unit and 213 and the CPU 108. The modulo 2 addition module 226 is connected to code shift registers 309 in request generation modules (RGM) 102(1), 102(2) and the EXPANSION code switch 229.

The accumulation period generator 215 is connected to mistake counters 310 in the request generation modules (RGM) 102(1), 102(2), multiplier-accumulators 204, 205, 206, 221, channel buffers 207, 208, 209, 222 and the CPU 108. Modulo 2 addition unit 213 is connected to multiplier-accumulators 204, 205 and strobe generators 210, 223. Strobe generators 210, 223 are connected to multiplier-accumulators 206, 221 and the CPU 108. Multiplier-accumulators 204, 205, 206, 221 are connected to channel buffers 207, 208, 209, 222. Channel buffers 207, 208, 209, 222 are connected to the CPU 108.

Figure 4:
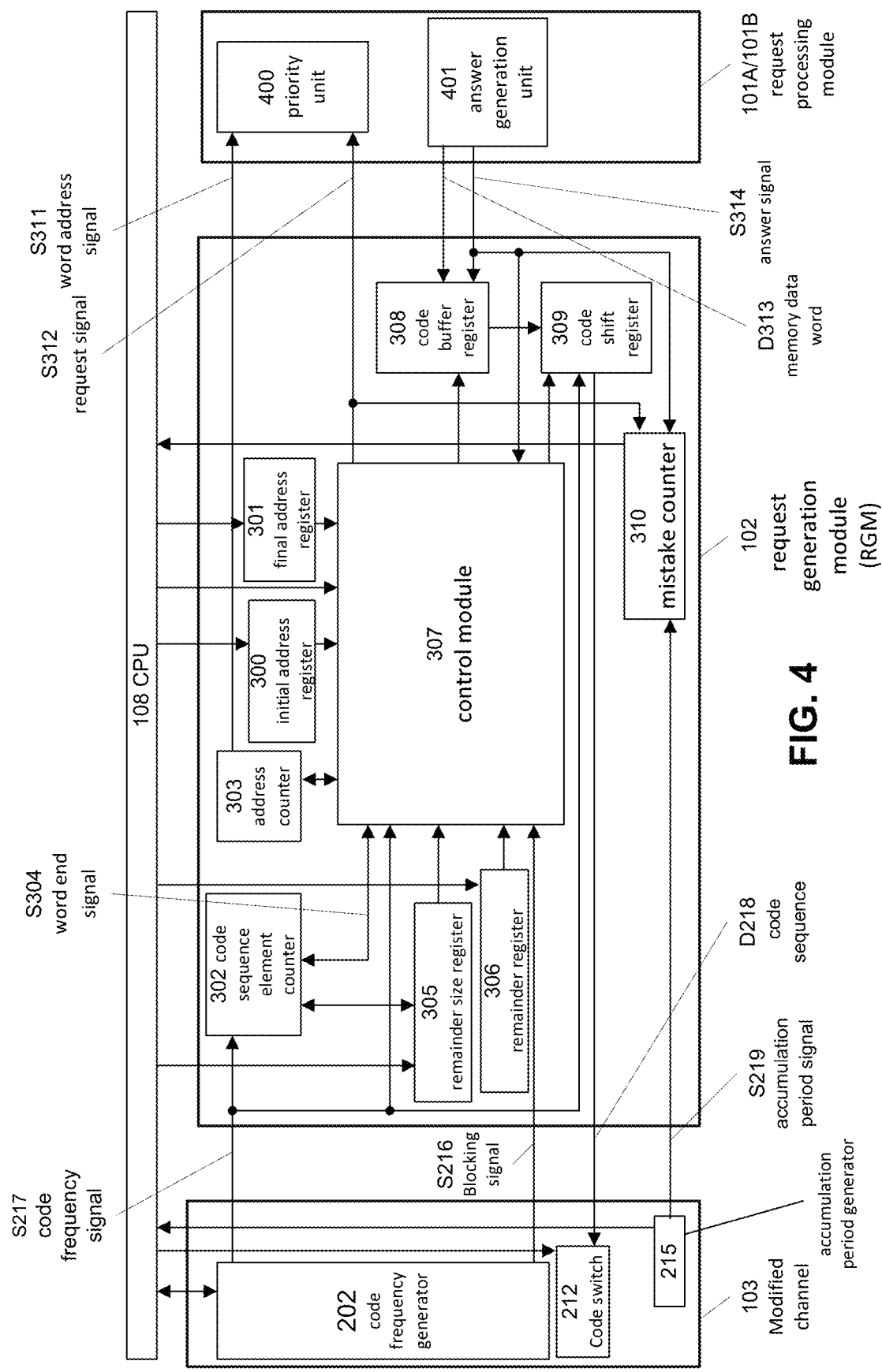
FIG. 4 shows a diagram of the request generation module (RGM).

FIG. 4 shows a diagram of the Request Generation Module. In the figure:
300—initial address register;
301—final address register;
302—code sequence element counter;
303—address counter;
S304—word end signal;
305—remainder size register;
306—remainder register;
307—control module;
308—code buffer register;
309—code shift register;
310—mistake counter;
S311—word address signal;
S312—request signal;
D313—memory data word;
S314—answer signal;
400—priority unit;
401—answer generation unit.

An exemplary embodiment of the request generation module (RGM) for the present receiver (see FIG. 4) has components connected as follows:

The initial address register 300 is connected to the control module 307 and the CPU 108. The final address register is connected to the control module 307 and the CPU 108. The control module 307 is connected to the address counter 303, code sequence element counter 302, remainder size register 305, remainder register 306, code buffer register 308, code shift register 309, code frequency generator 202 in the channel 103, priority unit 400 in the request processing module 101A (101B), answer generation unit 401 in the request processing module 101A (101B), and the CPU 108.

The address counter 303 is connected to the priority unit 400 in the request processing module 101A (101B). The code sequence element counter 302 is connected to the remainder size register 305 and code frequency register 202 in the channel 103. Remainder size register 305 is connected to the CPU 108.

Remainder register 306 is connected to the CPU 108. Code buffer register 308 is connected to the answer generating unit 401 in the request processing module 101A (101B) and the code shift register 309. Code shift register 309 is connected to the code frequency generator 202 in the channel 103 and code switch 212 in the channel 103. Mistake counter 310 is connected to the control module 307, answer generating unit 401 in the request processing module 101A (101B), accumulation period generator 215 in the channel 103 and the CPU 108.

Figure 5:
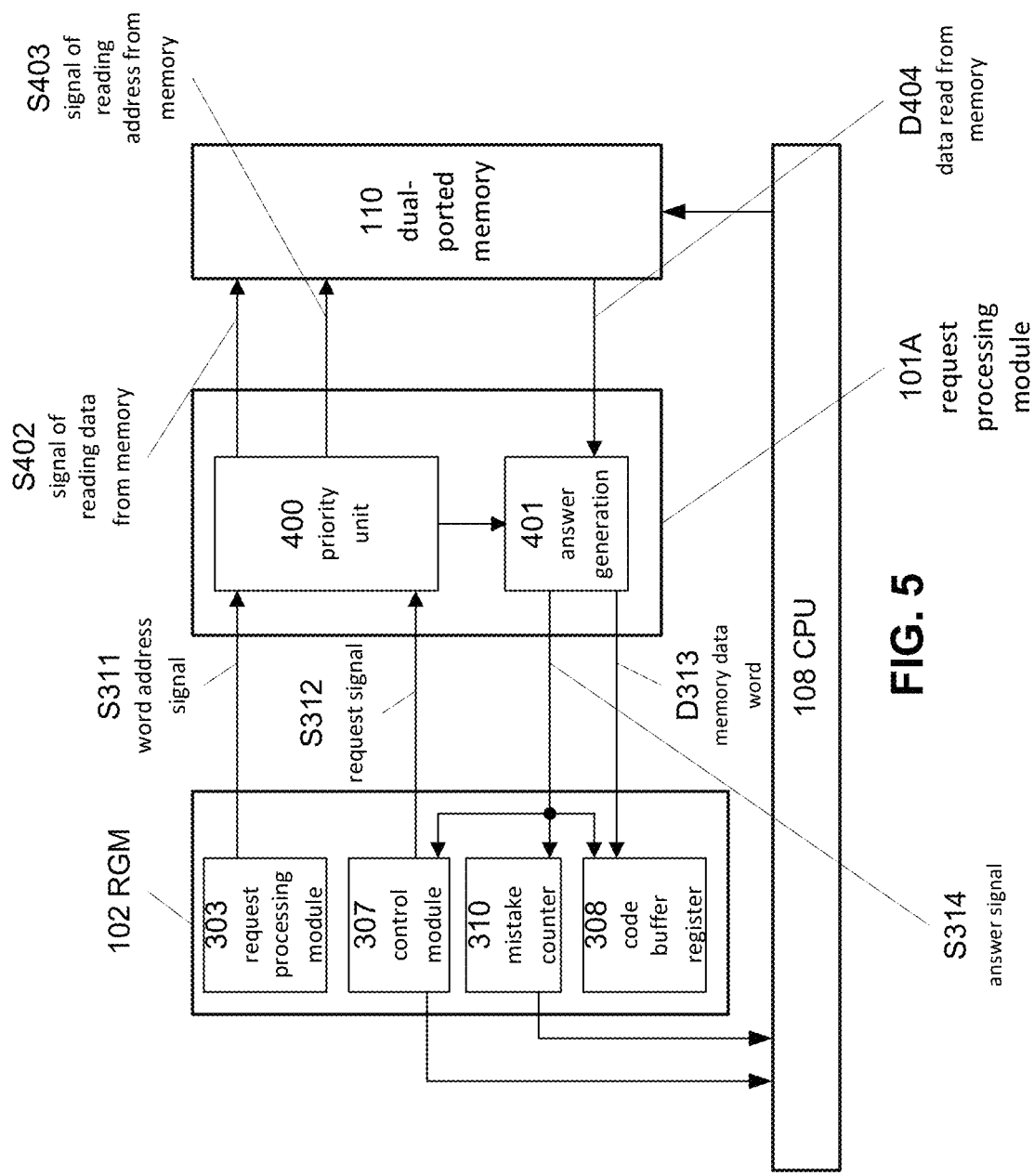
FIG. 5 shows a request processing module, with dual-ported memory.

There are two possible embodiments of the request processing module for the present receiver: a dual-ported memory queue and a FIFO-queue. FIG. 5 illustrates the first version of the Request processing module with dual ported memory. In the figure:

400—priority unit;
401—answer generation unit;
S402—signal of reading data from memory;
S403—signal of reading address from memory;
D404—data read from memory.

If the request processing module is made with dual-ported memory, as shown in FIG. 5, the components are connected as follows:

The priority unit 400 is connected to the answer generating unit 401, dual-ported memory 110, address counter 303 in the request generation module (RGM) 102, and the control module 307. The answer generating unit 401 is connected to the dual-ported memory 110, control module 307 in the request generation module 102, mistake counter 310 in the request generation module 102, and code buffer register 308 in the request generation module (RGM) 102. The dual-ported memory 110 is connected to the CPU 108.

Figure 6:
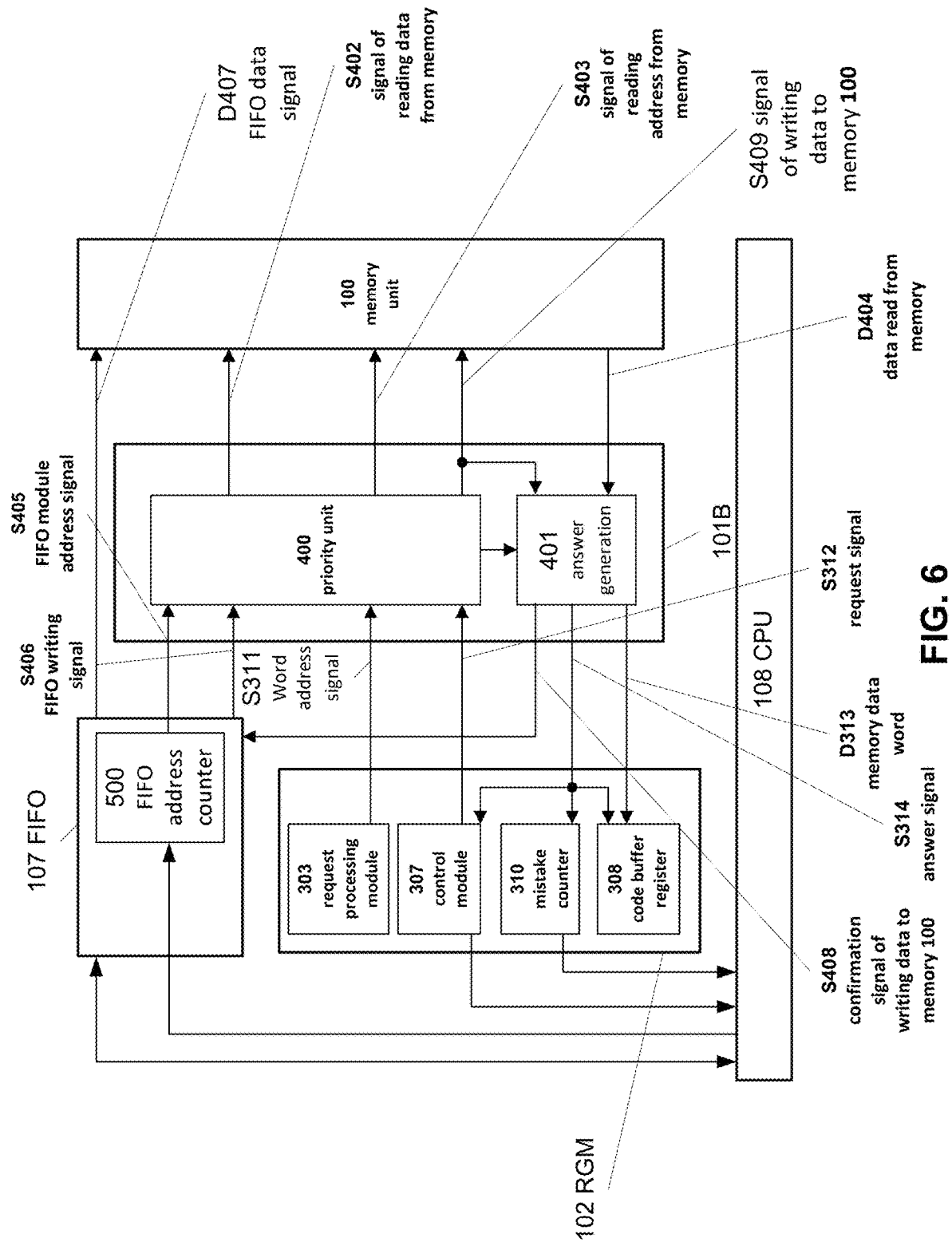
FIG. 6 shows a request processing module, with FIFO.

FIG. 6 shows the request processing module, with FIFO. In the figure:

S405—FIFO module address signal;
S406—FIFO writing signal;
D407—FIFO data signal;
S408—confirmation signal of writing data to memory 100.
S409—signal of writing data to memory 100.

The components are connected as follows.

The priority unit 400 is connected to the answer generation unit 401, memory unit 100, address counter 303 in the request generation module (RGM) 102, control module 307 and FIFO module 107. The answer generation unit 401 is connected to the memory unit 100, control module 307 in the request generation module (RGM) 102, mistake counter 310 in the request generation (RGM) module 102, code buffer register 308 in the request generation module (RGM) 102, and the FIFO module 107.

The FIFO module 107 is connected to the memory unit 100. The FIFO address counter 500 in the FIFO module 107 is connected to the priority unit 400 and to the CPU 108. The FIFO module is connected to the CPU 108.

Operation of the receiver with a minimal embodiment (4 channels, with FIFO module) is discussed below. Navigation signals from satellites can be processed using the receiver (minimal embodiment, 4 channels, with request processing module with FIFO) as follows:

The user 112 turns on the receiver. CPU and channel strokes are turned on. The CPU 108 writes data to the memory 100 via the FIFO module 107 and request processing module 101. The satellite signal is transmitted on a carrier frequency (typically 1.6-2 GHz). The antenna 106 receives signals from satellites, which then are sent through the radio-frequency section 105, ADC 104 to modified channels 103. The receiver may comprise several antennas, radio-frequency sections and ADCs.

The CPU 108 sets up modified channels 103 and request generation modules 102. After the setup, the CPU launches modified channels 103 to process signals sent by the ADC 104. Modified channels 103 request data stored in memory 100 from the request generation module 102, if necessary. The request generation module 102 via the request processing module with FIFO 101 reads data from the memory 100 and transmits them to modified channels 103.

In case request generation modules 102 make no requests for the request processing module 101, the CPU 108 may write data to the memory 100 via the FIFO module 107 and request processing module 101. The CPU 108 controls modified channels 103 and request generation modules 102 and accepts signal processing results, if necessary. The CPU 108 presents processing results to the user 112 via the communication device 111.

Operation of the receiver with an extended embodiment (N channels, with FIFO module) is discussed below with reference to FIG. 1D. Navigation signals from satellites can be processed using the receiver (extended embodiment, N channels, with request processing module with FIFO) as follows:

The user 112 turns on the receiver. CPU and channel strokes are turned on.

The CPU 108 writes data to the memory 100 via the FIFO module 107 and request processing module 101. The satellite signal is transmitted by carrier frequency. Antennas 106 receive signals from satellites on the carrier frequency, which then are sent through radio-frequency sections 105, ADCs 104 to modified channels 103 and standard channels 109. The CPU 108 sets up modified channels 103, standard channels 109 and request generation modules 102.

After the setup, the CPU launches modified channels 103 and standard channels 109 to process signals sent by the ADC 104.

Modified channels 103 request data stored in memory 100 from the request generation module 102, if necessary. Request generation modules 102 via the request processing module with FIFO 101 read data from the memory 100 and transmit them to modified channels 103.

In case request generation modules 102 make no requests for the request processing module 101, the CPU 108 may write data to the memory 100 via the FIFO module 107 and request processing module 101. The CPU 108 controls modified channel 103, standard channel 109 and request generation module 102 and accepts signal processing results, if necessary. The CPU 108 presents processing results to the user 112 via the communication device 111.

The receivers described herein can work not only with signals and their code sequences retrieved from memory, but also with standard code sequences generated by code generators. If there is a known number of signals with standard code sequences, a standard channel can be used, since it does not require connection to the buffer request generation module.

Operation of the receiver with a minimal embodiment (4 channels, with dual-ported memory) is discussed below with reference to FIG. 1E. Navigation signals from satellites can be processed using the receiver (minimal embodiment, 4 channels, with request processing module with dual-ported memory) as follows:

The user 112 turns on the receiver. CPU and channel strokes are turned on. The CPU writes data to the dual-ported memory 110. The antenna 106 receives signals from satellites, which then are sent through the radio-frequency section 105, ADC 104 to modified channels 103.

The CPU 108 sets up modified channels 103 and request generation modules 102. After the setup, the CPU launches modified channels 103 to process signals sent by the ADC 104. Modified channels 103 request data stored in memory 110 from request generation modules 102, if necessary. Request generation modules 102 via the request processing module 101 read data from the memory 110 and transmit them to modified channels 103.

The CPU 108 can write data to the dual-ported memory 110 at any time, if necessary. The CPU 108 controls modified channels 103 and request generation modules 102 and accepts signal processing results, if necessary. The CPU 108 presents processing results to the user 112 via the communication device 111.

Operation of the receiver with an extended embodiment (N channels, with dual-ported memory) is discussed below with reference to FIG. 1F.

The user 112 turns on the receiver. CPU and channel strokes are turned on. The CPU writes data to the dual-ported memory 110. Antennas 106 receive signals from satellites, which then are sent through radio-frequency sections 105, ADCs 104 to modified channels 103 and standard channels 109.

The CPU 108 sets up modified channels 103, standard channels 109 and request generation modules 102. The CPU launches modified channels 103 and standard channels 109 to process signals sent by comparing devices 104.

Modified channels 103 request data stored in memory 110 from request generation modules 102, if necessary. Request generation modules 102 via the request processing module 101 read data from the memory 110 and transmit them to modified channels 103.

The CPU 108 can write data to the dual-ported memory 110 at any time, if necessary. The CPU 108 controls modified channel 103, standard channel 109 and request generation module 102 and accepts signal processing results, if necessary. The CPU 108 presents processing results to the user 112 via the communication device 111.

With dual-ported memory, a number of advantages are realized:
the CPU 108 is able to write data to the dual-ported memory 110 at any time;
dual-ported memory 110 occupies larger space on the microchip crystal compared to the memory 100;
in a device with a request processing module with dual-ported memory 101A, the dual-ported memory 110 requires address space equal to its entire address space size.

With a FIFO module, a number of advantages are realized:
in the request processing module with FIFO 101B, data are written to the FIFO 107 using the address, which was specified during the design phase. A starting address is specified for the FIFO 107, and after each word the address is increased by 1;
in a request processing module with FIFO, FIFO occupies less space than a request processing module with dual-ported memory 110 compared to the memory 100.

The use of the FIFO 101B permits reading and writing data to the memory 100, which works on the channel clock, by other devices that work off the channel clock.

Operation of the modified channel, see FIG. 2C, minimal configuration is as follows:

Navigation signals from satellites can be processed using a modified channel 103 (a minimal embodiment). The modified channel 103 should be initialized before it can be used. The CPU 108 initializes channel 103. Then, depending on the signal to be processed, the CPU:
defines the necessary intermediate frequency (IF) in the intermediate frequency (IF) generator 201;
defines the necessary code sequence frequency in the code frequency generator 202;
selects the output of the necessary ADC 104 by means of the input signal switch 200;
sets up the strobe generator 210;
sets up the request generation modules 102;
sets up the accumulation period generator 215.

After initialization, the CPU 108 is used to start the intermediate frequency (IF) generator 201 and the code frequency generator 202. The intermediate frequency (IF) generator 201 generates a intermediate frequency (IF) phase, which is then shifted by 90 degrees in the intermediate frequency (IF) 90-degrees-phase-shift unit 203.

The code frequency generator generates a code frequency signal S217. The blocking signal S216, which blocks the request signal S312, is generated by the code frequency generator 202. The accumulation period generator 215 generates an accumulation period signal S219 with code frequency S217.

The request generation module (RGM) 102 generates a memory code D218 with code frequency S217. The memory code signal D218 is transmitted to multiplier-accumulators 204, 205 and strobe generators 210. The phase frequency code S232 is outputted from code frequency generator 202 to the strobe generator 210 and 223. The signal from strobe generators 210 is transmitted to the multiplier-accumulator 206.

Signals from the input signal switch 200, the intermediate frequency (IF) generator 201, intermediate frequency (IF) 90-degrees-phase-shift unit 203, strobe generator 210, and the memory code D218 are multiplied by each other and accumulated during the accumulation period S219 in multiplier-accumulators 204, 205, 206.

Values accumulated during the accumulation period S219 in multiplier-accumulators 204, 205, 206 are then written into channel buffers 207, 208, 209. When the input signal is processed with the modified channel 103, the following parameters can be changed through the CPU 108, if necessary:
code frequency and phase in the code frequency generator 202;

intermediate frequency (IF) and phase in the intermediate frequency (IF) generator 201;
the accumulation period in the accumulation period 215;
strobes in the strobe generator 203.

If necessary, the following data are read by the CPU 108:
the code phase from the code frequency generator 202;
the intermediate phase from the intermediate frequency (IF) generator 201;
the state of the accumulation period generator 215;
values from channel buffers 207, 208, 209.

Operation of the modified channel, see FIG. 2E, extended configuration is as follows:

Navigation signals from satellites can be processed using a modified channel 103 (an extended embodiment). The modified channel 103 should be initialized before it can be used. The extended channel (see FIG. 2D) is initialized as follows:

The CPU 108 initializes channel 103. Then, depending on the signal to be processed, the CPU:
selects the output of the necessary ADC 104 by means of the input signal switch 200;
defines the necessary intermediate frequency (IF) in the intermediate frequency (IF) generator 201;
defines the necessary code sequence frequency in the code frequency generator 202;
sets up the additional code generator 214, if necessary;
switches the code switch into memory code output mode D218;
sets up strobe generators 210, 223;
sets up the request generation module (RGM) 102;
sets up the accumulation period generator 215.

After initialization, the CPU 108 is used to start the intermediate frequency (IF) generator 201 and the code frequency generator 202. The intermediate frequency (IF) generator 201 generates a intermediate frequency (IF) phase, which is then shifted by 90 degrees in the intermediate frequency (IF) 90-degrees-phase-shift units 203 and 220.

The code frequency generator 202 generates a code frequency signal S217. The blocking signal S216, which blocks the request signal S312, is generated by the code frequency generator 202. The accumulation period generator 215 generates an accumulation period signal S219 with code frequency S217.

The request generation module (RGM) 102 generates a memory code D218 with code frequency S217. The additional code generator 214 generates additional code with code frequency S217, if necessary. The memory code signal D218 is transmitted to the code switch 212.

The signal from the code switch 212 is transmitted to the modulo 2 addition unit 213, where it is mixed with an additional code (if available). The signal from the modulo 2 addition unit 213 is transmitted to multiplier-accumulators 204, 205 and strobe generators 210, 223. The phase frequency code S232 is outputted from code frequency generator 202 to the strobe generator 210 and 223. The signal from strobe generators 210 and 223 is transmitted to multiplier-accumulators 206, 221.

Signals from the input signal switch 200, the intermediate frequency (IF) generator 201, intermediate frequency (IF) 90-degrees-phase-shift units 203 and 220, strobe generators 210 and 223, modulo 2 addition unit 213 are multiplied by each other and accumulated during the accumulation period S219 in multiplier-accumulators 204, 205, 206, 221. Values accumulated during the accumulation period in multiplier-accumulators 204, 205, 206, 221 are then written into channel buffers 207, 208, 209, 222. When the input signal is processed with the modified channel 103, the following parameters can be changed through the CPU 108, if necessary:
code frequency and phase in the code frequency generator 202;
intermediate frequency (IF) and phase in the intermediate frequency (IF) generator 201;
the accumulation period in the accumulation period generator 215;
additional code in the additional code generator 214;
strobes in strobe generators 203, 220.

If necessary, the following data are read from the CPU 108:
the code phase from the code frequency generator 201;
the intermediate phase from the intermediate frequency (IF) generator 202;
the state of the accumulation period generator 215;
values from channel buffers 207, 208, 209, 222.

Operation of the request blocking signal generation in a modified channel is as follows. If the code needs to be moved forward, the CPU 108 writes the corresponding number of chips of code into the code frequency generator 202. Then, the code frequency generator 202 produces the code frequency signal S217 for the given number of times each channel cycle. When producing the code frequency signal S217, the generator is still storing the code phase with the given code frequency and generates the code frequency signal S217, if necessary.

Figure 7:
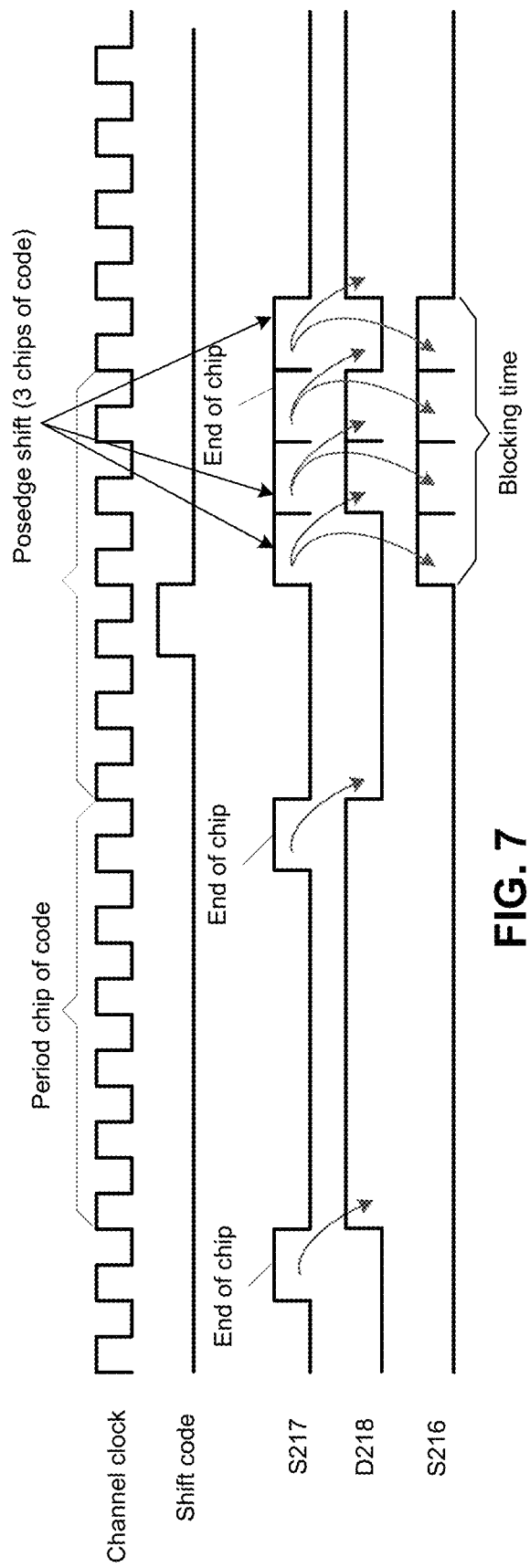
FIG. 7 shows generation of a blocking signal for a request signal.

The blocking signal S216 (see FIG. 7) is generated as follows:
(a) After writing the code shift, the code frequency generator 202 generates the blocking signal S216 with the code frequency signal S217 for the given number of times.
(b) After the code shift is finished or during the shifting, the code frequency generator 202, has the code phase stored and code frequency signal S217 generated. Alongside the code frequency signal S217, it generates the blocking signal S216.

Example

The code generator 202 generates the code frequency signal S217 every first channel cycle in six. The code generator receives the shift signal, which equals 3 chips of code. When producing three code frequency signals S217, the code frequency generator 202 stores the phase and generates another code signal S217. As a result, the code frequency signal S217 is generated 4 channel cycles in a row, alongside with the blocking signal S216.

Operation of the extended channel with a chip of code frequency divider is as follows. Navigation signals from satellites can be processed using a modified channel 103A (an extended embodiment). The extended channel with code frequency divider (FIG. 2E) is initialized as follows:

The CPU 108 initializes channel 103A. Then, depending on the signal to be processed, the CPU:
selects the output of the necessary ADC 104 by means of the input signal switch 200;
defines the necessary intermediate frequency (IF) in the intermediate frequency (IF) generator 201;
defines the necessary code sequence frequency in the code frequency generator 202;
sets up the additional code generator 214, if necessary;
switches the code switch into memory code output mode D218;
sets up strobe generators 210, 223;
sets up the request generation module (RGM) 102;

sets up the accumulation period generator 215;
sets up the chip of code frequency divider 224.

After initialization, the CPU 108 is used to start the intermediate frequency (IF) generator 201 and the code frequency generator 202. The intermediate frequency (IF) generator 201 generates a intermediate frequency (IF) phase, which is then shifted by 90 degrees in the intermediate frequency (IF) 90-degrees-phase-shift units 203 and 220.

The code frequency generator 202 generates a code frequency signal S217. Using the code frequency signal S217, the code frequency divider 224 generates a divided frequency signal S217A. The blocking signal S216, which blocks the request signal S312, is generated by the code frequency generator 202.

The accumulation period generator 215 generates an accumulation period signal S219 with code frequency S217. The request generation module (RGM) 102 generates a memory code D218 with divided code frequency S217A. The additional code generator 214 generates additional code with code frequency S217, if necessary.

The memory code signal D218 is transmitted to the code switch 212. The signal from the code switch 212 is transmitted to the modulo 2 addition unit 213, where it is mixed with an additional code (if available). The signal from the modulo 2 addition unit 213 is transmitted to multiplier-accumulators 204, 205 and strobe generators 210, 223. The phase frequency code S232 is outputted from code frequency generator 202 to the strobe generator 210 and 223. The signal from strobe generators 210 and 223 is transmitted to multiplier-accumulators 206, 221.

Signals from the input signal switch 200, the intermediate frequency (IF) generator 201, intermediate frequency (IF) 90-degrees-phase-shift units 203 and 220, strobe generators 210 and 223, modulo 2 addition unit 213 are multiplied by each other and accumulated during the accumulation period S219 in multiplier-accumulators 204, 205, 206, 221. Values accumulated during the accumulation period in multiplier-accumulators 204, 205, 206, 221 are then written into channel buffers 207, 208, 209, 222.

When the input signal is processed with the modified channel 103, the following parameters can be changed through the CPU 108, if necessary:
  code frequency and phase in the code frequency generator 202;
  intermediate frequency (IF) and phase in the intermediate frequency (IF) generator 201;
  the accumulation period in the accumulation period generator 215;
  additional code in the additional code generator 214;
  strobes in strobe generators 203, 220.

If necessary, the following data are read from the CPU 108:
  the code phase from the code frequency generator 201;
  the intermediate phase from the intermediate frequency (IF) generator 202;
  the state of the accumulation period generator 215;
  values from channel buffers 207, 208, 209, 222.

Figure 8:
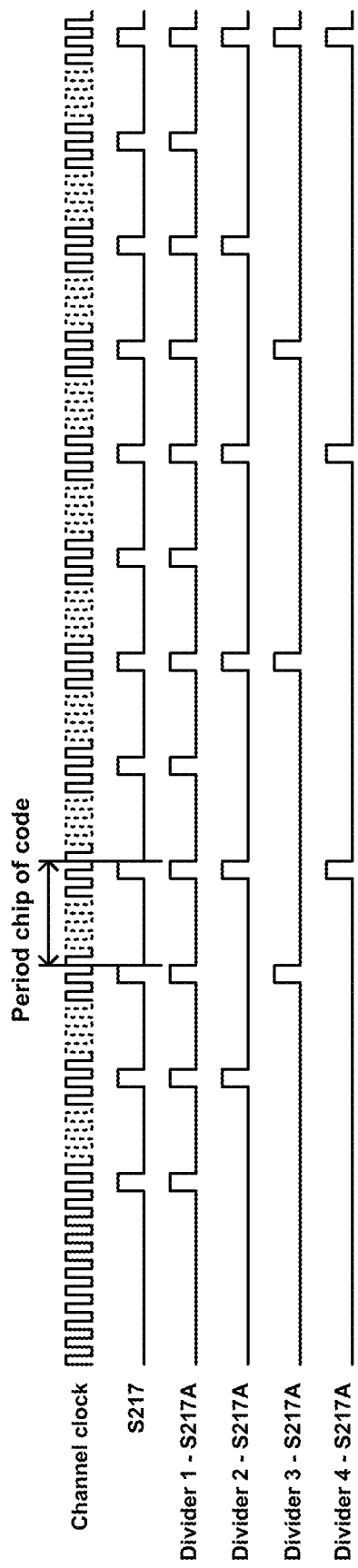
FIG. 8 shows operation of a code frequency divider.

Operation of the chip of code frequency divider is shown in FIG. 8. The chip of code frequency divider 224 is initialized by the CPU 108. The chip of code frequency divider generates divided frequency signal of chip of code S217A, which is equal to the code frequency signal S217 (see Divider 1 in the figure). In the chip of code frequency divider 224, one pulse of the code frequency S217 is missed, and the other passes through each time. Thus, the divided frequency signal S217A is generated, which is two times slower than the code frequency signal S217 (see Divider 2 in the figure).

In the chip of code frequency divider 224, two pulses of the code frequency S217 are missed, and the other passes through each time. Thus, the divided frequency signal S217A is generated, which is three times slower than the code frequency signal S217 (see Divider 3 in the figure).

In the chip of code frequency divider 224, three pulses of the code frequency S217 are missed, and the other passes through each time. Thus, the divided frequency signal S217A is generated, which is four times slower than the code frequency signal S217 (see Divider 4 in the figure).

Generally, in the chip of code frequency divider 224, a set number of pulses of the code frequency S217 are missed, and the other passes through each time. Thus, the divided frequency signal S217A is generated, which is a set number of times slower than the code frequency signal S217.

Operation of the extended modified channel of the present invention for processing L1C GPS is as follows. Navigation signals from satellites can be processed using a modified channel 103B (an extended embodiment) for processing L1C GPS. The channel 103B is connected to two request generation modules 102(1) and 102(2). The modified channel 103B with chip of code frequency divider should be initialized before it can be used.

The modified channel (an extended embodiment) for processing L1C GPS (FIG. 2F) is initialized as follows:
The CPU 108 initializes the channel 103B. Then, depending on the signal to be processed, the CPU:
  selects the output of the necessary ADC 104 by means of the input signal switch 200;
  defines the necessary intermediate frequency (IF) in the intermediate frequency (IF) generator 201;
  defines the necessary code sequence frequency in the code frequency generator 202;
  sets up the additional code generator 214;
  switches the code switch 212 into memory code output mode D218;
  sets up strobe generators 210, 223;
  sets up the request generation modules (RGM) 102(1) and 102(2);
  sets up the accumulation period generator 215;
  sets up the chip of code frequency divider 224;
  sets up the code expander 225;
  turns on the EXPANSION code switch 229, if necessary.

After initialization, the CPU 108 is used to start the intermediate frequency (IF) generator 201 and the code frequency generator 202.

The code frequency generator 202 generates a code frequency signal S217. Using the code frequency signal S217, the code frequency divider 224 generates a divided frequency signal S217A. The blocking signal S216, which blocks the request signal S312, is generated by the code frequency generator 202. The code expander 225 generates:
  a blocked divided frequency signal S217B;
  an EXPANSION sequence signal S227;
  a signal of the EXPANSION sequence turning on S228.

The accumulation period generator 215 generates an accumulation period signal S219 with code frequency S217.

The request generation modules 102(1) and 102(2) generate memory codes D218(1) and D218(2) with code frequency of the blocked divided frequency signal S217B. The additional code generator 214 generates additional code with code frequency S217, if necessary. The memory code signals D218(1) and D218(2) are transmitted to the modulo 2 addition unit 226.

The modulo 2 addition unit 226 generates a WEIL sequence D230. The EXPANSION code switch 229 generates a FINAL sequence D230:
- if the signal of the EXPANSION sequence turning on S228 is 0, then the EXPANSION code switch 229 sends the WEIL sequence D230;
- if the signal of the EXPANSION sequence turning on S228 is 1, then the EXPANSION code switch 229 sends the EXPANSION sequence S227.

The FINAL sequence signal D231 is transmitted to the code switch 212.

The signal from the code switch 212 is transmitted to the modulo 2 addition unit 213, where it is mixed with an additional code (modulo 2) from the additional code generator 214. The signal from the modulo 2 addition unit 213 is transmitted to multiplier-accumulators 204, 205 and strobe generators 210, 223.

The phase frequency code S232 is outputted from code frequency generator 202 to the strobe generator 210 and 223. The signal from strobe generators 210 and 223 is transmitted to multiplier-accumulators 206, 221. Signals from the input signal switch 200, the intermediate frequency (IF) generator 201, intermediate frequency (IF) 90-degrees-phase-shift units 203 and 220, strobe generators 210 and 223, modulo 2 addition unit 213 are multiplied by each other and accumulated during the accumulation period S219 in multiplier-accumulators 204, 205, 206, 221.

Values accumulated during the accumulation period in multiplier-accumulators 204, 205, 206, 221 are then written into channel buffers 207, 208, 209, 222.

When the input signal is processed with the modified channel 103, the following parameters can be changed through the CPU 108, if necessary:
- code frequency and phase in the code frequency generator 202;
- intermediate frequency (IF) and phase in the intermediate frequency (IF) generator 201;
- the accumulation period in the accumulation period generator 215;
- additional code in the additional code generator 214;
- strobes in strobe generators 203, 220.

If necessary, the following data are read from the CPU 108:
- the code phase from the code frequency generator 201;
- the intermediate phase from the intermediate frequency (IF) generator 202;
- the state of the accumulation period generator 215;
- values from channel buffers 207, 208, 209, 222.

When the extended modified channel of the present invention for processing L1C GPS 103B with two request modules 102 is used, any FINAL code sequence can be generated from the original LEGENDRE sequence, which occupies approximately 1.25 Kbytes of memory.

Figure 9:
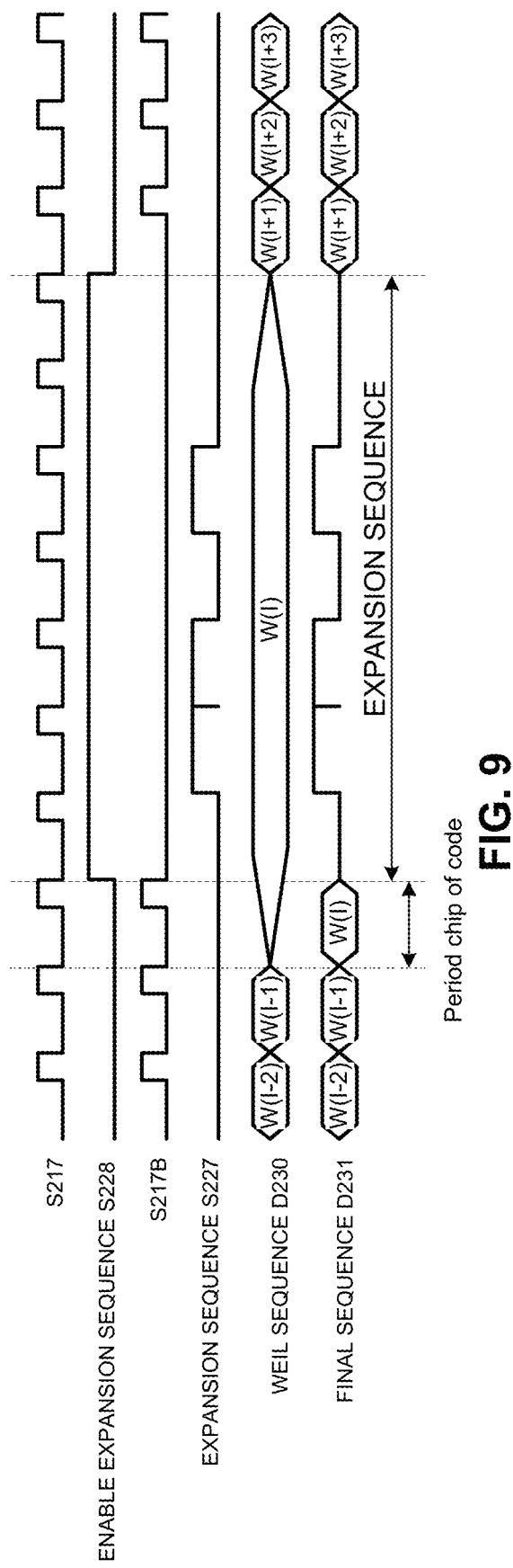
FIG. 9 shows generation of a FINAL sequence.

Operation of the code expander 225 to generate the FINAL sequence is shown in FIG. 9. When the code expander 225 is initialized, the CPU 108 sets the chip of code number (INSERTION INDEX) for signal trigger to turn on the EXPANSION sequence S228. In case generation of the EXPANSION sequence signal S227 is necessary, the code expander 225 generates the signal of EXPANSION sequence turning on S228.

If S228 is "0":
the blocked signal of divided frequency of chip of code S217B will be equal to the divided frequency signal of chip of code S217A.
WEIL sequence D230 is generated with blocked signal frequency equal to the divided frequency of chip of code S217B, the FINAL sequence D231 is generated, which consists of the WEIL sequence D230.

If S228 is "1", then:
the blocked signal of divided frequency of chip of code S217B is "0";
the EXPANSION sequence signal S227 is generated with blocked signal frequency equal to the divided frequency of chip of code S217A;
generation of the WEIL sequence D230 is halted;
the FINAL sequence D231 is generated, which consists of the EXPANSION sequence signal S227.

If the code expander 225 is turned off, then:
S217B is equal to the divided frequency signal of chip of code S217A;
the WEIL sequence D230 is equal to the FINAL sequence D231.

The channel 103B and request generation modules 102(1) and 102(2) for processing L1C GPS are initialized as follows.

The LEGENDRE sequence is split into words, which are stored in memory. Settings are written into the request generation module 102(1): initial address register 300; final address register 301; remainder size register 305; remainder register 306. The code frequency generator 202 in the channel 103 is started. The code frequency generator 202 is stopped at the moment of code, when the memory code D218(1) is equal to the code with WEIL INDEX.

After that, channel 103B settings are reset.

The same settings as 101(1) are written into the request generation module 102(2): initial address register 300; final address register 301; remainder size register 305; remainder register 306. After the request generation 102(2) setup is complete, both request generators 102(1) and 102(2) are ready to generate the aggregate WEIL sequence.

Then, in order to generate the FINAL sequence, setup is conducted for:
- chip of code frequency divider 224, which generates MBOC. Division by 12 is set;
- code expander 225, which defines WEIL INDEX;
- additional code generator 214, which generates MBOC meander.

After the setup is complete, the modulo 2 addition module 213 emits reference code necessary to work with L1Cp and L1Cd GPS signals.

Operation of the request generation module (RGM) is discussed below. In FIG. 4, which shows a diagram of the request generation module (RGM):
- 300—initial address register;
- 301—final address register;
- 302—code sequence element counter;
- 303—address counter;
- S304—word end signal;
- 305—remainder size register;
- 306—remainder register;
- 307—control module;
- 308—code buffer register;
- 309—code shift register;
- 310—mistake counter;
- S311—word address signal;
- S312—request signal;
- D313—memory data word;
- S314—answer signal.

The request generation module 102 must be initialized before it can be used, which is done as follows.

The final address of the selected code sequence in the memory 100 (110) is written into the final address register 301.

If the remainder size of the selected code sequence is over 0, then the remainder of the selected code sequence is written into the remainder register 306, and the remainder size is written into the remainder size register 305.

The initial address of the selected code sequence in the memory 100 (110) is written into the initial address register 300.

After the initial address 300 is written,
 (a) the initial address is put into the address counter 303;
 (b) the control module generates the request signal S312 and the word address signal S311.

The request processing module 101 sends the answer signal S314 and the memory data word signal D313. After the answer signal S314 is received, the memory data word D313 is written into the code buffer register 308 and the code shift register 309.

Then the modified channel 103 starts the code frequency generator 202. After the code frequency generator 202 is started, the code shift register 309 sends the memory code D218 bit by bit with the code frequency S217.

When the first pulse of the code frequency signal S217 is received:
 (a) the address counter 303 is increased by 1;
 (b) the control module generates the request signal S312 and the word address signal S311.

The request processing module 101 sends the answer signal S314 and the memory data word signal D313. After the answer signal S314 is received, the memory data word D313 is written into the code buffer register 308.

The request generation module 102 is initialized.

The memory code generation includes the following stages:
 (a) iterative generation (each N+1 pulses of the code frequency signal S217);
 (b) generation after the code sequence with remainder over 0;
 (c) generation after the code sequence with remainder of 0.

Iterative generation is as follows:

The code sequence element counter 302 counts N+1 pulses of the code frequency signal S217 and then generates the word end signal S304. After receiving this signal, the control module 307:
 (a) increases the address counter by 1;
 (b) generates the request signal S312 and the word address signal S311;
 (c) rewrites the data from the code buffer register 308 into the code shift register 309.

The code shift register 309 generates the memory code D218 bit by bit with the code frequency S217. The request processing module 101 sends the request signal S312 and the memory data word signal D313. After the answer signal S314 is received, the memory data word D313 is written into the code buffer register 308.

Figure 10:
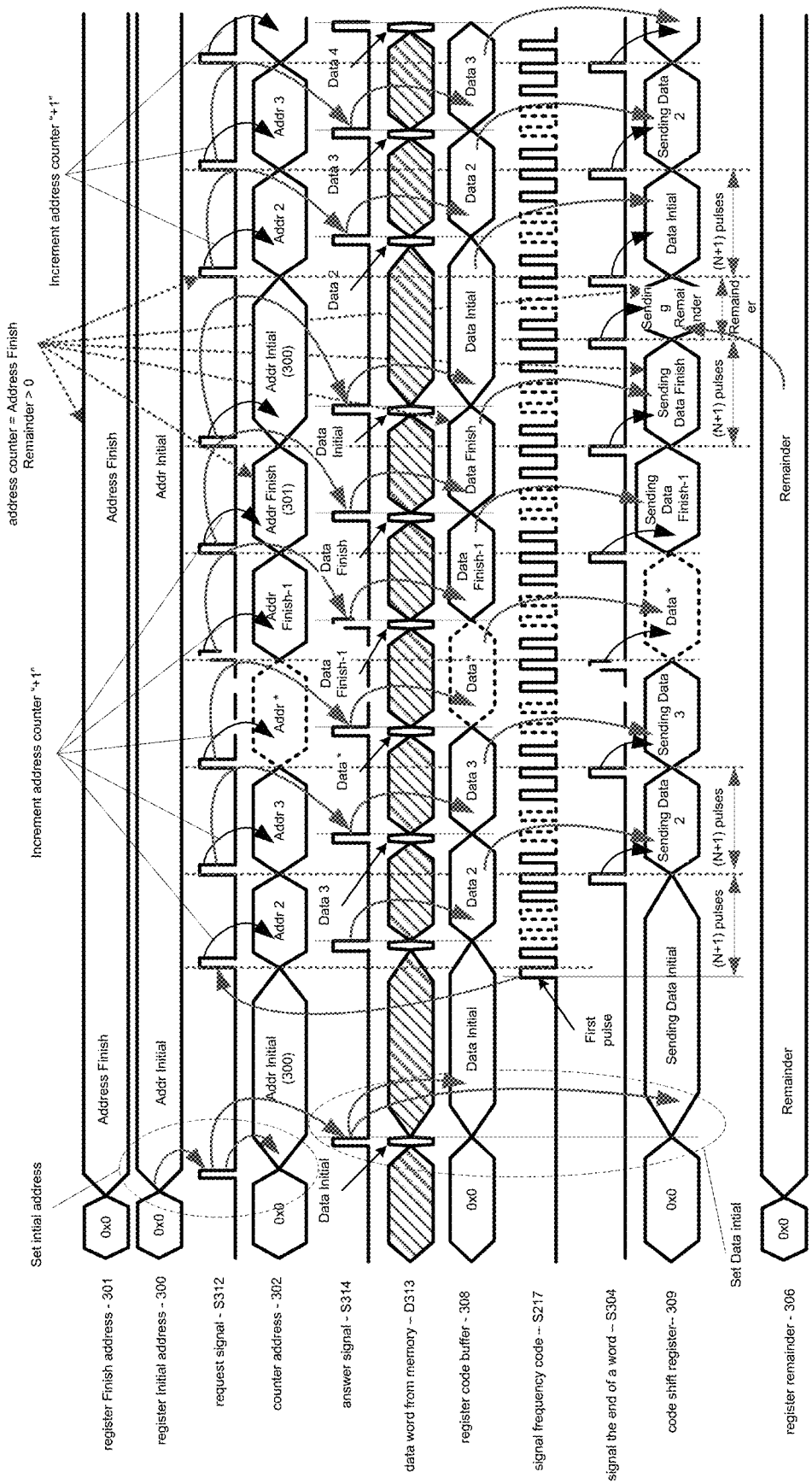
FIG. 10 shows initialization and operation of a Request Generation Module (RGM) with remainder over 0.

FIG. 10 illustrates initialization and operation of a Request Generation Module (RGM) with remainder over 0. If the value of the remainder size register 305 is over 0, when the address counter 302 reaches the value of the final address register 301, and after the word end signal S304 is received, the following takes place:
 (a) data from the initial address register 300 are rewritten into the address counter 302;
 (b) the data corresponding to the data situated in the address equal to the final address register 301 are rewritten from the code buffer register 308 to the code shift register 309;
 (c) the control module generates the request signal S312 and the word address signal S311.

After the request signal S312 is sent, the request processing module 101 sends the answer signal S314 and the memory data word signal D313. After the answer signal S314 is received, the memory data word D313 is written into the code buffer register 308.

The code sequence element counter 302 counts N+1 pulses of the code frequency signal S217 and then generates the word end signal S304, but the request signal S312 is NOT generated. After receiving the word end signal S304, the data from the remainder register 306 are rewritten into the code shift register 309.

The code shift register 309 generates the memory code D218 bit by bit with the code frequency S217. Then the code sequence element counter 302 counts the number of pulses of the code frequency signal S217, which is set in the remainder size register 305, and then generates the word end signal S304.

After receiving this signal, the control module 307 does the following:
 (d) increases the address counter by 1;
 (e) generates the request signal S312 and the word address signal S311;
 (f) rewrites the data from the code buffer register 308 into the code shift register 309.

The code shift register 309 generates the memory code D218 bit by bit with the code frequency S217. After the request signal S312 is sent, the request processing module 101 sends the answer signal S314 and the memory data word signal D313. After the answer signal S314 is received, the memory data word D313 is written into the code buffer register 308.

Figure 11:
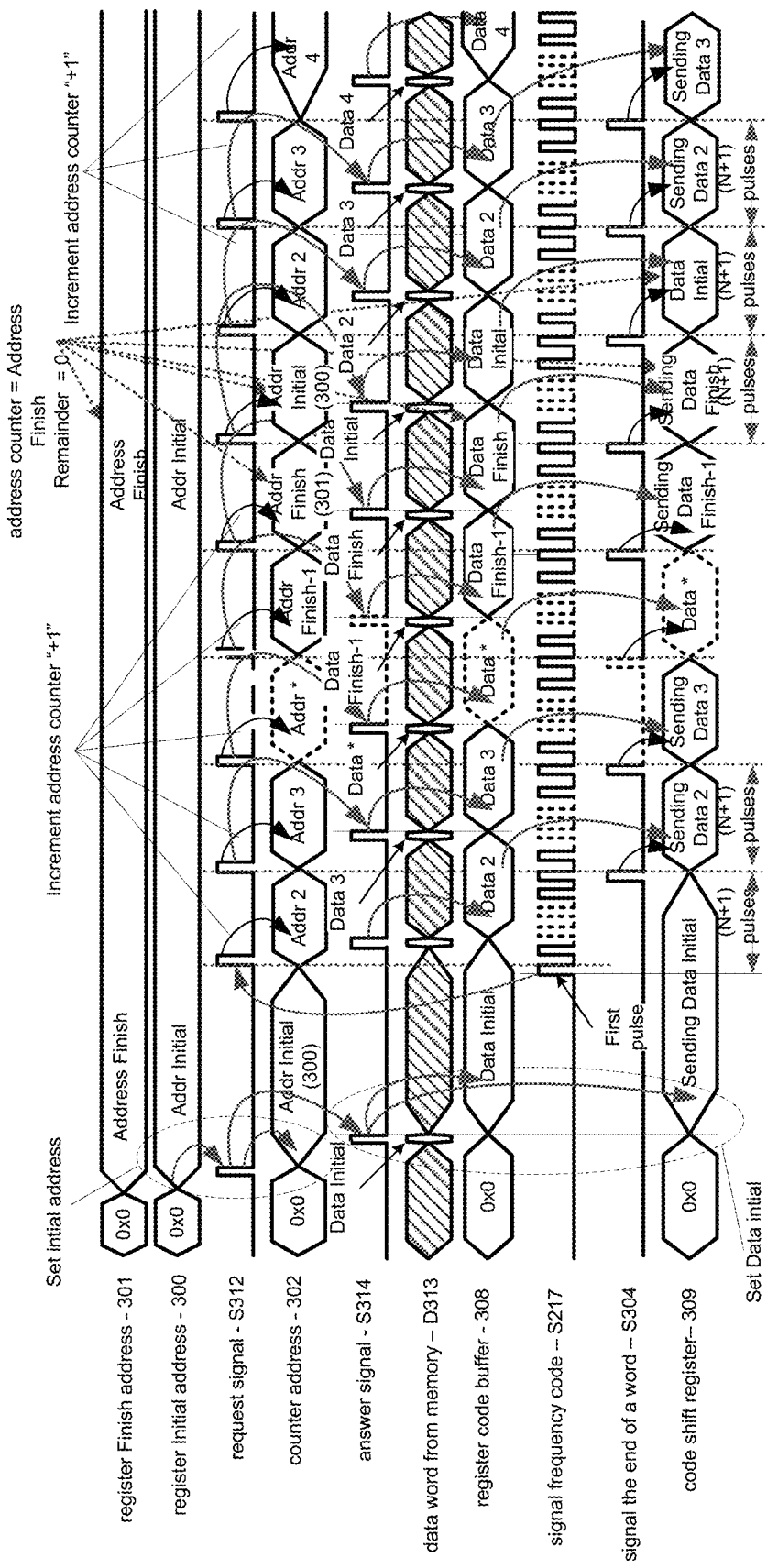
FIG. 11 shows initialization and operation of a Request Generation Module (RGM) with a remainder of 0.
Figure 12:
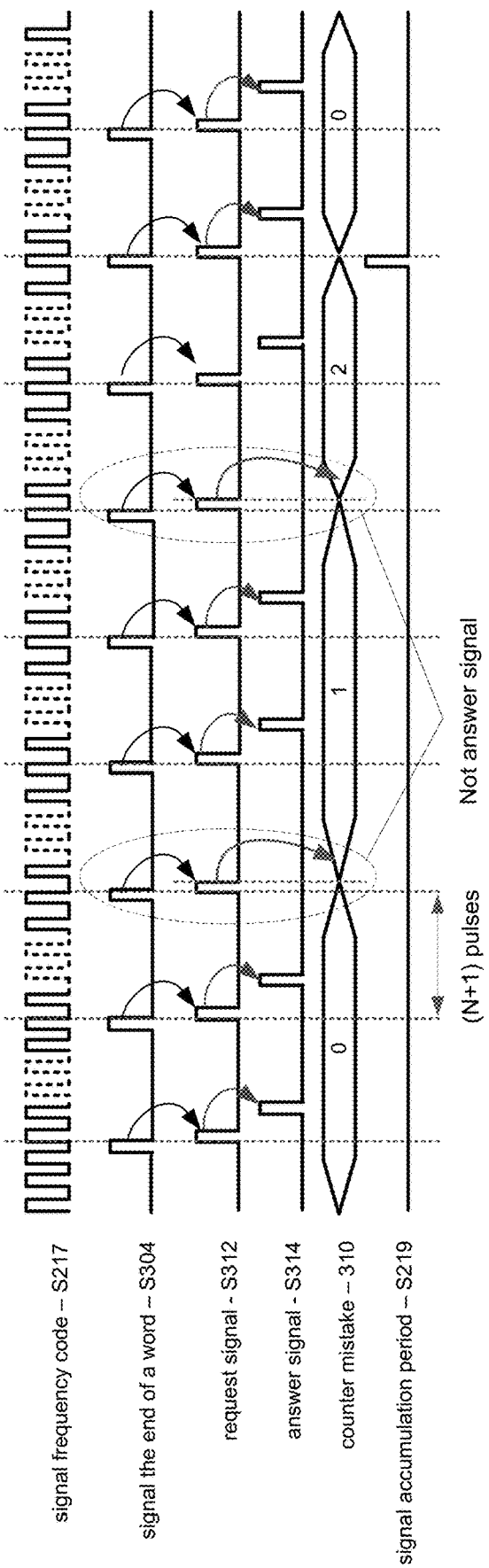
FIG. 12 shows operation of a mistake counter.

FIG. 11 illustrates initialization and operation of a Request Generation Module (RGM) with a remainder of 0. If the value of the remainder size register 305 is 0, when the address counter 302 reaches the value of the final address register 301, and after the word end signal S304 is received the following occurs:
 (a) data from the initial address register 300 are rewritten into the address counter 302;
 (b) the data corresponding to the data situated in the address equal to the final address register 301 are rewritten from the code buffer register 308 to the code shift register 309;
 (c) the control module generates the request signal S312 and the word address signal S311;

The code shift register 309 generates the memory code D218 bit by bit with the code frequency S217.

After the request signal S312 is sent, the request processing module 101 sends the answer signal S314 and the memory data word signal D313. After the answer signal S314 is received, the memory data word D313 is written into the code buffer register 308. The code sequence element counter 302 counts N+1 pulses of the code frequency signal S217 and then generates the word end signal S304.

After receiving this signal, the control module 307 does the following:
 (a) increases the address counter by 1;
 (b) generates the request signal S312 and the word address signal S311;
 (c) rewrites the data from the code buffer register 308 into the code shift register 309.

After the request signal S312 is sent, the request processing module 101 sends the answer signal S314 and the memory data word signal D313. After the answer signal S314 is received, the memory data word D313 is written into the code buffer register 308. After the stage of signal generation after the code sequence is finished, the system resumes the iterative generation stage.

Figure 21:
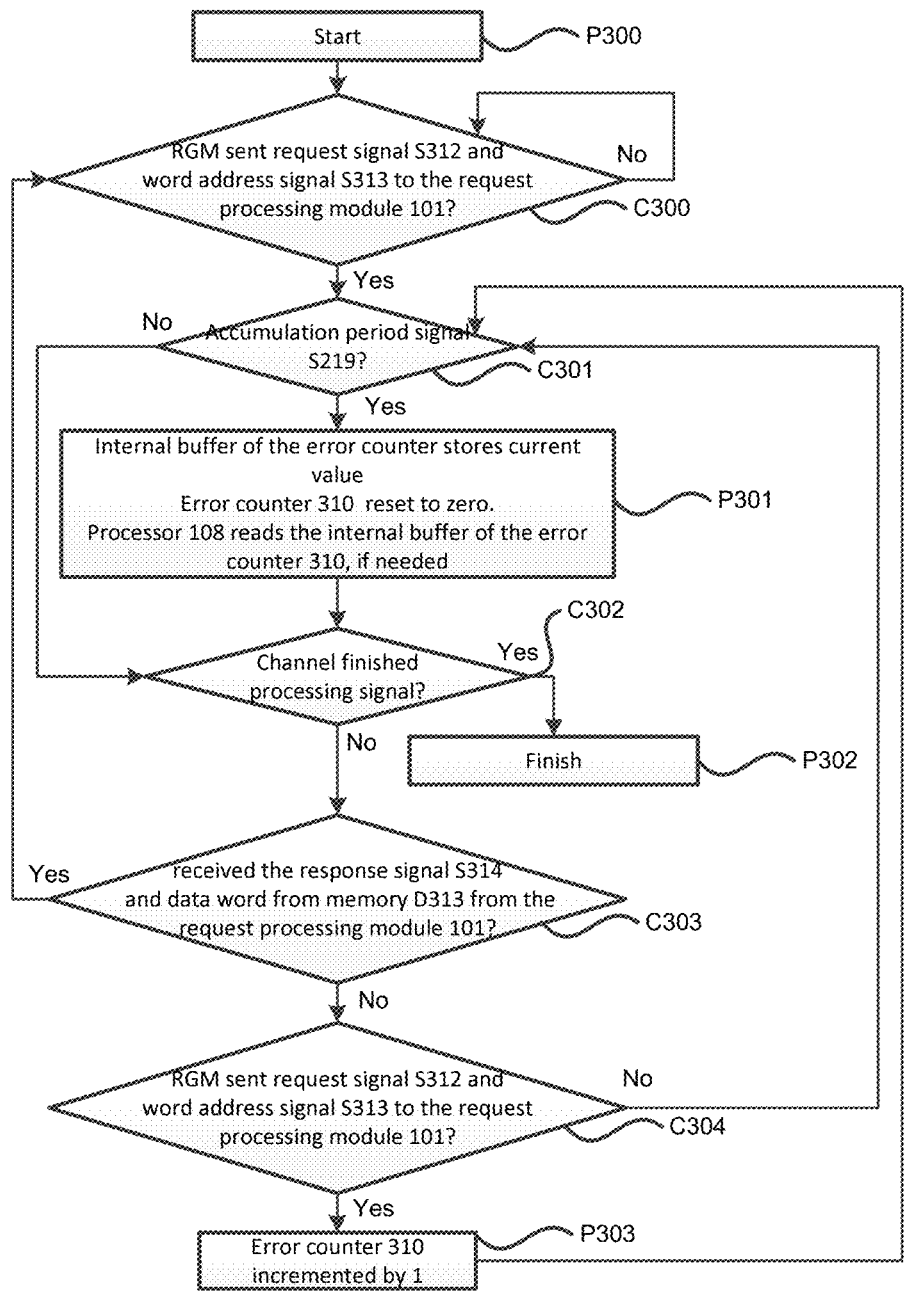
FIG. 21 illustrates operation of mistake counter.

FIG. 21 illustrates operation of the mistake counter. The mistake counter is 0 by default and is used to register request signals S312 as follows:

(a) if the answer signal S314 has been sent before the next request signal S312 appeared, then the mistake counter 310 value does not change;

(b) if the request signal S312 has been received before the answer signal S314, then the mistake counter 310 value increases by 1.

At the signal of the accumulation period S219:

(a) the internal buffer of the mistake counter 310 stores the current mistake value;

(b) the mistake counter 310 is reverted to zero.

The CPU can read the internal buffer of the mistake counter 310, if necessary.

If the blocking signal S216 is present, it prevents the request signal S312 from being transmitted to:

(a) mistake counter 310;

(b) request processing module 101.

FIG. 5 illustrates operation of the request processing module, with dual-ported memory. In the figure:

400—priority unit;

401—answer generation unit;

S402—signal of reading data from memory;

S403—signal of reading address from memory;

D404—data read from memory.

The request processing module with dual-ported memory 101A functions as follows:

Each request generation module 102 sends to the request processing module with dual-ported memory 101A the following:

(a) a request signal S312

(b) a word address signal S311.

The processing of a request from the Request Generation Module is as follows. The priority unit 400 receives the request signal S312 from the request generation module 102, which is then stored.

The priority unit 400, depending on the set priority, selects one request signal S312 from a number of stored ones. Then the unit 400:

(a) generates a memory address signal S403 for the dual-ported memory 110, which corresponds to the word address signal S311 of the selected request signal S312;

(b) generates the signal of reading data from memory S402 for the dual-ported memory 110;

(c) sends data about the selected request signal S312 to the answer generation unit 401;

(d) deletes the selected request signal S312.

An example of a set priority would be: a request signal, the number of which in the buffer 102 is higher, has higher priority than a signal, the number of which in the buffer 102 is lower. The answer unit 401 receives data D404 about the selected request signal S312 read from the dual-ported memory 110. The answer unit 401 generates an answer signal S314 and the memory data word D313, both corresponding to the data D404 read from memory. The answer signal S314 is then transmitted to the request generation module (RGM) 102, corresponding to the selected request signal S312.

The memory data word D313 is then sent to all request generation modules 102. When the priority unit 400 deletes the selected request signal S312, there can be a new request signal S312 from the selected request generation module 102. In this case, the priority unit 400 stores the request. The CPU 108 may write data into the dual-ported memory, if necessary.

FIG. 6 illustrates operation of the request processing module, with FIFO. In the figure:

S405—FIFO module address signal;

S406—FIFO write signal;

D407—FIFO data signal;

S408—confirmation signal of writing data into memory 100;

S409—signal of writing data into memory 100;

500—FIFO address counter.

The request processing module with FIFO 101B functions as follows:

Operation of FIFO module 107 is as follows. The CPU 108 controls the FIFO module 107, if necessary. If the CPU 108 needs to write a new address into the FIFO address counter 500, it first checks whether the FIFO flag in the FIFO module 107 is empty. If the flag is empty and is on, then the CPU 108 writes the new address into the FIFO address counter 500. If the CPU 108 needs to write a new data into the FIFO module 107, it first checks whether the FIFO flag in the FIFO module 107 is empty. If the flag is empty is on, the CPU 108 write new data. The new data provided to output Data from the FIFO D407. If the flag is empty if off, CPU 108 check flag FIFO full. If the flag FIFO full is off, the CPU 108 write new data in FIFO 107.

When the FIFOF module 107 has data, but not have confirmation signal of writing data into memory S408, it is generating the FIFO writing signal S406 and FIFO data signal D407.

When the FIFO module 107 receives the confirmation signal of writing data into memory S408, the FIFO address counter 500 increases by 1. Next, the FIFO 107 have data, data signal from the FIFO D406 represents the next data stored in FIFO 107 and generating the FIFO write signal S406 and FIFO data signal D407.

Processing of a request from the Request Generation Module is as follows. The request processing module with FIFO 101B receives:

(a) request signals S312 and word address signals S311 from each unit;

(b) the address signal from the FIFO module S405 and the writing signal from FIFO S406.

The priority unit 400 receives request signals S312 from the request generation module 102, and the writing signal from FIFO S406, both of which are then stored. The priority unit 400 receives the request signal S312 from the request generation module 102, which is then stored.

The priority unit 400, depending on the set priority, selects one request signal S312 from a number of stored ones. Then the unit 400:

(a) generates a memory address signal S403 for the memory 100, which corresponds to the word address signal S311 of the selected request signal S312;

(b) generates the signal of reading data from memory S402 for the memory 100;

(c) sends data about the selected request signal S312 to the answer generation unit 401;

(d) deletes the selected request signal S312.

An example of a set priority: a request signal, the number of which in the buffer 102 is higher, has higher priority than a signal, the number of which in the buffer 102 is lower.

The answer unit 401 receives data D404 about the selected request signal S312 read from the memory 100. The answer unit 401 generates an answer signal S314 and the memory data word D313, both corresponding to the data D404 read from memory. The answer signal S314 is then transmitted to the request generation module (RGM) 102, corresponding to the selected request signal S312. The memory data word D313 is then sent to all request generation modules 102.

When the priority unit 400 deletes the selected request signal S312, there can be a new request signal S312 from the selected request generation module 102. In this case, the priority unit 400 stores the request.

The processing of a request from FIFO is as follows. If the priority unit 400 does not contain any information about request signals S312, then the writing signal from FIFO S406 is checked. The writing signal from FIFO S406 has the lowest priority compared to other request signals S312 in the priority unit 400.

If there is a write signal from FIFO S406 in the priority unit 400:
(a) the data write signal into memory S409 is sent to the memory 100;
(b) the memory address signal S403 corresponding to the address signal from the FIFO module S405 is sent to the memory 100;
(c) the data signal from FIFO D407 is sent to the memory 100;

The answer unit 401 receives the signal of writing data into memory S409 and generates a confirmation signal of writing data into memory S408.

Figure 13:
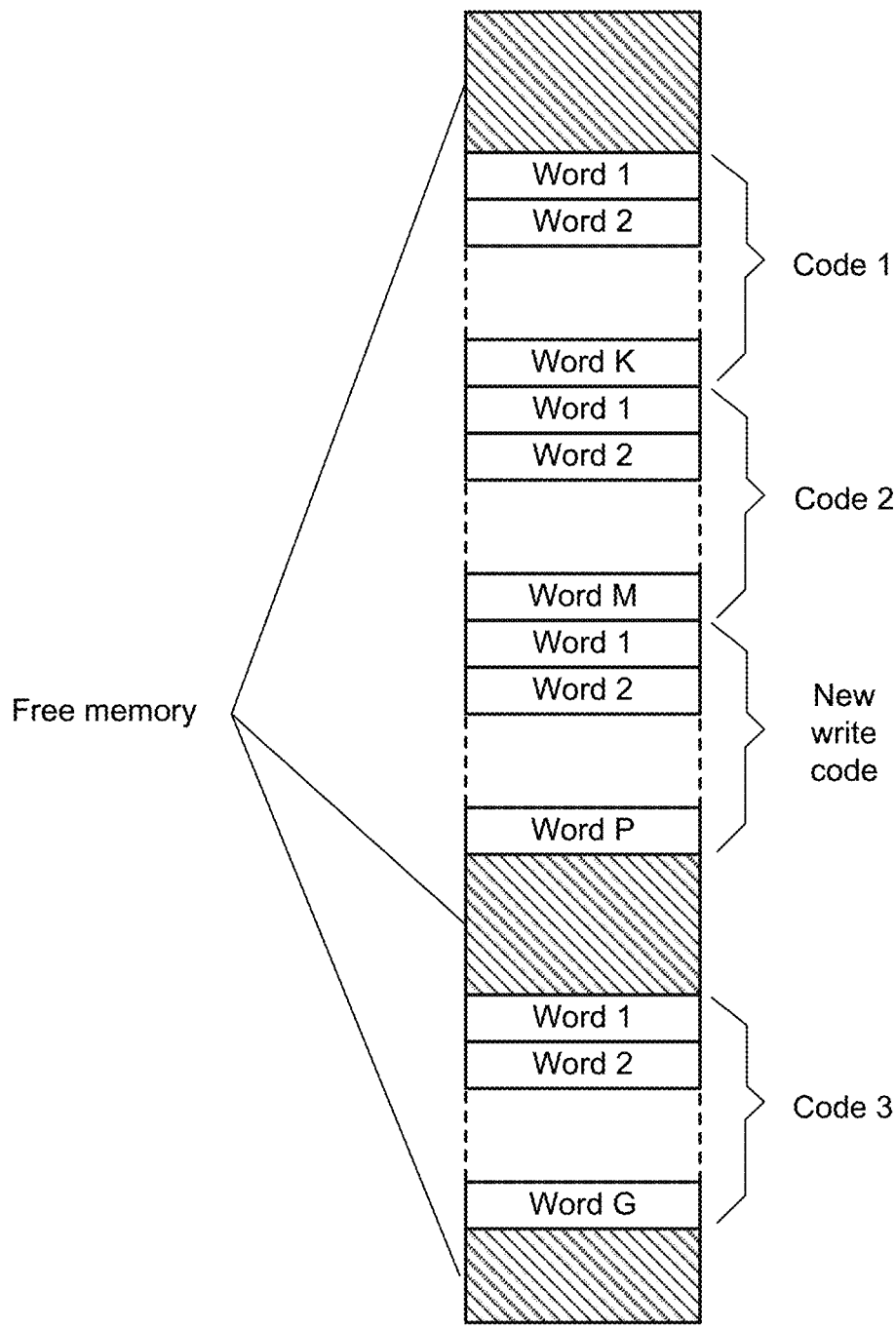
FIG. 13 shows a memory card example.

The memory card operation (see FIG. 13) is as follows. Memory card formation consists of allocation of sequences of words in memory. There are two types of code sequences used in global navigation system technologies: generated and non-generated ones.

A generated code sequence is generated by the code generator 211.

Figure 14:
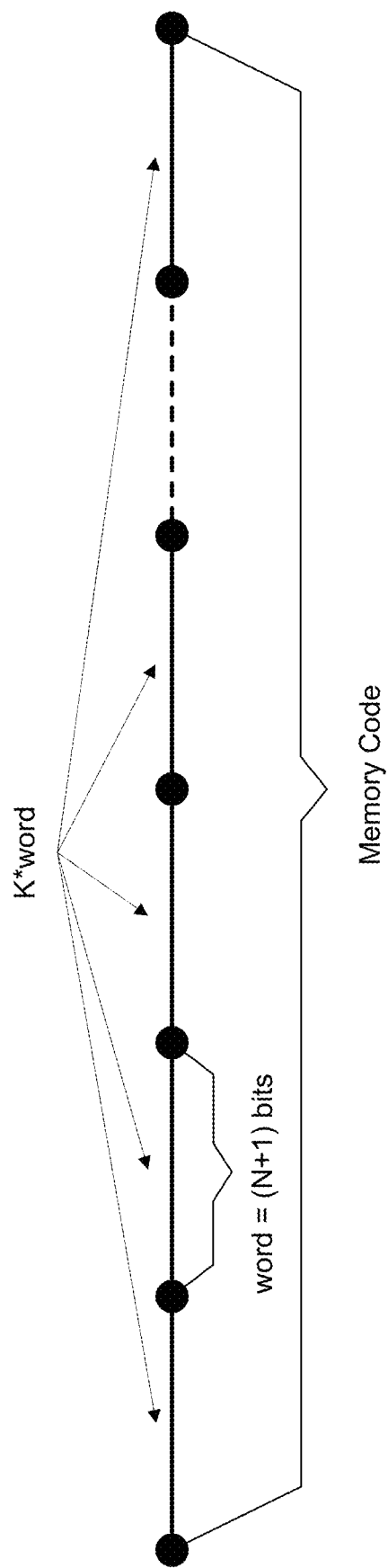
FIG. 14 shows a memory code that is a multiple of memory width (N+1).

A code sequence, which is specified by global navigation system designers and which cannot be generated by the code generator 211, is defined as a memory code. Memory codes are stored in memory and read when necessary. Code sequences, split into words, are stored in memory 100 (or in dual-ported memory 110), which is common for all request generation modules (RGM) 102. A memory code is split into K complete words, which are equal to memory width N+1 and which are allocated in memory one by one (see FIG. 14).

Figure 15:
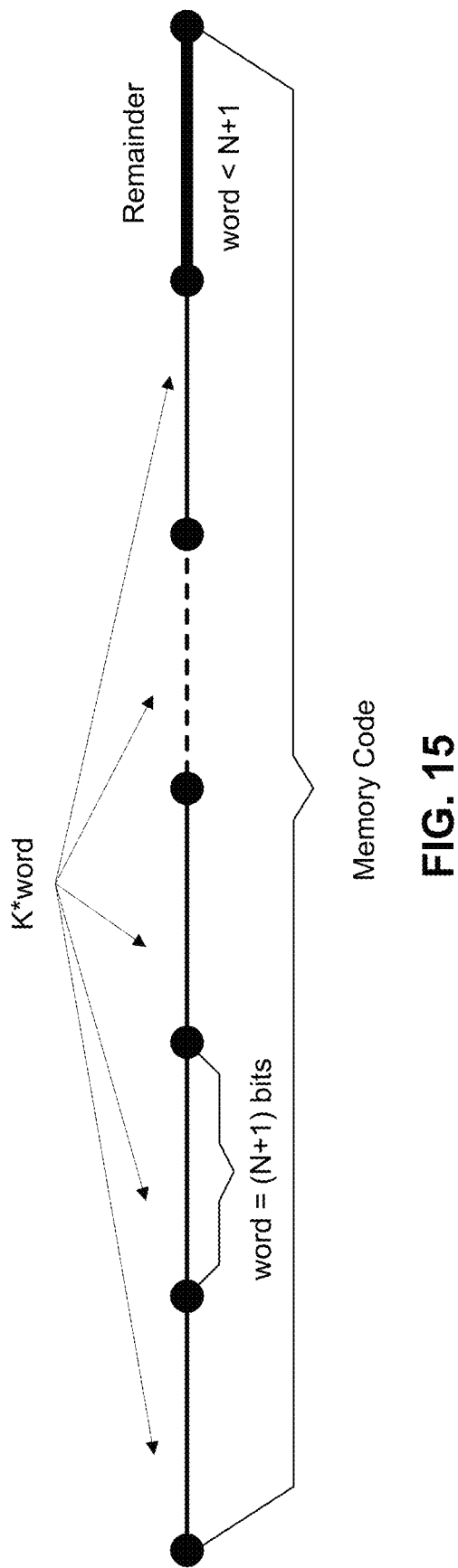
FIG. 15 shows a memory code, not multiple of memory width (N+1).

If the memory code width is not multiple of memory width (N+1) (see FIG. 15), then:
(a) the last incomplete word becomes a remainder, where the word length is the remainder size;
(b) the remainder size may be between 1 and N.
(c) the number of complete words, which can be consequently arranged in the memory, is K.

If the code is a multiple of N+1, the remainder size is 0. Therefore, each sequence has four parameters:
initial address (address of the first word of the code sequence);
final address (address of the last word of the code sequence);
remainder size (the size of the last word in bits, which is not complete, when the sequence is not a multiple of N+1).
remainder (the last word, which is not complete, when the sequence is not a multiple of N+1).

It is possible to allocate a plurality of codes in memory, while there could still be free space. If necessary, the CPU may intervene into the memory card to: replace one code sequence in the memory card for another, if necessary. The processor, if necessary, can perform the following operations with the memory card:
(a) write a new code sequence to a free space;
(b) replace an "old" code sequence (which is currently not in use) with a new one.

The following describes operation of the response unit 101. The code sequence frequency in a modified channel 103 can be calculated as follows:

$$F_{CODE} = F_{CH} * N_{MEMORY}/N_{CH} \qquad \text{Equation (1)}$$

Where:
$F_{CODE}$—is the code sequence frequency in a modified channel 103;
$F_{CH}$—is the channel frequency (typically about 50-100 MHz);
$N_{CH}$—is the number of modified channels in the receiver;
$N_{MEMORY}$—is the word in memory width N+1.

When the request generation module 102 is being initialized, the following formula is used:

$$F_{CODE} = F_{CH} * (N_{MEMORY} - 1)/N_{CH} \qquad \text{Equation (2)}$$

Equation (2) contains the term ($N_{MEMORY}-1$), because when the request generation module is being initialized, the request signal S312 is generated at the moment when the first pulse of the code frequency signal S217 and word end signal S304 are released. This time equals N pulses of the code frequency signal S217. Since the request generation module is rarely initialized, the present invention mainly uses Equation (1).

Using the given calculation method, it is possible to calculate the number of modified channels 103, which can work with the memory code in the given conditions.

$$N_{CH} = F_{CH} * N_{MEMORY}/F_{CODE} \qquad \text{Equation (3).}$$

For example, if the channel frequency $F_{CH}$ is 20 MHz and the word length $N_{MEMORY}$ is 16 bit, the following parameters can be derived:
1. If the code frequency $F_{CODE}$ is 1 Mhz, the memory code D218 can be generated for 320 modified channels 103 in the receiver ($N_{CH}$).
2. If the code frequency $F_{CODE}$ is 10 Mhz, the memory code D218 can be generated for 32 modified channels 103 in the receiver ($N_{CH}$).
3. Thus, it is possible to run several channels simultaneously:
10 channels 103 with code frequency $F_{CODE}$=10 MHz;
220 channels 103 with code frequency $F_{CODE}$=1 MHz.

Using the above calculation method, it is possible to calculate the parameters of the satellite navigation signal receiver, which are needed to receive a known number of code sequences with known code frequencies, while the frequencies themselves may be different.

Advantages of the present invention over conventional approaches are as follows:
(a) Any channel 103 is able to work with any code sequence stored in memory 100 (110).
(b) When searching for signals from satellites using several channels 103, the memory code D218 is loaded only once.
(c) If it is necessary to use a code sequence, which has not been previously stored in memory 100 (110), the sequence can be written into the free space in the common memory 100 (110), or it may replace an existing code sequence in the memory 100 (110), which is not currently in use, while the channels 103 are at work.
(d) If it is to replace a code sequence in the channel 103 with another one, the sequence can be written, while the channel 103 is at work. Afterwards, the channel in question can be set up to operate with the written code sequence, which allows to minimize time needed to start the channel 103.

(e) When processing the GPS signal L1C, a single channel 103B uses two request generation modules 102 to minimize the size of the memory used 100 (110).

(f) When using the common memory 100 (110), this memory may contain longer code sequences (which are not known at the moment the device is designed).

(g) If the total volume of code sequences is less or equal to the memory size 100 (110), then a code sequence can be just written into the memory 100 (110) and then used when necessary.

(h) The present invention is typically a microchip (ASIC), and in order to minimize the crystal size it uses:
 a plurality of standard channels 109;
 a number of modified channels 103, which is calculated according to a formula.

Figure 16:
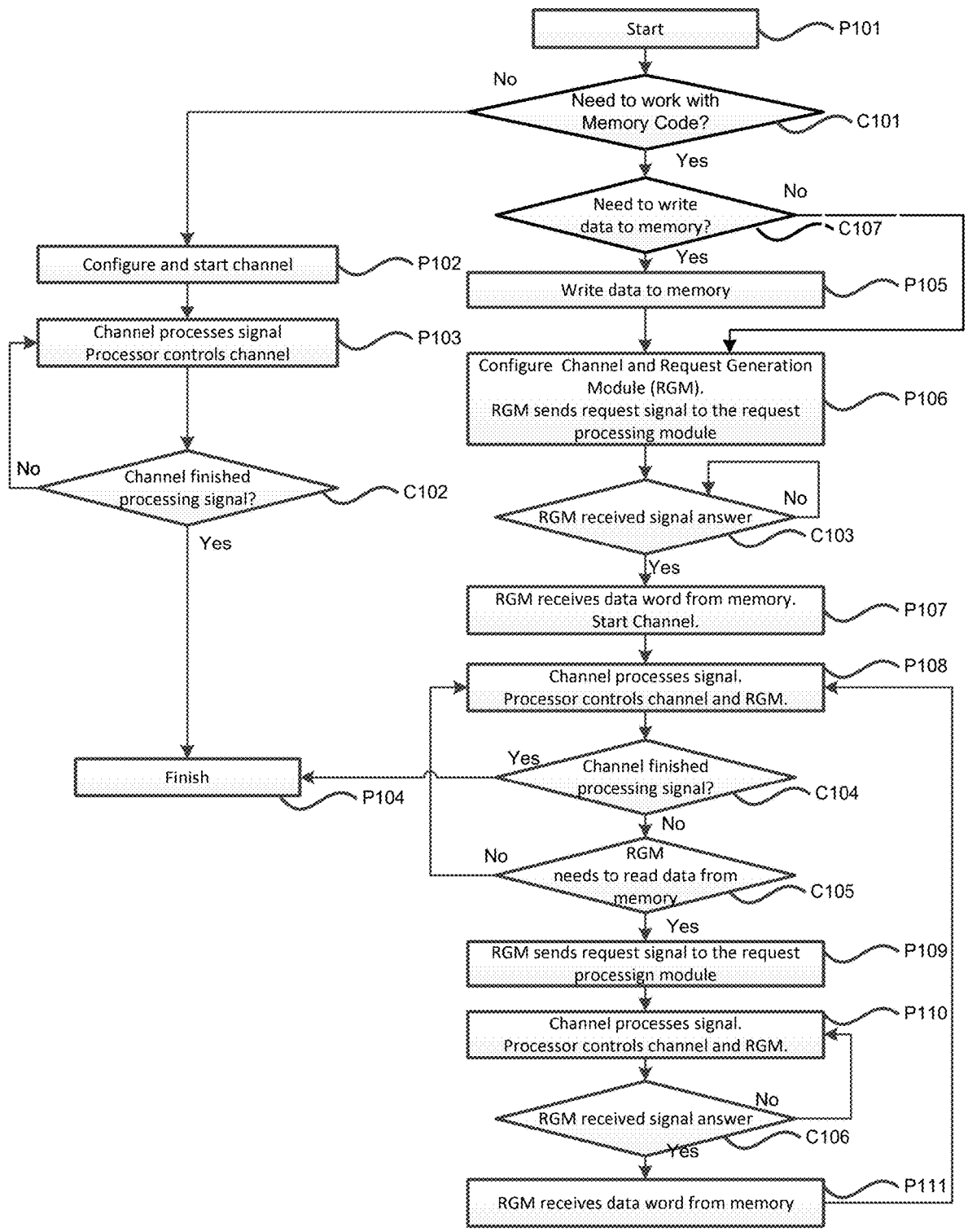
FIG. 16 illustrates operation of the receiver.

FIG. 16 illustrates operation of the receiver. In step P101, the receiver needs to receive signals from satellites. In step C101, if the signal uses Memory code as its code sequence, then go to step C107. If the code sequence can be generated by the code generator 211, then go to step P102.

In step P102, the CPU 108 initializes the channel 103. Then, depending on the signal to be processed, the CPU:
 selects the output of the necessary ADC 104 by means of the input signal switch 200;
 defines the necessary intermediate frequency (IF) in the intermediate frequency (IF) generator 201;
 defines the necessary code sequence frequency in the code frequency generator 202;
 sets up the additional code generator 214, if necessary;
 sets up strobe generators 210, 223;
 sets up the accumulation period generator 215.

After initialization, the CPU 108 starts the intermediate frequency (IF) generator 201 and the code frequency generator 202. In step P103, the channel 103 processes the signal, while being controlled by the CPU 108. While the input signal is being processed with the modified channel 103, the following parameters can be changed by the CPU 108, if necessary:
 code frequency and phase in the code frequency generator 202;
 intermediate frequency (IF) and phase in the intermediate frequency (IF) generator 201;
 the accumulation period in the accumulation period generator 215;
 additional code in the additional code generator 214;
 strobes in strobe generators 203, 220.
If necessary, the following data are read by the CPU 108:
 the code phase from the code frequency generator 202;
 the intermediate phase from the intermediate frequency (IF) generator 201;
 the state of the accumulation period generator 215;
 values from channel buffers 207, 208, 209, 222.

In step P104, the channel 103 finishes signal processing.

In step C102, if the CPU 108 considers that the channel 103 has finished working with the signal, then go to step P104. If the CPU 108 considers that the channel 103 is still processing the signal, then go to step P103.

In step C107, if the memory 100 (110) doesn't contain the necessary code sequence, then go to step P102. If the code sequence has been already written into the memory 100 (110), then go to step P106.

In step P102, the CPU 108 writes the code word sequence into the memory 110 (or into the memory 100 via the FIFO module 107).

In step P106, the CPU 108 initializes the Request Generation Module (RGM) 102. The CPU:
 defines the initial address of the necessary code sequence in the initial address register 300;
 defines the final address of the necessary code sequence in the final address register 301;
 if the code sequence length is not a multiple of the word length in the memory 100 (110), the data are written into the remainder size register 305 and the remainder register 306.

The CPU 108 initializes the channel 103. Then, depending on the signal to be processed, the CPU:
 selects the output of the necessary ADC 104 by means of the input signal switch 200;
 defines the necessary intermediate frequency (IF) in the intermediate frequency (IF) generator 201;
 defines the necessary code sequence frequency in the code frequency generator 202;
 sets up the additional code generator 214, if necessary;
 sets up strobe generators 210, 223;
 sets up the accumulation period generator 215.

In step C103, at the initialization stage, the Request Generation Module (RGM) 102 generates a request signal S312. If there is an answer signal S314, then go to step P107. If there is no answer signals S314, then RGM 102 waits for it.

In step P107, on receiving the answer signal S314 the data are re-written from memory into the code shift register 309 and the buffer register 308.

After initialization, the CPU 108 starts the intermediate frequency (IF) generator 201 and the code frequency generator 202.

In step P108 the channel 103 processes the signal, while the CPU 108 controls both the channel 103 and the RGM 102.

While the input signal is being processed with the modified channel 103, the following parameters can be changed by the CPU 108, if necessary:
 code frequency and phase in the code frequency generator 202;
 intermediate frequency (IF) and phase in the intermediate frequency (IF) generator 201;
 the accumulation period in the accumulation period generator 215;
 the additional code in the additional code generator 214;
 strobes in strobe generators 203, 220;
 the initial address register 300;
 the final address register 301.
If necessary, the following data are read by the CPU 108:
 the code phase from the code frequency generator 202;
 the intermediate phase from the intermediate frequency (IF) generator 201;
 the state of the accumulation period generator 215;
 values from channel buffers 207, 208, 209, 222;
 the mistake counter buffer 310.

In step C104 if the CPU 108 considers that the channel 103 has finished working with the signal, then go to step P104. If the CPU 108 considers that the channel 103 is still processing the signal, then go to step C105.

In step C105, if the code sequence element counter 302 in the RGM 102 has counted N+1 pulses (the memory word length 100 or 110) of the code frequency S217 or the first pulse of the code frequency S217 has been received, then go to step P109, else go to step P108.

In step P109, the RGM 102 generates a request signal S312 for the request processing module 101A (101B).

In step P110, the same procedure as in P108.

In step C106, the Request Generation Module (RGM) 102 generates a request signal S312. If there is an answer signal S314, then go to step P111. If there is no answer signals S314, then RGM 102 waits for it.

In step P111, on receiving the answer signal S314 the data word is re-written from memory D313 into the buffer register 308. Then go to step P108.

Figure 17:
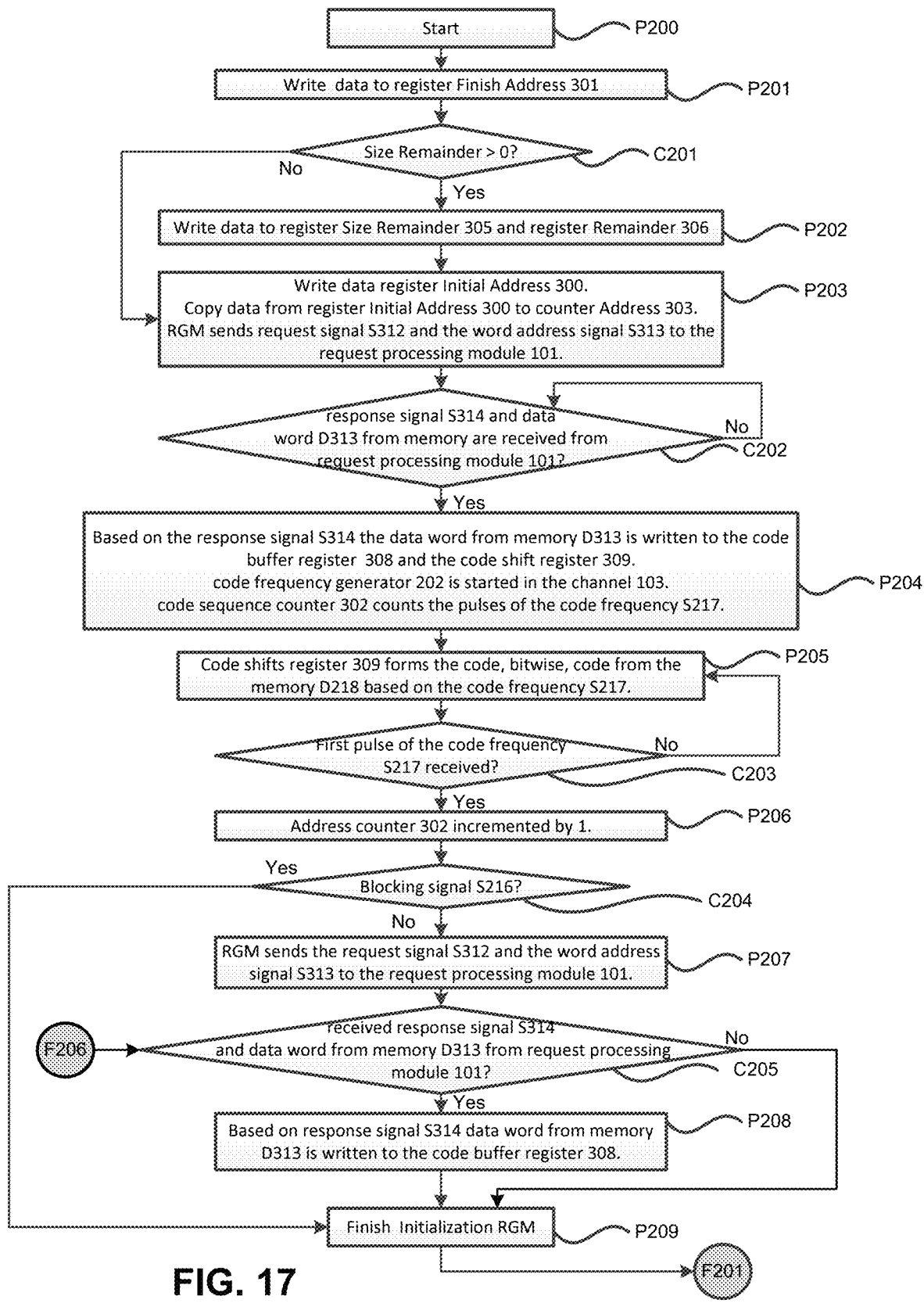
FIG. 17 illustrates initialization of the RGM 102.

FIG. 17 illustrates initialization of the RGM 102.

In step P200, the receiver needs to receive a signal from satellite with Memory code. In step P201, the final address of the selected code sequence is written into the final address register 301. In step C201, if the selected code sequence is not a multiple of the word length in the memory 100 (110) N+1, then the remainder size is over 0, so go to step P202, else go to step P203.

In step P202, the data re-written into the remainder size register 305 and the remainder register 306. In step P203, the initial address of the selected code sequence is written into the initial address register 300. Then the data from the initial address register 300 are copied into the address counter 303. The RGM 102 sends a request signal S312 and s-word address signal S313 to the request processing module 101. In step C202, the RGM 102 waits for the answer signal S314 and the data word from memory D313 from the request processing module 101. If the answer signal S314 is received, then go to step P204. In step P204, on receiving the answer signal S314, the data word from memory D313 is re-written into the code buffer register 308 and the code shift register 309. After initialization, the CPU 108 starts the intermediate frequency (IF) generator 201 and the code frequency generator 202.

The code sequence counter 302 counts the pulses of the code frequency S217. The code sequence counter 302 is working continuously, while the channel 103 is processing the signal. In step P205, the code shift register 309 generates the memory code D218, bitwise, based on the code frequency S217. The memory code D218 is sent, bitwise, continuously, while the channel 103 is processing the signal.

In step C203 if the first pulse of the code frequency S217 is received, then go to step P206. In step P205, the code sequence element counter 302 increments by 1.

In step C204 if the CPU has already written the code "forward" shift into the code frequency generator 202, then the blocking signal S216 is to be generated. If the blocking signal S216 has been generated, then go to step P209, else go to step P207 Since no request signals S312 are sent, this action prevents the request processing module 101 from excessive load and allows the system to follow the Equation 1.

In step P207, the RGM sends request signal S312 and word address signal S313 to the request processing module 101. In step C205. The RGM 102 waits for the answer signal S314 and the data word from memory D313 from the request processing module 101. If the answer signal S314 is received then go to step P208, else go to step P209. In step P208, on receiving the answer signal S314, the data word from memory D313 is re-written into the code buffer register 308. Go to step P209. In step P209, the RGM 102 is initialized. Go to label F201.

Figure 18:
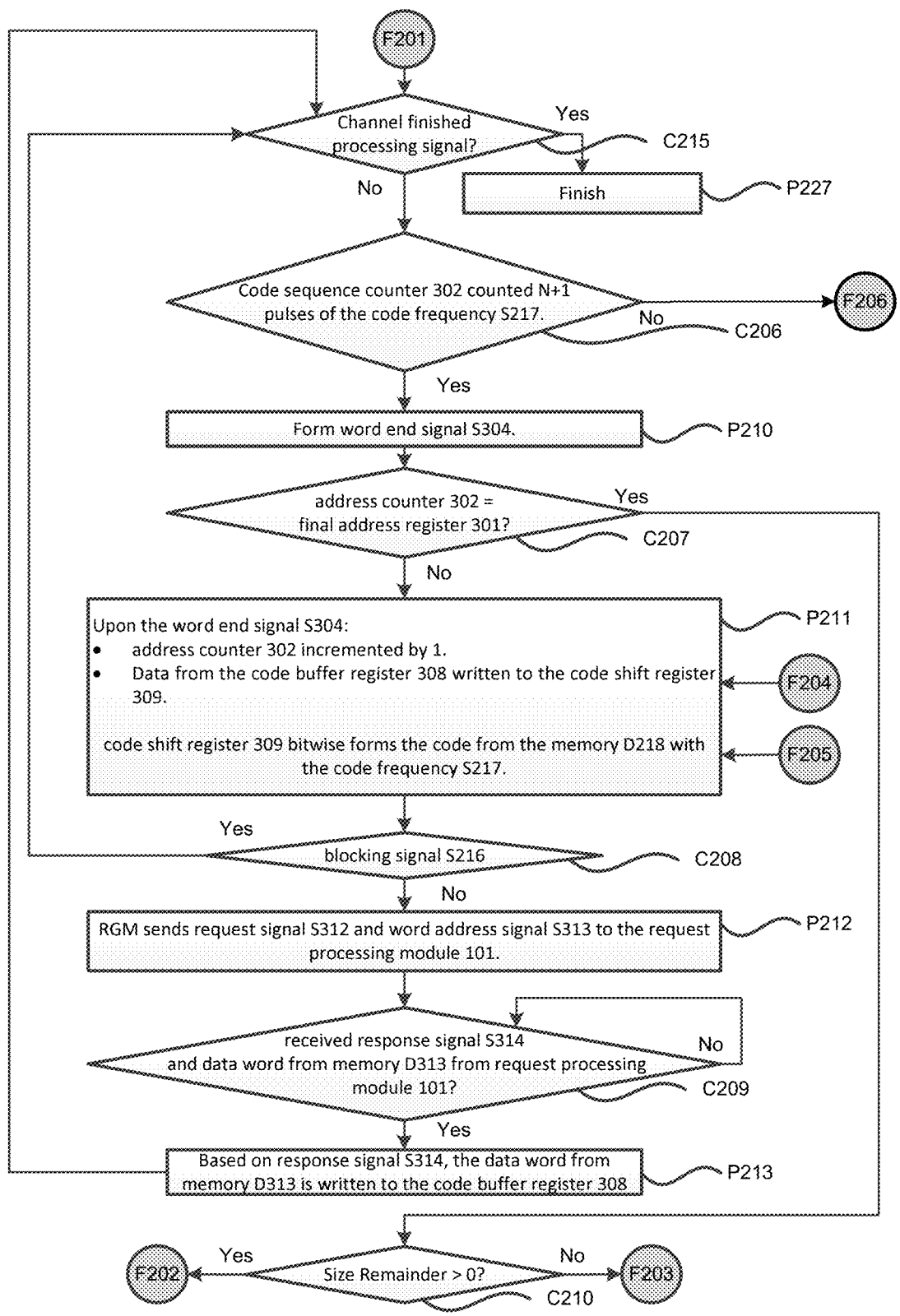
FIG. 18 illustrates continuous functioning of the RGM.

FIG. 18 illustrates continuous functioning of the RGM 102.

In step F201, after the RGM 102 is initialized, go to step C215. In step C215, if the CPU 108 considers that the channel 103 has finished working with the signal, then go to step P227. If the CPU 108 considers that the channel 103 is still processing the signal, then go to step C206.

In step C206, if the code sequence element counter 302 has counted N+1 pulses (the memory word length) of the code frequency S217, then go to step P210, else go to label F206, go to step C205.

In step P210, the data word from memory D313 has been received and transformed, bitwise, into the memory code D218. The word end signal S304 is generated. In step C207, check, whether the code sequence has ended, and it is necessary:

to re-write data from the initial address register 300 into the address counter 302;

if the remainder size is over 0, then the remainder 306 is generated.

If the address counter 302 hold the same value as the final address register 301, then we go to C210, else go to step P211.

In step P211, after the data word from memory D313, which was received before, has been re-generated, bitwise, into the memory code D218, the next word from memory is taken from the code buffer 309 and re-written into the code shift register 308 in response to the word end signal S304. On receiving the word end signal S304, the address counter 302 increments by 1. The code shift register 309 generates, bitwise, the memory code D218 based on the code frequency S217. The memory code D218 is sent, bitwise, continuously, while the channel 103 is processing the signal.

In step C208, if the CPU 108 has already written the code "forward" shift into the code frequency generator 202, then the blocking signal S216 is to be generated. If the blocking signal S216 has been generated, then go to step C215, else go to step P212.

Since no request signals S312 are sent, this action prevents the request processing module 101 from excessive load and allows the system to follow the Equation 1.

In step P212, the RGM sends the request signal S312 and the word address signal S313 to the request processing module 101.

In step C209, the RGM 102 waits for the answer signal S314 and the data word from memory D313 from the request processing module 101. If the answer signal S314 is received, then go to step P213.

In step P213, on receiving the answer signal S314, the data word from memory D313 is re-written into the code buffer register 308, then go to step P209, go to step C215. In step C210, if the remainder size is over 0, then go to label F202, else go to label F203.

Figure 19:
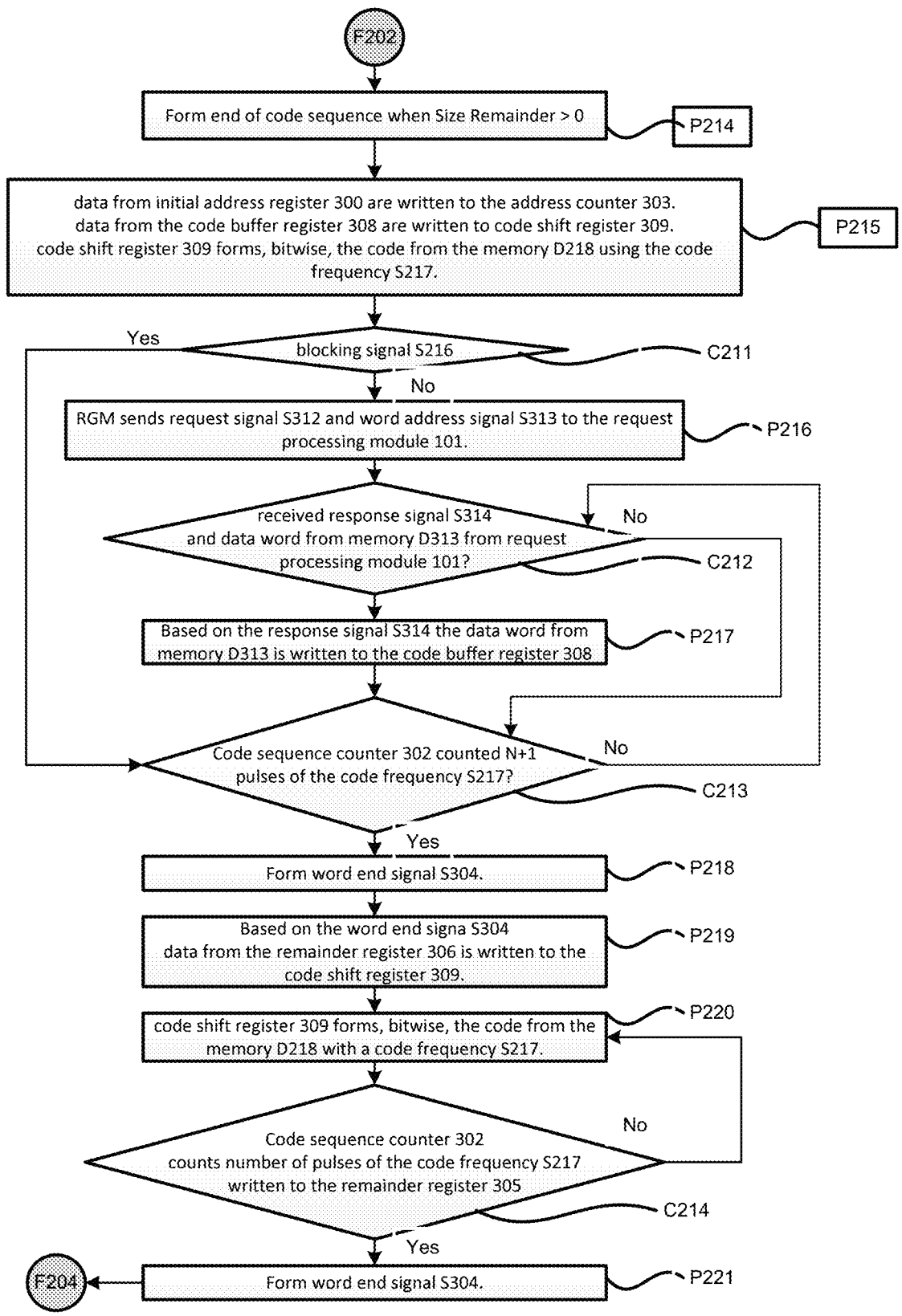
FIG. 19 illustrates generation of the code sequence ending with the remainder size greater than 0.

FIG. 19 illustrates generation of the code sequence ending with the remainder size 305 greater than 0.

In step F202, the remainder size is over 0. Go to step P214. In step P214, the code sequence ending with the remainder size over 0 is generated. Go to step P215. In step P215:

(a) The initial address 300 is written into the address counter 303.

(b) The data from the code buffer register 308 are re-written into the code shift register 309.

(c) The code shift register 309 generates, bitwise, the memory code D218 based on the code frequency S217. The memory code D218 is sent, bitwise, continuously, while the channel 103 is processing the signal.

In step C211 if the CPU 108 has already written the code "forward" shift into the code frequency generator 202, then the blocking signal S216 is to be generated. If the blocking signal S216 has been generated, then go to step C213, else go to step P216.

Since no request signals S312 are sent, this action prevents the request processing module 101 from excessive load and allows the system to follow the Equation 1.

In step P216, the RGM sends the request signal S312 and the word address signal S313 to the request processing module 101. In step C212, the RGM 102 waits for the answer signal S314 and the data word from memory D313 from the request processing module 101. If the answer signal S314 is received, then go to step P217, else C213.

In step P217, on receiving the answer signal S314, the data word from memory D313 is re-written into the code buffer register 308, go to step C215.

In step C213, if the code sequence element counter 302 has counted N+1 pulses (the memory word length) of the code frequency S217, then go to step P218, else go to C212. In step P218, the data word from memory D313 has been received and transformed, bitwise, into the memory code D218. The word end signal S304 is generated. In step P219, on receiving the word end signal S304, the data from the remainder register 306 are re-written into the code shift register 309.

In step P220, the code shift register 309 generates, bitwise, the memory code D218 based on the code frequency S217. The memory code D218 is sent, bitwise, continuously, while the channel 103 is processing the signal.

In step C214, if the code sequence element counter 302 has counted the number of pulses of the code frequency S217 equal to the number written in the remainder register 305, then go to step P221. In step P221, the data word from memory D313 has been received and transformed, bitwise, into the memory code D218. The word end signal S304 is generated. Go to label F204, go to step P211.

Figure 20:
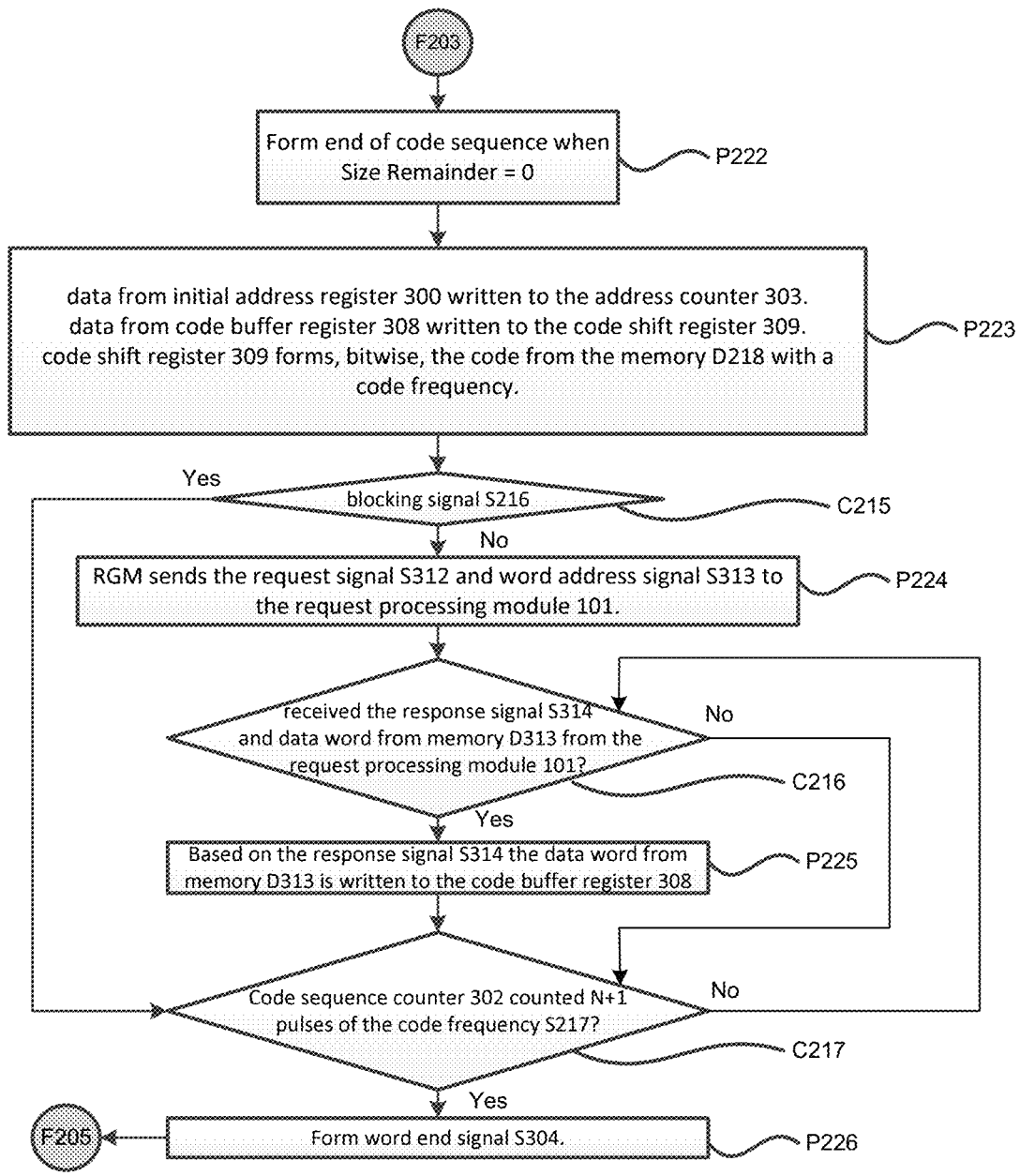
FIG. 20 illustrates generation of the code sequence ending with the remainder size of 0.

FIG. 20 illustrates generation of the code sequence ending with the remainder size 305 of 0.

In step F203, the remainder size is 0. Go to step P222. In step P222, the code sequence ending with the remainder size of 0 is generated. Go to step P223. In step P223:

(a) The initial address 300 is written into the address counter 303.

(b) The data from the code buffer register 308 are re-written into the code shift register 309.

(c) The code shift register 309 generates, bitwise, the memory code D218 based on the code frequency S217. The memory code D218 is sent, bitwise, continuously, while the channel 103 is processing the signal.

In step C215, if the CPU 108 has already written the code "forward" shift into the code frequency generator 202, then the blocking signal S216 is to be generated. If the blocking signal S216 has been generated then go to step C217, else go to step P224. Since no request signals S312 are sent, this action prevents the request processing module 101 from excessive load and allows the system to follow the Equation 1.

In step P224, the RGM sends the request signal S312 and the word address signal S313 to the request processing module 101.

In step C216, the RGM 102 waits for the answer signal S314 and the data word from memory D313 from the request processing module 101. If the answer signal S314 is received, then go to step P225, else C217.

In step P225, on receiving the answer signal S314, the data word from memory D313 is re-written into the code buffer register 308, go to step C217.

In step C217, if the code sequence element counter 302 has counted N+1 pulses (the memory word length) of the code frequency S217, then go to step P226, else go to C216. In step P226, the data word from memory D313 has been received and transformed, bitwise, into the memory code D218. The word end signal S304 is generated. Go to label F205, go to step P211. In step P227, the channel 103 finishes signal processing.

FIG. 21 illustrates operation of mistake counter

In step P300, while the plurality of channels 103 are working with signals with memory code, if the Equation 1 is not followed, lower priority channels may not be able to receive answer signals S314 before the next request signal S312 is generated. Thus, a part of the code sequence will be generated incorrectly. In this case, it could be useful to count the number of words, which have not been received from memory.

In step C300, if the RGM has sent the request signal S312 and the word address signal S313 to the request processing module 101, then go to step C301. In step C301 if the accumulation period signal S219 has been received, then go to step P301, else go to step C302.

In step P301, on receiving the accumulation period signal S219:

(a) the mistake counter 310 value is re-written into the internal buffer of the mistake counter;

(b) the mistake counter 310 is reset;

(c) the given value from the buffer can be read by the CPU 108 during the next accumulation period S219.

Then go to step C202.

In step C302, if the CPU 108 considers that the channel 103 has finished working with the signal, then go to step P302. If the CPU 108 considers that the channel 103 is still processing the signal, then go to step C303.

In step C303, the RGM 102 waits for the answer signal S314 and the data word from memory D313 from the request processing module 101. If the answer signal S314 is received, then go to step C300, else go to step C304.

In step C304 if the RGM has sent the request signal S312 and the word address signal S313 to the request processing module 101, then go to step P303, else go to step C301. In step P303, the mistake counter 310 increments by 1, since a new request signal S312 has been generated before the answer signal S314 was received. Then go to step C301. In step P302, the channel 103 finishes signal processing.

Figure 22:
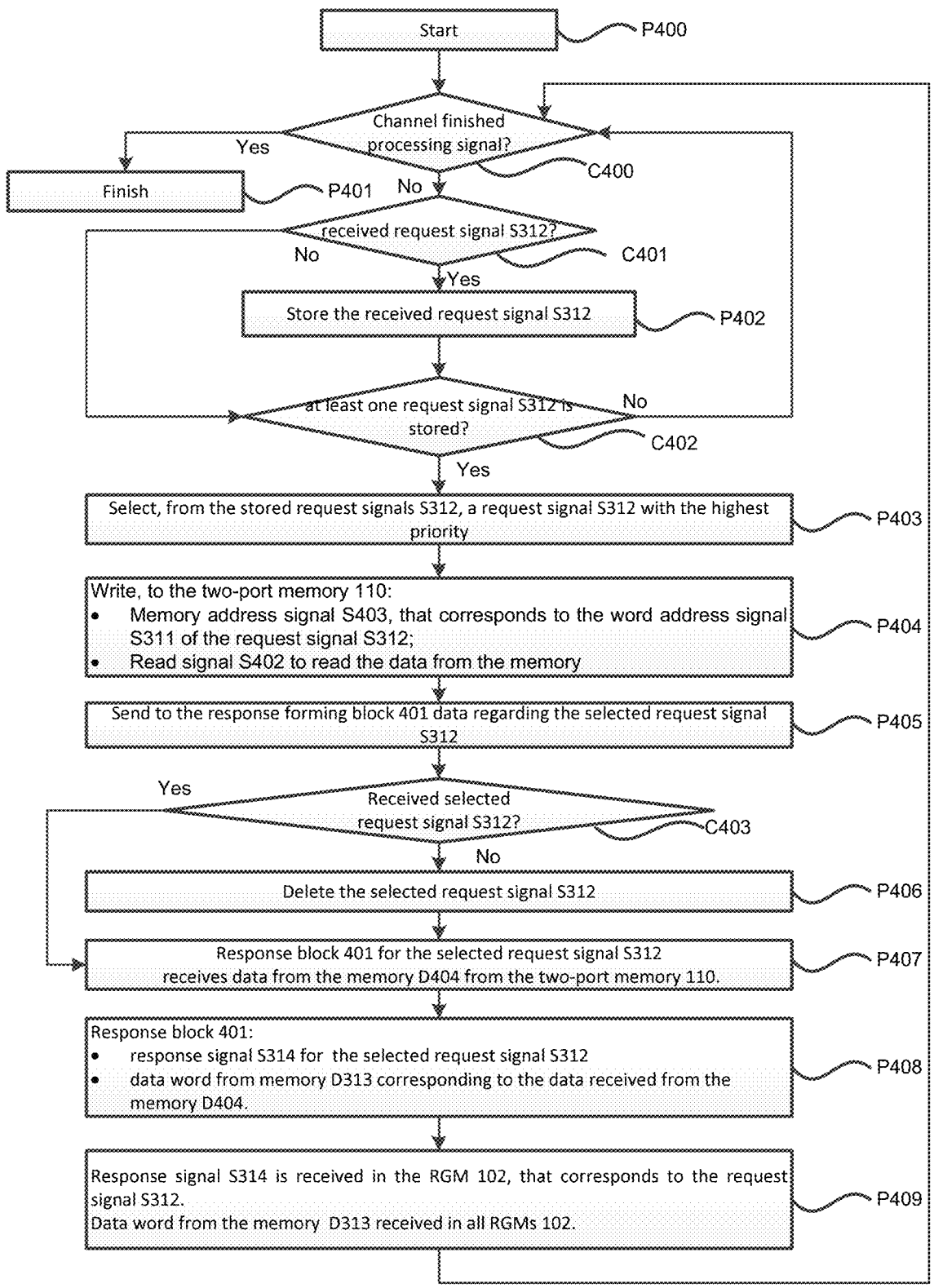
FIG. 22 illustrates request processing by the request processing module with a dual-ported memory.

FIG. 22 illustrates request processing by the request processing module with a dual-ported memory.

In step P400, while the plurality of channels 103 are working with signals with memory code, the RGM 102 sends request signals S312, which are processed by the request processing module with dual-ported memory. In step C400, if the CPU 108 considers that the channel 103 has finished working with the signal, then go to step P401. If the CPU 108 considers that the channel 103 is still processing the signal, then go to step C401. In step P401, channels 103 finish signal processing.

In step C401, if the request signal S312 has been received, then go to step P402, else go to step C402. In step P402, the priority unit 400 stores the request signal S312, which has been received. In step C402, if there is at least one request signal S312 stored in the priority unit 400, then go to step P403, else go to step C400.

In step P403, the priority unit 400 selects the highest-priority request signal S312 from its storage. In step P404, addressing the dual-ported memory 110:

a memory address signal S403 is generated, which corresponds to the word address signal S311 for the selected request signal S312;

a signal of reading from memory S402 is generated.

In step P405 the data of the selected request signal S312 are sent to the answer generation unit 401. In step C403, if the selected request signal S312 has been received, then go to step P407, else go to step P406. In step P406, the selected request signal S312 is deleted from the priority unit 400.

In step P407, the answer generation unit 401 receives the data D404 read from the dual-ported memory 110 for the selected request signal S312. In step P408, the answer generation unit 401:
- generates an answer signal S314 for the RGM 102, which sent the selected request signal S312;
- the data read from memory D404 are sent as the memory data word D313 for the selected request signal S312.

In step P409, the RGM 102, which sent the selected request signal S312, receives the answer signal S314. The memory data word D313 is sent to all RGMs 102. As a result, each RGM 102 presents its own word address signal S311 to the request processing module 101 and receives data located at the given address position in the dual-ported memory 110. Then, go to C400.

Figure 23:
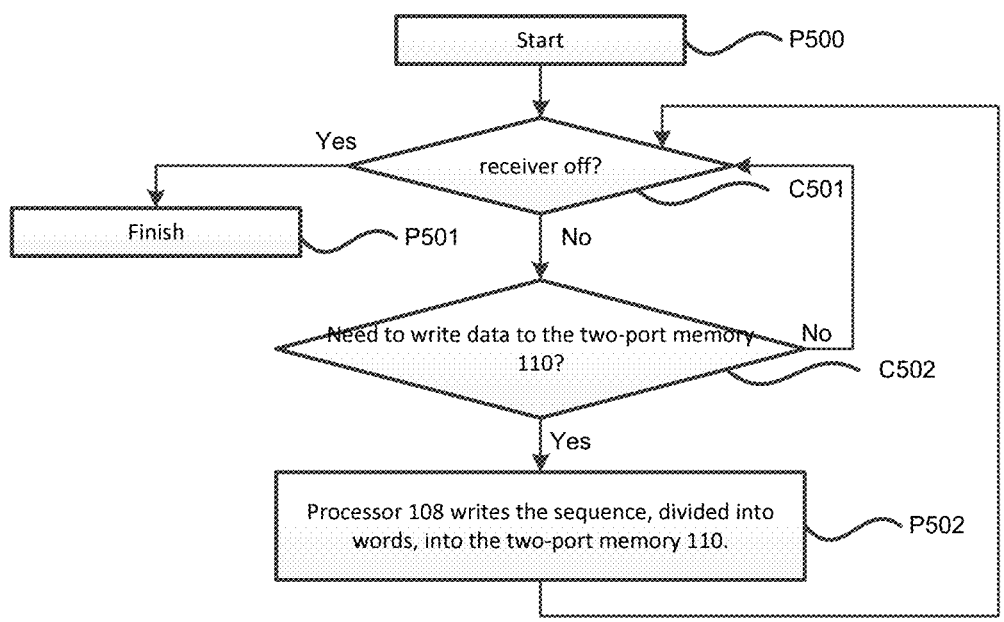
FIG. 23 illustrates data writing into the dual-ported memory by the CPU.

FIG. 23 illustrates data writing into the dual-ported memory by the CPU 108.

In step P500, while the plurality of channels 103 are working with signals with memory code, the CPU 108 may need to write a new code sequence into the dual-ported memory 110. In step C501 if the channels are currently receiving signals, go to step C502, else go to step P501.

In step P501 channels 103 finish signal processing. In step C502 if the memory doesn't contain a memory code to be processed by the channel 103, then the data have to be written into memory; go to step P502, else go to step C501. In step P502 the CPU 108 writes the code sequence divided into words (with length of N+1) into the dual-ported memory 110. Then go to step C501.

Figure 24:
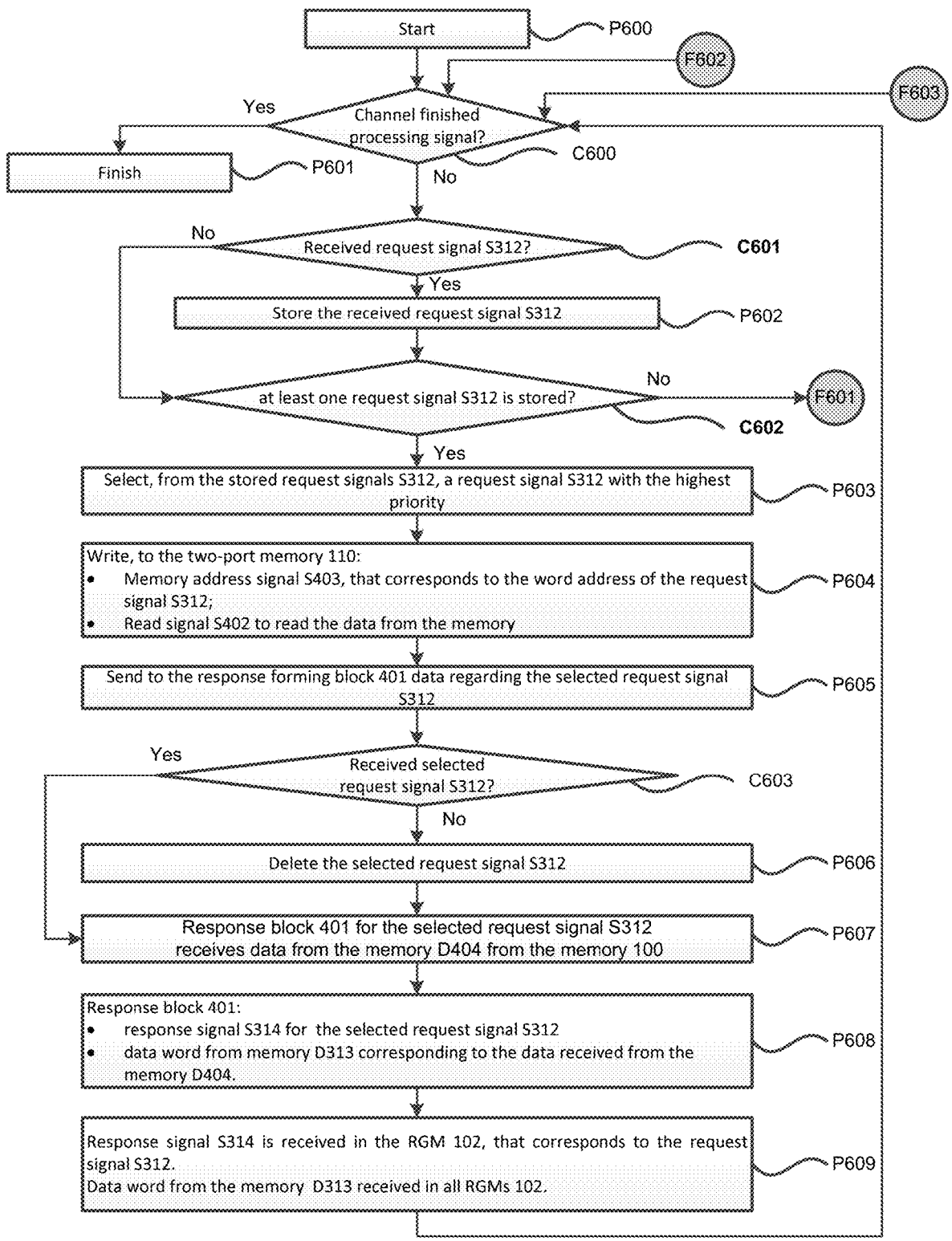
FIG. 24 illustrates processing of requests by the request processing module with FIFO.

FIG. 24 illustrates processing of requests by the request processing module with FIFO.

In step P600, while the plurality of channels 103 are working with signals with memory code, the RGM 102 sends request signals S312, which are processed by the request processing module with FIFO. In step C600, if the CPU 108 considers that the channel 103 has finished working with the signal, then go to step P601. If the CPU 108 considers that the channel 103 is still processing the signal, then go to step C601.

In step P601 channels 103 finish signal processing. In step C601 if the request signal S312 has been received, then go to step P602, else go to step C602. In step P602 the priority unit 400 stores the request signal S312, which has been received. In step C602 if there is at least one request signal S312 stored in the priority unit 400, then go to step P603, else go to label F601, go to step C604.

In step P603 the priority unit 400 selects the highest-priority request signal S312 from its storage. In step P604 Addressing the memory 100 is performed:
- a memory address signal S403 is generated, which corresponds to the word address signal S311 for the selected request signal S312;
- a signal of reading from memory S402 is generated.

In step P605 the data of the selected request signal S312 are sent to the answer generation unit 401. In step C603 if the selected request signal S312 has been received, then go to step P607, else go to step P606. In step P606 the selected request signal S312 is deleted from the priority unit 400. In step P607 the answer generation unit 401 receives the data D404 read from the memory 100 for the selected request signal S312.

In step P608 the answer generation unit 401:
- generates an answer signal S314 for the RGM 102, which sent the selected request signal S312;
- the data read from memory D404 are sent as the memory data word D313 for the selected request signal S312.

In step P609 the RGM 102, which sent the selected request signal S312, receives the answer signal S314. The memory data word D313 is sent to all RGMs 102. As a result, each RGM 102 presents its own word address signal S311 to the request processing module 101 and receives data located at the given address position in the memory 100. Then, go to C600.

Figure 25:
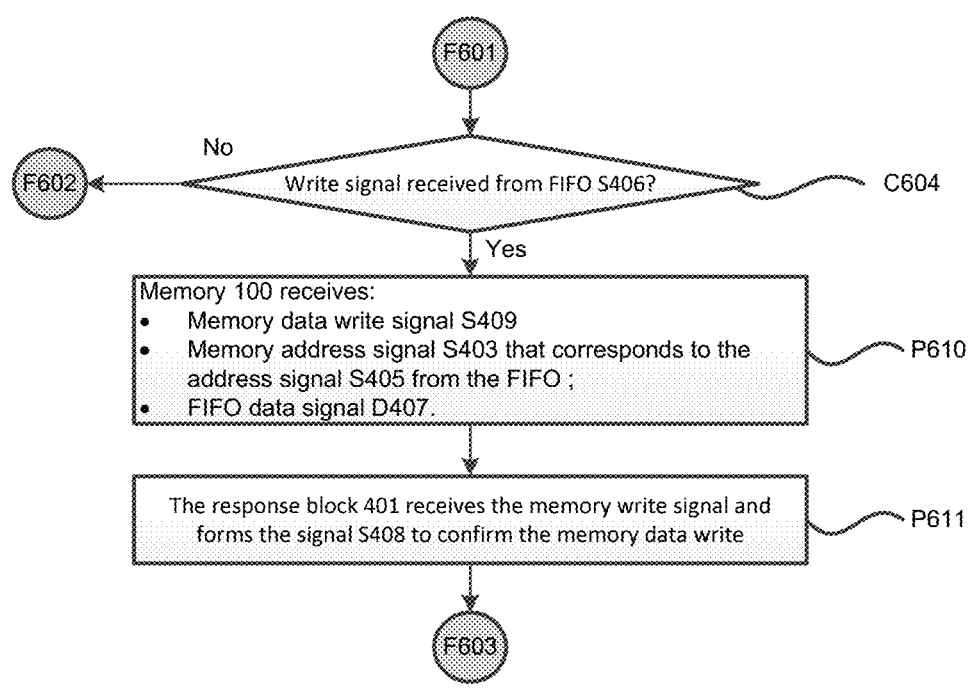
FIG. 25 illustrates processing of the FIFO module entry by the request processing module with FIFO.

FIG. 25 illustrates processing of the FIFO module 107 entry by the request processing module with FIFO.

In step F601 the priority unit 400 doesn't contain any request signals S312 (saved earlier).

In step C604 if there is a writing signal from FIFO S406, then go to step P610, else go to label F602, go to step C600. It signifies that there are data in the FIFO module 107 that have to be written into the memory 100.

In step P610 Data are written into the memory 100. The memory 100 receives the following signals:
(a) signal of writing data into memory S409;
(b) address signal from FIFO S405 is sent instead of the memory address signal S403;
(c) FIFO data signal D407.

In step P611 the answer unit 401 receives the signal of writing data into memory S409, which is used to generate the confirmation signal of writing data into memory S408. Then go to label F603, go to step C600.

Figure 26:
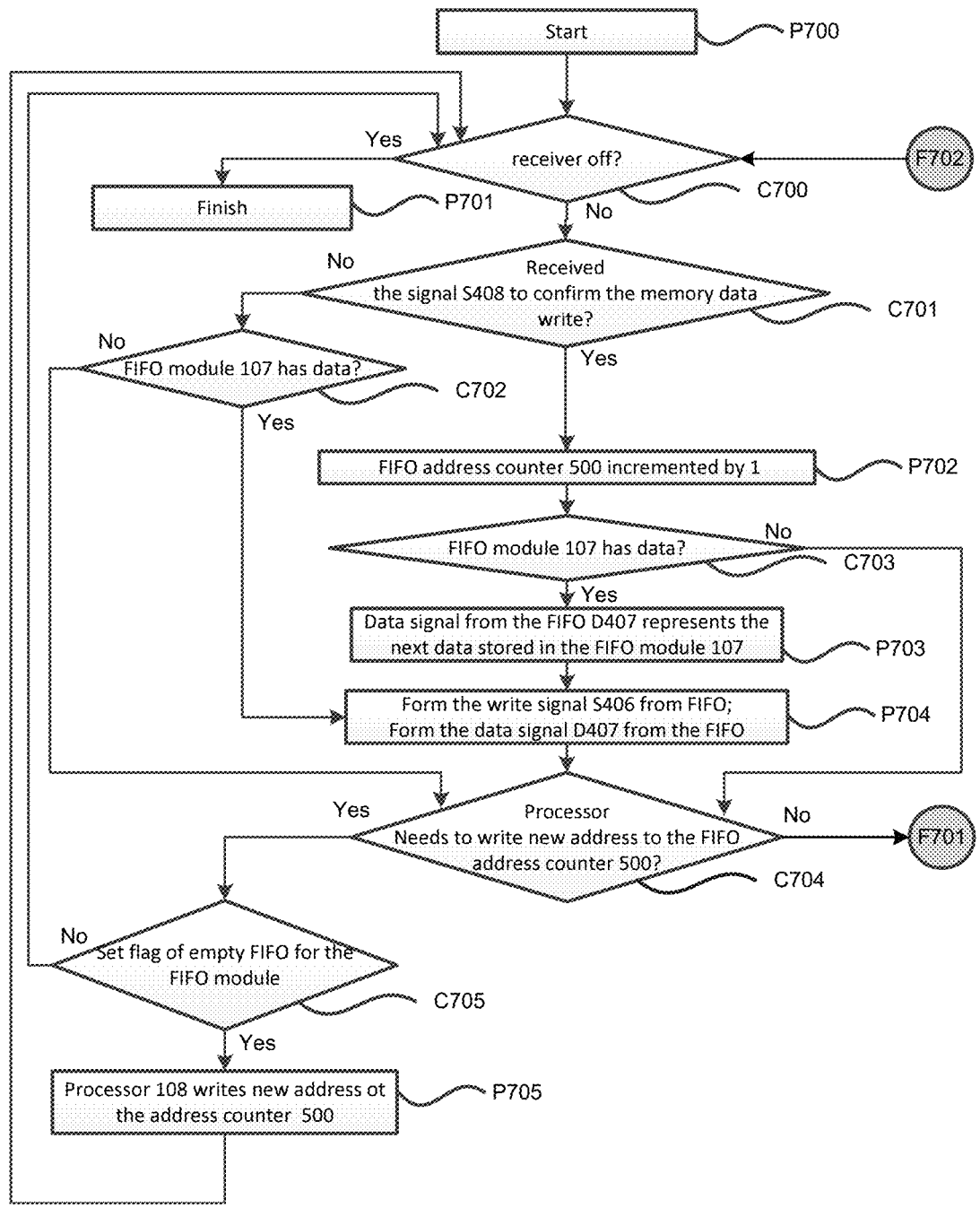
FIG. 26 illustrates operation of the FIFO module.

FIG. 26 illustrates operation of the FIFO module 107.

In step P700 while the plurality of channels 103 are working with signals with memory code, the CPU 108 may need to write a new code sequence into the memory 100. In step C700 if the channels are currently receiving signals, go to step C701, else go to step P701.

In step P701 channels 103 finish signal processing. In step C701 if the FIFO module 107 has received the confirmation signal of writing data into memory S408, then go to step P702, else go to step C702. In step C702 check, whether there are data in the FIFO module 107. If there are data in the FIFO module 107 that have to be written into the memory 100, then go to step P704, else go to step C704.

In step P702 on receiving the confirmation signal of writing data into memory S408, the FIFO address counter 500 increments by 1. Then go to step C703. In step C703 check, whether there are data in the FIFO module 107. If there are data in the FIFO module 107 that have to be written into the memory 100, then go to step P703, else go to step C704. In step P703 the data signal from FIFO D407 is substituted with the following data stored in the FIFO module 107. In step P704 the write signal from FIFO S406 is generated for the request generation module 101B. The data signal from FIFO D407 is sent to the memory 100. Then go to step C704.

In step C704 the CPU 108 wants to write a new code sequence by setting the initial address of the sequence. If the CPU 108 needs to write a new address into the FIFO address counter 500, then go to step C705, else go to label F701, go to step C706. In step C705 check whether the FIFO module 107 is empty. If the FIFO empty flag is on, then go to step P705, else go to step C700. In step P705 the CPU 108 writes the new address into the FIFO address counter 500. Thus, the initial address of the new code sequence is defined.

Figure 27:
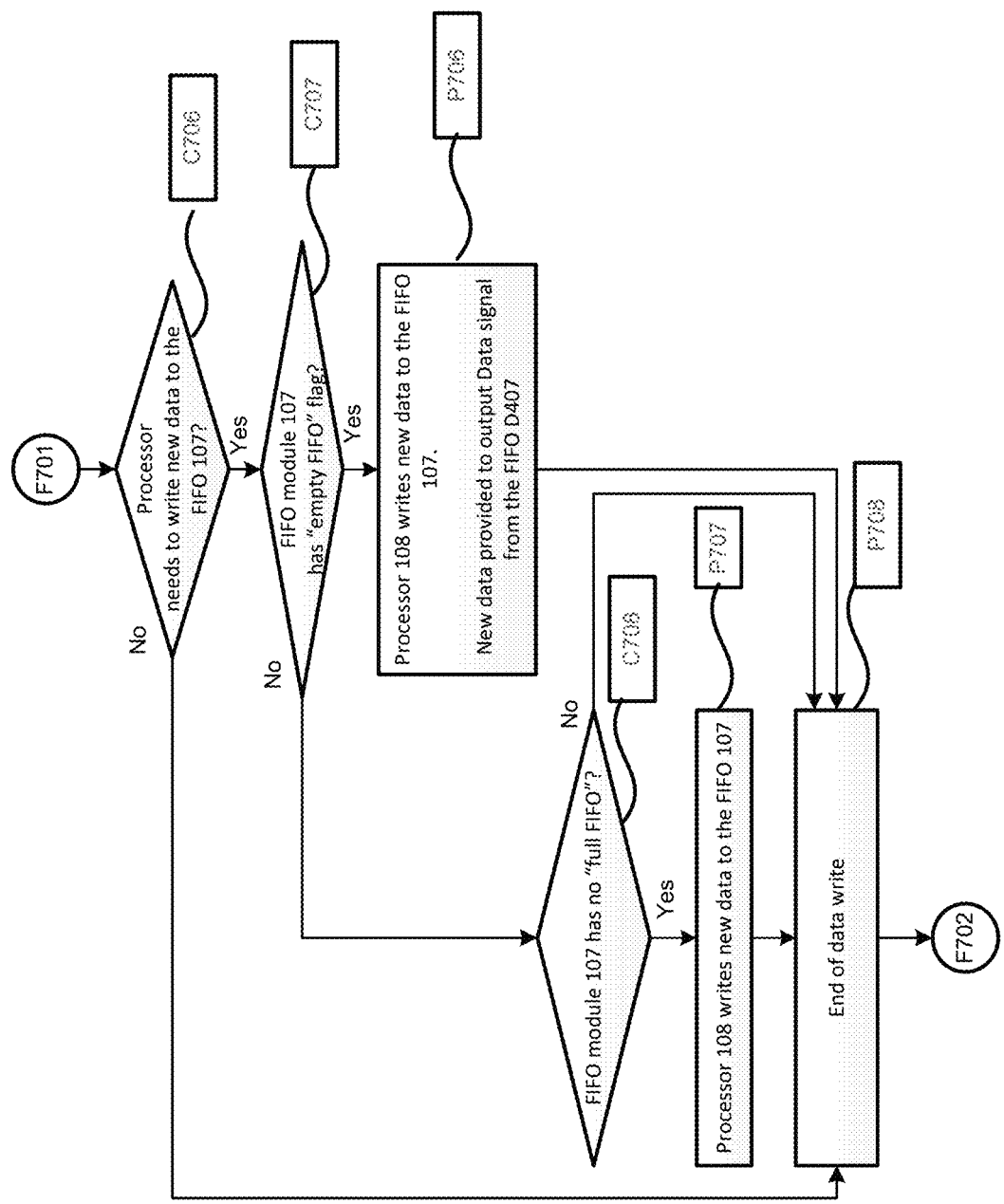
FIG. 27 illustrates operation of the FIFO module.

FIG. 27 illustrates operation of the FIFO module 107. In step F701 the CPU 108 needs to write data into the memory 100. Go to step C706. In step C706 the CPU 108 wants to write data into memory. If the CPU 108 needs to write data into the memory 100, then go to step C707, else go to label P708. In step C707 check whether the FIFO module 107 is empty. If the FIFO empty flag is on, then go to step P706, else go to step C708. In step P706 the CPU 108 writes new data into the FIFO module 107. The new data are sent to the output as the data signal from the FIFO D407. Then go to step P708. In step C708 check whether the FIFO module 107 is not full. If the FIFO full flag is off, then go to step P707, else go to step P708.

In step P707 the CPU 108 writes new data into the FIFO module 107. Then go to step P708. In step P708 the procedure of data writing into the FIFO module 107 is finished. Go to label F702, then go to step C700.

Figure 28A:
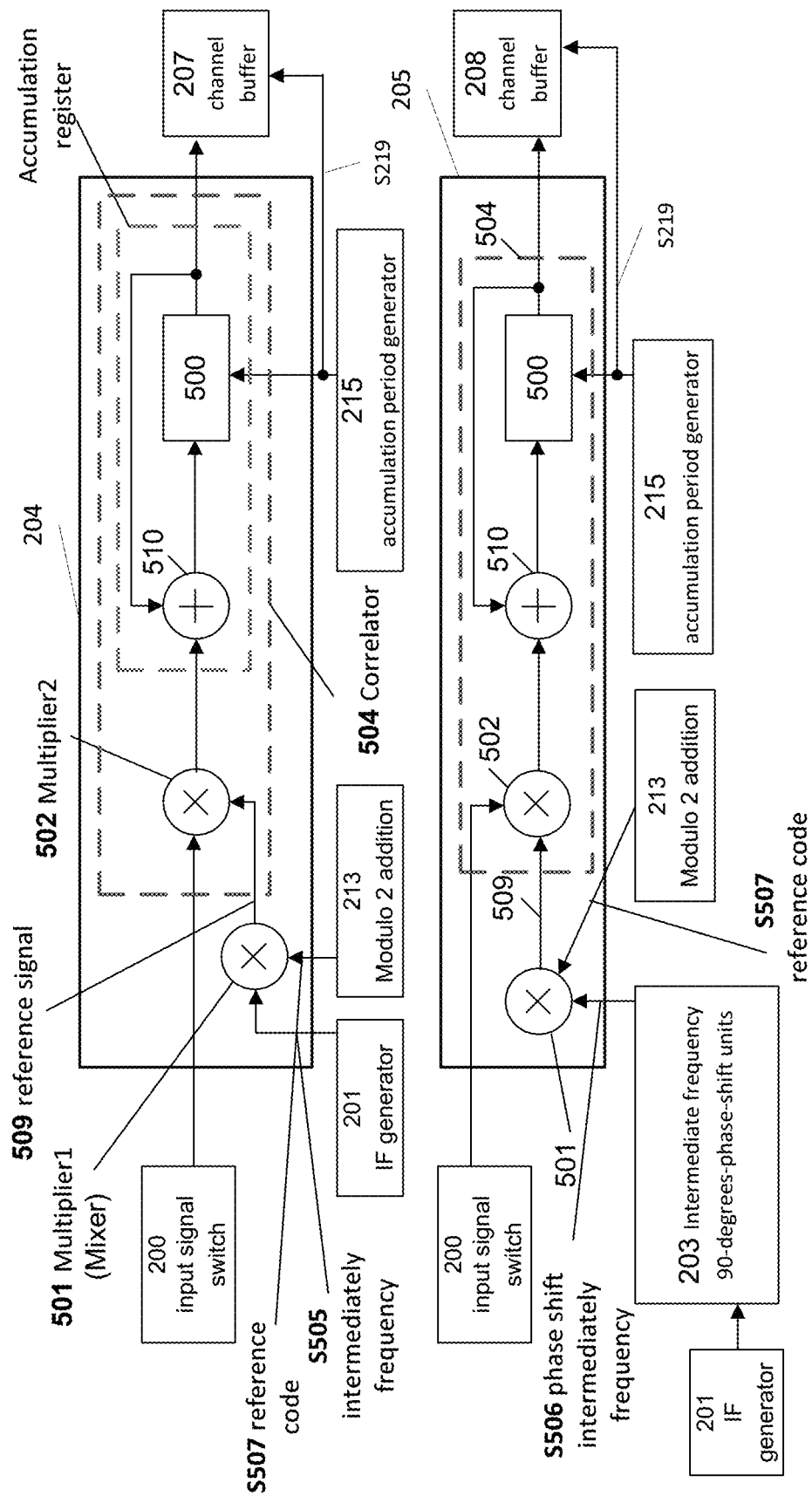
FIGS. 28A-28B illustrate the mixer and correlator used in the present invention.
Figure 28B:
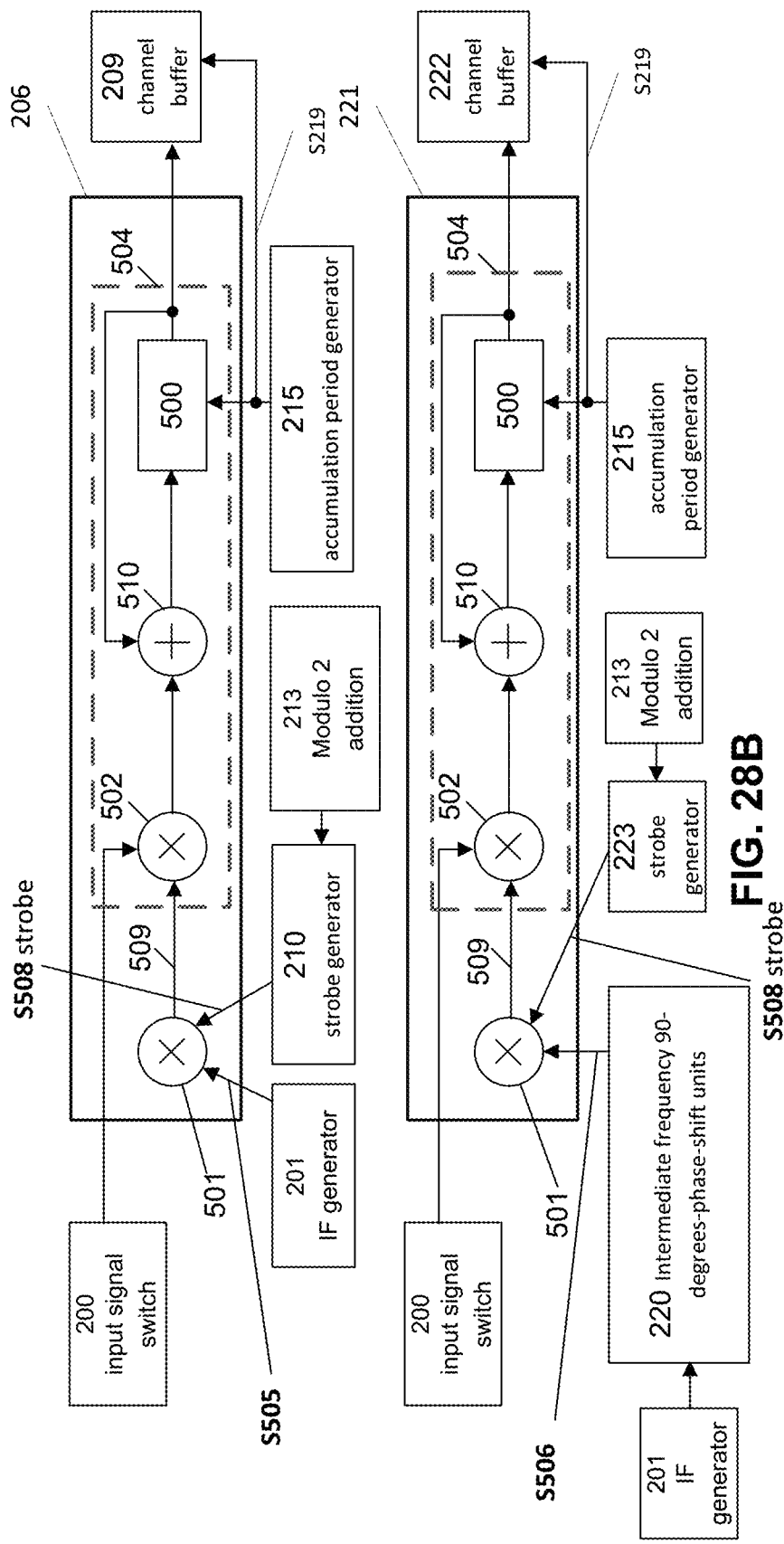

FIGS. 28A-28B illustrates an exemplary mixer and correlator used in the present invention.

In FIGS. 28A-28B, 501 is the Multiplier 1 (Mixer), 502 is Multiplier 2, 509 is the Reference signal, and 504 is the correlator. The correlator 504 receives two signals as input-signal from 200 and 503 reference signal. The mixer 501 forms the Reference signal 509 based on two inputs S505 intermediately frequency or S506 phase shift intermediately frequency and S507 reference code or S508 strobe. The Correlator 504 multiplies the input 200 by the reference 509, followed by accumulating the result using 503 and 510 during the accumulation period signal S219.

The receiver receives a code on a carrier frequency at the antenna 106, and then to the RF track 105, which then down-converts the code to intermediate frequency. The ADC 104 then converts the signal to digital form, which is then sent to the input signal switch 200. The output of the block 200 is the input for the correlator 504. IF generator 201 forms the intermediate frequency S505, which the same as that used by the RF track 105. The reference code S507 is analogous to the code transmitted by the satellite. Reference code S507 and the IF S505 enter the mixer 501, which forms the reference signal 509 (in 204 and 205). The reference signal 509 (in 204 and 205) and the output of 200 are received at the input of the correlator 504 (in 204 and 205). Reference code S507 after passing through the strobe generator 210 (223) forms the strobe signal S508, the Strobe signal S508 and the intermediate frequency S505 are received in the mixer 501 that forms the reference signal 509 (in 206 and 221). The output of the correlator 504 in the module 204 (205) is the graph C, for reference CODE, see also FIG. 29D. The output of the correlator 504 in the module 206 (221) is graph A (B), for strobe, see also FIG. 29D.

Thus, the output of 204 corresponds mathematically to a correlation of the output of 200, with a result of the multiplication of the S505 intermediate frequency and the S507 reference code. The output of 205 corresponds mathematically to a correlation of the signals output 200, with a result of multiplication of S506 (phase shifted intermediate frequency) and the S507 reference code. The output of 206 corresponds mathematically to a correlation of the signals output by 200, with a result of multiplication of S505 (the intermediate frequency) and the output 210 (strobe signal S508). The output of 221 corresponds mathematically to a correlation of the signals outputted by 200, with a result of multiplication of S506 (shifted intermediate frequency) and output of 223 (strobe S508). Using the discrimination characteristics of C, A(B) the signal from the satellite is searched for and tracked in the channel. At the same time, C should be maximized, and A(B) as close to zero as possible.

FIGS. 29A-29D illustrate the strobe generator and its operation. In these figures:

S505—intermediate frequency
S506—phase shifted intermediately frequency
S507—reference code
S508—strobe Strobe generators 210 (223) generate S508 strobe sequences for 501 Mixer internal 206 and 221. These S508 strobe sequences are influenced by S507 reference code, which is outputted by 213. The shape of strobes S507 is defined by a vector of L elements. Each element can be positive, negative or zero. In the case of a three-level amplitude strobe, the vector element can be equal to +1, −1 and 0.

Figure 29C:
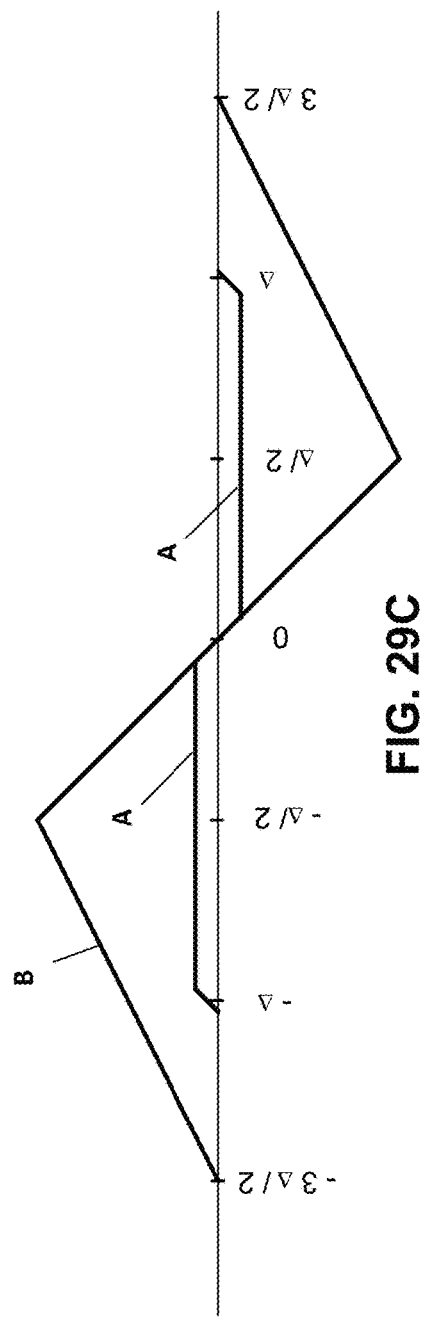
Figure 29D:
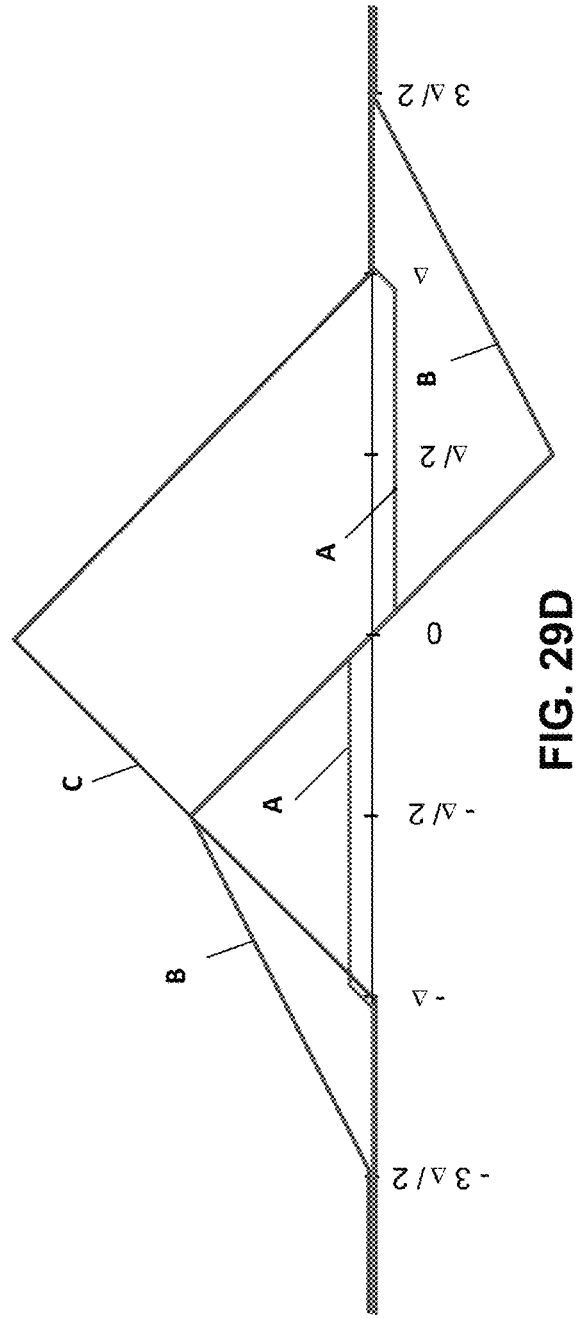

FIG. 29A and FIG. 29B show strobes S508 being formed by the Strobe generator 210 (223). FIG. 29C shows discriminator characteristics (strobe only). FIG. 29D shows discriminator characteristics (strobe and code).

FIG. 29A shows an example diagram of setting the strobe S508 for a certain S507 reference code. The strobe generator maintains four different vectors: strobe P and strobe N to generate strobe S508. Thus, FIG. 29A shows an example of generating the strobe sequence for one of the signals.

The part of the S507 reference code shown in FIG. 29A consists of the following chips: −1; 1; 1; −1; −1. In the process of S507 reference code transition from "−1 to "+1. the strobe generator 210 (223) outputs a digital sequence of the values belonging to the strobe P vector. When S507 reference code does not change (i.e., a transition from "1" to "1"), the strobe generator 210 (223) outputs a digital sequence of the values belonging to the strobe N vector. When the S507 reference code transitions from "1" to "−1, the strobe generator 210 (223) outputs a digital sequence of the strobe P vector multiplied by −1. When S507 reference code does not change (i.e., a transition from "−1 to "−1), the strobe generator 210 (223) outputs a digital sequence of strobe N vector multiplied by −1. Thus, in digital sequences generated strobe S508 for a S507 reference code from 213 Modulo 2 addition.

A scale factor (SCALE) for S508 the strobe sequence can be selected with the help of the code generator 400. At SCALE=1, the duration of strobe S508 is equal to code chip. Thus, the duration of one strobe element (at an L-element vector) is $\delta=\Delta/L$, where $\Delta$ is the duration of code chip. When the scale factor changes (e.g., a compression in time), strobe S508 (e.g., shown in FIG. 29A) is generated from the following: the values of the strobe P vector, then Zeros, the values of the strobe N, then Zeros, etc.

In this case, the duration of one strobe element is $\delta=\Delta/(SCALE*L)$ where $\Delta$ is the duration of code chip and SCALE is the scale factor.

FIG. 29B shows a diagram of the strobe P elements for a few strobe variants. The vector has an even number of elements, its middle point is tied to the code chip boundary, and the number of elements L=16.

Recall again that FIG. 29C (29D) is a graphical representation correlator output between the certain S507 reference code and the signal 200 (shown as C), strobe S508 and the signal 200 (shown as diagrams A/B), that match the variants of FIG. 29B.

By way of further explanation, output correlator signals are further used in the receiver tracking circuits (the Delay Lock Loop (DLL) and Phase Lock Loop (PLL)).

There are several ways to design the channels of such a receiver. One typical channel structure includes three correlators and enables coherent generation of the reference carrier.

The first correlator computes in-phase correlation signal I. This signal can be obtained when the reference carrier is in-phase with the input signal and is therefore the in-phase component of the input signal. The reference code in the first correlator is a replica of the PRN code modulating the input signal. In one embodiment, signal I is used to demodulate binary symbols, and may also be used as an additional signal for normalization.

The second correlator computes quadrature correlation of a signal Q. This signal is obtained when the reference carrier is shifted by JL/2 from the input carrier. The reference code is typically the same as in the first correlator. In one embodiment, signal Q is used to generate an error signal in the PLL.

The third correlator computes correlation signal dl. Correlation signal dl may be used to control the DLL. To obtain this signal, the first reference carrier, which is in-phase with the input signal carrier, is used with a reference code that consists of short strobe-pulses corresponding to PRN chips. The sign of strobe-pulses is the same as the sign of the chip coming after a corresponding strobe.

Time offsets of the reference codes in the first and second correlators may be strongly connected with an adjustable DLL shift of the main reference code in the third correlator. To control the time offset of the DLL main reference code, an error signal proportional to dl is generated.

In another embodiment, channels are designed using four correlators and a non-coherent reference carrier. Correlation of the reference carrier with the input signal results in generating two orthogonal components, while correlation with the reference code (as an input signal PRN-code replica) leads to two orthogonal correlation signals I and Q. In the third correlator, the first orthogonal component of the input signal and a reference code (short strobes) are used to form dl. In the fourth correlator, the second orthogonal component and the reference code similar to that of the third correlator are used to generate correlation signal dQ.

The quality of DLL operation may be affected by the discriminator characteristic. The discriminator characteristic is typically determined by a dependence of error signal versus time offset between the reference code and input signal.

To have PLL and DLL lock onto and track signals, delay searching and frequency searching are used. Delay searching sets an initial delay of reference code. If the error of setting the initial delay does not exceed DLL lock-in range, then DLL goes to a steady balance point. In searching by frequency, an initial frequency of the reference carrier is set with an error that does not exceed the PLL lock-in range. The PLL and DLL capability of suppressing multipath depend on the shape of the reference code.

If the main DLL correlator utilizes short, single, rectangular strobe pulses as a reference code, the DLL may suffer from multipath less than the well-known "Wide" correlator (with a chip span). Both correlators, however, often react to reflected signals with a delay less than one chip and provide approximately the same signal lock-in range.

Applying complex strobes consisting of some rectangular pulses of different polarity, it is possible to fully suppress reflected signals with delay relative to the direct signal of 0.05-0.1 chip. A drawback of this method is a decrease in the DLL lock-in range (by delay) and an increase in the DLL noise error with such a reference code.

To eliminate this drawback, a two-stage acquisition procedure may be used. In the first stage, a reference code consists of single rectangular strobes, thereby providing a wide lock in range which matches searching systems. In this state, mis-match decreases such that it would be sufficient for locking at the second stage, where complex strobes are used.

Delay Lock Loops (DLL) are part of the receiver's signal tracking loops, and their purpose is tracking the code delay (the memory code sequences) of the incoming GNSS signal. The DLL provides a correction of the current observed delay, and this correction is applied to the memory code sequences, in order to keep the memory code sequences as "matched" as possible with the incoming signal. Time offsets of the memory code sequences in the first and second registers may be strongly connected with an adjustable DLL shift of the main strobe in the third register. To control the time offset of the DLL main the memory code sequences, an error signal proportional to dl is generated.

Phase Lock Loops (PLL) are part of the receiver's signal tracking loops, and aim at tracking the phase of the incoming GNSS signal. The PLL provides a correction of the phase intermediate frequency in a continuous loop, generating a phase error signal. The most common PLL uses atan(Q/I) of the demodulated information symbol.

Frequency Lock Loops are part of the receiver's signal tracking loops, and aim at tracking the frequency of the incoming GNSS signal. The FLL provides intermediate frequency corrections in a continuous loop, generating a frequency error signal. First (I) and second (Q) are used to calculate FLL.

Output correlator signals are further used in the receiver tracking circuits (the Delay Lock Loop (DLL) and Phase Lock Loop (PLL)). The signal I is used to demodulate binary symbols.

The following modules work on the channel frequency Fch:
- 104—an analog-to-digital converter (ADC);
- 109—a standard channel;
- 100—memory unit;
- 110—dual-ported memory
- 101—request processing module;
- 102—request generation module (RGM);
- 103—modified channel;

The CPU 110 controls the components using the BUS at a frequency Fbus (typically about 200 MHz). The following modules have an interface that works at Fbus:
- 109—a standard channel;
- 102—request generation module (RGM);
- 103—modified channel;
- 107—FIFO module.

Those modules that have an interface that works at Fbus, the components need to be synchronized to both Fbus and Fch.

The CPU 110 writes data to the dual-ported memory 110 through a synchronizer that transforms data from Fbus to the Fch frequency.

The CPU 110 writes data to the FIFO module 107, the FIFO module 107 synchronizes the data by transforming the data from the Fbus frequency to the channel frequency Fch.

The CPU 110 controls the ADC 104 and the RF-track 105.

Having thus described a preferred embodiment, it should be apparent to those skilled in the art that certain advantages of the described method and apparatus have been achieved.

It should also be appreciated that various modifications, adaptations and alternative embodiments thereof may be made within the scope and spirit of the present invention. The invention is further defined by the following claims.

What is claimed is:
1. A multi-channel receiver comprising:
an antenna for receiving a GNSS signal;
a plurality of RF tracts connected to the antenna, the RF tracts providing a digitized version of the GNSS signal to a plurality of channels;

a central processor;
each channel accessing a memory through a common request processor shared by all the channels, the memory being coupled to the central processor for storing code sequence words;
each channel also retrieving memory code sequences from the memory, the code sequence words forming the code sequences;
each channel also including
an intermediate frequency generator producing an intermediate frequency signal,
a code frequency generator producing a code frequency signal, and
first, second, and third correlators,
wherein, in each channel
the intermediate frequency signal and the memory code sequences are multiplied to produce a first reference signal, and the first correlator correlates the digitized version of the GNSS signal with the first reference signal, and accumulates a first result;
a phase shifted intermediate frequency signal and the memory code sequences are multiplied to produce a second reference signal, and the second correlator correlates the digitized version of the GNSS signal with the second reference signal, and accumulates a second result;
the intermediate frequency signal and a strobe signal that indicates a transition of the first reference signal are multiplied to produce a third reference signal, and the third correlator correlates the digitized version of the GNSS signal with the third reference signal, and accumulates a third result;
wherein the first and second results are used to estimate a carrier phase of the GNSS signal,
wherein the third result is used to adjust a phase of the memory code sequences, and
wherein the central processor determines spatial coordinates based on the first, second and third results.

2. The receiver of claim 1, wherein the memory is shared by the plurality of channels and is accessible by the plurality of channels.

3. The receiver of claim 2, wherein each channel receives a memory code sequence from the shared memory and generates the reference code based on the memory code sequence.

4. The receiver of claim 3, wherein each channel receives two memory code sequences from the shared memory and generates the reference code based on the two memory code sequences.

5. The receiver of claim 1, wherein each channel receives two code sequence words from the memory through the common request processor.

6. The receiver of claim 1, wherein the plurality of channels, the memory and the request processing module work on a channel frequency Fch.

7. The receiver of claim 1, further comprising a strobe generator that generates the strobe signal based on the memory code sequences.

8. The receiver of claim 1, wherein each channel further comprises a fourth correlator, wherein the phase shifted intermediate frequency signal and the strobe signal are multiplied to produce a fourth reference signal, and the fourth correlator correlates the digitized version of the GNSS signal with the fourth reference signal, and accumulates a fourth result.

9. The receiver of claim 8, wherein both the third result and the fourth result are used to adjust the phase of the memory code sequences.

10. The receiver of claim 8, wherein the central processor determines the spatial coordinates based on the first, second, and third and fourth results.

11. The receiver of claim 8, wherein the fourth result is used to estimate a phase of the intermediate frequency for reducing multipath effects of the GNSS signal.

12. The receiver of claim 1, wherein the first and second results are accumulated in first and second registers, and wherein the first and second registers are used to decode information symbols from the GNSS signal by a sign determined by the first register with the second register being close to zero.

13. The receiver of claim 12, wherein the first and second registers are used to track phase and frequency of the intermediate frequency generator.

14. The receiver of claim 1, wherein the central processor controls the plurality of channels using a bus frequency Fbus.

15. The receiver of claim 14, further comprising a FIFO connected to the central processor and connected to the memory via the common request processor, wherein the FIFO takes data on the bus frequency Fbus, and the FIFO pushes out data using a channel frequency Fch, and wherein the central processor writes new code sequence words into the memory via the FIFO.

16. The receiver of claim 1, further comprising remainder registers for storing remainders of the memory code sequences.

17. The receiver of claim 16, wherein the memory sequences are based on the code sequence words retrieved from the memory and from the remainder registers.

18. The receiver of claim 1, wherein a location map of the code sequence words is stored in the memory and modified by the central processor.

19. The receiver of claim 1, wherein the GNSS signal received by the antenna is a pseudo-random-noise (PRN) signal.

20. The receiver of claim 1, wherein the memory is a shared dual port memory, and the central processor writes data on a bus from a synchronizer to the shared dual port memory that works on a channel frequency Fch independent of any reads.

21. The receiver of claim 1, wherein the memory is a shared memory, and wherein each channel receives memory code sequences from the shared memory based on a priority of its request.

22. The receiver of claim 1, wherein the third result and the first result are used to adjust the phase of the memory code sequences.

23. The receiver of claim 1, further comprising a request generation module that transforms the code sequence words from the memory into the code sequences.

24. A multi-channel receiver comprising:
an antenna for receiving a GNSS signal;
a plurality of RF tracts providing a digitized version of the GNSS signal to a plurality of channels;
a processor;
at least one intermediate frequency generator producing an intermediate frequency signal;
a code frequency generator producing a code frequency signal;
each channel accessing a memory through a common request processor shared by all the channels, the memory being coupled to the central processor for storing code sequence words;

each channel retrieving memory code sequences from the memory, the code sequence words forming the code sequences;

each channel including first, second, and third correlators, wherein each channel (a) multiplies the intermediate frequency signal and the memory code sequences to produce a first reference signal, and the first correlator correlates the digitized version of the GNSS signal with the first reference signal, and accumulates a first result;

(b) multiplies a phase shifted intermediate frequency signal and the memory code sequences to produce a second reference signal, and the second correlator correlates the digitized version of the GNSS signal with the second reference signal, and accumulates a second result;

(c) multiplies the intermediate frequency signal and a strobe signal that indicates a transition of the first reference signal to produce a third reference signal, and the third correlator correlates the digitized version of the GNSS signal with the third reference signal, and accumulates a third result;

wherein the first and second results are used to estimate a carrier phase of the GNSS signal, wherein the third result is used to adjust a phase of the memory code sequences, and wherein the processor calculates spatial coordinates based on the first, second and third results.

* * * * *